(12) United States Patent
Russello et al.

(10) Patent No.: US 9,208,328 B2
(45) Date of Patent: Dec. 8, 2015

(54) SECURITY SYSTEM AND METHOD FOR OPERATING SYSTEMS

(71) Applicant: Auckland Uniservices Ltd., Auckland (NZ)

(72) Inventors: Giovanni Russello, Auckland (NZ); Arturo Blas Jimenez, Auckland (NZ); Habib Naderi, Auckland (NZ); Wannes Van Der Mark, Auckland (NZ)

(73) Assignee: Auckland Uniservices Ltd. (NZ)

( * ) Notice: Subject to any disclaimer, the term of this patent is extended or adjusted under 35 U.S.C. 154(b) by 0 days.

(21) Appl. No.: 14/051,320

(22) Filed: Oct. 10, 2013

(65) Prior Publication Data

US 2014/0137184 A1    May 15, 2014

(30) Foreign Application Priority Data

Nov. 13, 2012  (AU) .................................. 2012904941
Jul. 25, 2013   (AU) .................................. 2013902750

(51) Int. Cl.
| | | |
|---|---|---|
| *G06F 11/00* | (2006.01) | |
| *G06F 21/60* | (2013.01) | |
| *H04L 29/06* | (2006.01) | |
| *G06F 21/52* | (2013.01) | |
| *G06F 21/53* | (2013.01) | |

(52) U.S. Cl.
CPC ................ *G06F 21/60* (2013.01); *G06F 21/52* (2013.01); *G06F 21/53* (2013.01); *H04L 63/20* (2013.01)

(58) Field of Classification Search
CPC ......... G06F 21/52; G06F 21/53; G06F 21/60; H04L 63/20

USPC .............. 726/1, 22–24, 17; 709/202; 711/163
See application file for complete search history.

(56) References Cited

U.S. PATENT DOCUMENTS

| | | | |
|---|---|---|---|
| 6,640,203 B2 * | 10/2003 | Brown et al. ................. | 702/186 |
| 8,326,958 B1 | 12/2012 | Raleigh | |
| 8,893,222 B2 | 11/2014 | Russello et al. | |
| 2006/0174078 A1 * | 8/2006 | Robison ........................ | 711/163 |

(Continued)

FOREIGN PATENT DOCUMENTS

| | | |
|---|---|---|
| EP | 1693752 B1 | 4/2008 |
| GB | 2342472 A | 4/2000 |

OTHER PUBLICATIONS

Aleksey Kurchuk, "Recursive Sandboxes: Extending Systrlace to Empower Applications", Jul. 25, 2004.*

(Continued)

*Primary Examiner* — Samson Lemma
(74) *Attorney, Agent, or Firm* — Schwegman Lundberg & Woessner, P.A.

(57) ABSTRACT

A device comprising an operating system to run processes and a middleware layer operable to launch applications. An application launched by the middleware layer is run using one or more processes in the operating system. The operating system has a user layer and a kernel wherein the processes run in the user layer and interact with other processes running in the user layer through the kernel, the interaction being in response to calls to the kernel made by the processes. The device has one or more policy files defining policies for interaction of processes with the kernel of the device, and a monitor configured to monitor interaction of a process with the kernel to link or associate defined policies to the process, and to read code defined in the policy file or files linked or associated to the process.

15 Claims, 15 Drawing Sheets

(56) References Cited

U.S. PATENT DOCUMENTS

2008/0250400 A1 10/2008 Vertes
2012/0101952 A1* 4/2012 Raleigh et al. ............... 705/304
2013/0305322 A1 11/2013 Raleigh et al.
2014/0137183 A1 5/2014 Russello et al.

OTHER PUBLICATIONS

Tal Garfinkel, "Traps and Pitfalls: Practical Problems in System Call Interposition Based Security Tools" Computer Science Department, Stanford University Feb. 6, 2003.*
Aubrey-Derrick Schmidt, "Enhancing Security of Linux-based Android Devices", Turkey 2008.*
Ian Goldberg, "A Secure Environment for Untrusted Helper Applications (Confining the Wily Hacker)", University of California Berkeley, 1996.*
"International Application Serial No. PCT/NZ2013/000204, International Search Report mailed Mar. 18, 2014", 4 pgs.
"International Application Serial No. PCT/NZ2013/000204, Written Opinion mailed Mar. 18, 2014", 3 pgs.
"U.S. Appl. No. 14/046,725, Non Final Office Action mailed Jun. 18, 2014", 16 pgs.
"U.S. Appl. No. 14/046,725, Notice of Allowance mailed Sep. 23, 2014", 6 pgs.
"U.S. Appl. No. 14/046,725, Response filed Sep. 9, 2014 to Non Final Office Action mailed Jun. 18, 2014", 63 pgs.

* cited by examiner

SECURITY SYSTEM AND METHOD FOR OPERATING SYSTEMS

CROSS-REFERENCE TO RELATED APPLICATION(S)

The present application claims the benefit of priority under 35 U.S.C. §119 to Australian Patent Application No. 2012904941, filed Nov. 13, 2012 and Australian Patent Application No. 2013902750, filed Jul. 25, 2013, 5 both of which are incorporated herein by reference in their entirety.

BACKGROUND

The ANDROID™ operating system, available from Google Inc. of Mountain View, Calif., is a LINUX-based operating system designed primarily for touchscreen mobile devices such as smartphones and tablet computers. The ANDROID operating system uses a LINUX kernel at its core, and also provides an application framework that software developers can use to implement ANDROID operating system applications and services. The ANDROID operating system additionally provides a native middleware layer between the LINUX kernel interface and the ANDROID operating system applications and services that execute at the higher application layer to enable easier cross-platform development for deploying the same applications or services across different types of hardware devices.

This middleware layer includes a set of shared libraries that provide services such as data storage, screen display or multimedia, and are compiled to machine language to enable services to execute quickly. The middleware libraries implement device-specific functions, so applications and the application framework need not concern themselves with the variations between devices running the ANDROID operating system. The middleware layer also supports a specialized version of the Java runtime to simplify cross-platform development. In particular, it provides the Dalvik Virtual Machine (DVM) and its core Java application libraries. Applications or services implemented by developers can be compiled from Java (or other supported languages) to a byte-code that can be run by the DVM.

Although the middleware layer simplifies application development, it also adds significantly more complexity to the overall ANDROID operating system. This additional complexity can be exploited by applications or services programmed to perform malicious tasks (malware) or execute malicious code (malcode).

By way of example, malware or malcode can exploit Inter-Process Communications (IPC) or Inter-Component Communications (ICC) to attack sensitive applications and their data. Referring to FIG. 1, each application 10, 12 is executed in a respective DVM 14, 16. When launched, each application corresponds to an instance of a DVM. Each DVM 14, 16 is mapped into a dedicated process 18, 20 running in User Mode 22 in the LINUX layer 24. In the ANDROID operating system, applications can communicate with each other using IPC mechanisms. The standard mechanism in the ANDROID operating system to implement IPC is though the Binder framework. The Binder framework has the facility to provide bindings to functions and data from one process to another. The Binder framework in the ANDROID operating system is provided in three levels. At the application layer 42 there is an Application Programming Interface (API) 26, 28 to enable applications to communicate with each other. The ANDROID Interface Definition Language, which is part of this API, allows developers to define the interface for an ANDROID operating system service and an AIDL parser generates the Java client code that the service clients can use and a service stub that the developer can use to create the service implementation. At the native middleware layer 44 a Binder class 30, implemented using the C++ language, provides the user space facilities to be used by the applications via Java Native Interface (JNI) and interacts with the Binder kernel driver 32, which is part of the customized LINUX ANDROID operating system kernel. The Binder kernel driver 32 carries out the message passing between processes and provides a shared memory facility. The driver sits behind a special device, /dev/binder, and can be used through various system calls, such as open and ioctl, to enable processes to communicate with each other.

As shown in FIG. 1, the IPC mechanism can be described in two layers. At the the ANDROID operating system layer 46, when Application 1 (10) sends an IPC through its AIDL API (26) as shown at 34, the binder code 30 in the middleware will take care of the delivery of the request to the destination Application 2 (12) as shown at (36). At the LINUX layer, this operation is translated into a sequence of system calls (open and ioctl) executed by Process 1 (18) (corresponding to Application 1) using the binder kernel driver (dev/binder) 32 as shown at (38). The request is then forwarded to Process 2 (20) (corresponding to Application 2) as shown at (40).

In conventional UNIX and LINUX operating systems, security systems such as SELinux or the LINUX Security Modules have been proposed in the form of a kernel module that can trace a process to enforce security policies. This involves recompiling the kernel image in order to register the module and to be able to eventually load it. Additionally, as new applications are launched by the user via a shell command line, the monitoring module is able to link the correct security policy to the newly launched process by analyzing the command line arguments. Such security systems do not work effectively on the ANDROID operating system, which uses a distinctly different way of launching and managing Applications. It is also desirable to have a security system for the ANDROID operating system that does not require recompilation of the LINUX kernel.

In the above security systems, malicious applications can fool the security system by converting into a different application than the one launched via the shell command line arguments. This means the security system associates an incorrect set of security policies with the launched process thinking that it is the application specified by the initial shell command line arguments.

The phrase "OS virtualization" refers to a technique to allow multiple instances of an OS or isolated user-spaces to share the same hardware resources of a device. Each OS instance runs in complete isolation from the other instances. Typically, virtualization can be achieved using three alternative techniques: Full virtualization using binary translation, Paravirtualization, or Hardware-supported virtualization.

Full virtualization is achieved by automatically translating the binary instructions from the guest OS to low level instructions to achieve the effect of virtualizing the hardware. Although full virtualization does not require modifications in the guest OS, its main drawback is the extra computation resources required to translate the instructions. This can be problematic in devices with constrained power resources as it reduces operational time on a single battery charge.

Paravirtualization refers to a technique where the guest OS is modified in such a way that instead of executing the normal instructions it will execute a set of special instructions to communicate with the virtual environment on which it is deployed. Paravirtualization increases performance but at the cost of extensive modifications of the guest OS. This means that specifically to the case of ANDROID OS, a specific image of the ANDROID OS needs to be developed and maintained.

Hardware-support virtualization requires a special set of instructions to be fully supported by the CPU.

There are three main drawbacks common to all three virtualization approaches above. First, they are coarse-grained in that they apply virtualization at the level of an entire OS image. Sometimes it is only necessary to isolate a single process from the rest of the running services, not the entire OS. Second, they do not provide enhanced security control. Virtualizing a guest OS does not mean to make it more secure. The same security level as in the plain OS will be replicated for each instance of the OS. If an OS instance is compromised by a rouge application that contains malware, all the applications and resources within that OS instance will be exposed to that application. Unless the OS itself is able to cope with such threats, virtualization alone will not provide an extra level of protection. Third, the above virtualization techniques exhibit static behavior in that the virtualization is only concerned in executing instructions to partition the underlying hardware for the different OS instances. No dynamic decisions are made.

In this specification where reference has been made to patent specifications, other external documents, or other sources of information, this is generally for the purpose of providing a context for discussing the features of the various embodiments. Unless specifically stated otherwise, reference to such external documents is not to be construed as an admission that such documents, or such sources of information, in any jurisdiction, are prior art, or form part of the common general knowledge in the art.

SUMMARY

It is an object of at least some embodiments herein to provide a security system and method for a LINUX-based operating system in which security policies for each application can be configured at the application layer and which are enforced at the lower LINUX layer, or to at least provide the public with a useful choice.

It is an object of at least some embodiments herein to provide an improved security system and method for linking a security policy to an application, or to at least provide the public with useful choice.

It is an object of at least some embodiments herein to provide an alternative virtualization mechanism for providing a plurality of isolated user-space instances to operate on a device, or to at least provide the public with a useful choice.

In a first aspect, some embodiments comprise a method for securing an operating system running on a device comprising a LINUX-based kernel and a system architecture defined by a LINUX operating system layer associated with the kernel and the higher application layer comprising applications, the method comprising:
  monitoring system calls to the kernel made by a mother process in the LINUX operating system layer to detect the launching of a new process in the LINUX operating system layer corresponding to a new application or part of an application in the application layer; and
  attaching a new monitor process in the LINUX operating system layer to the newly launched process once it is created by the mother process, the monitor process being configured to monitor system calls made to the kernel by the new process and to retrieve and enforce security policies configured for the new process based on the parameters of detected system calls.

In one embodiment, the system architecture is further defined by a middleware layer between the LINUX operating system layer and higher application layer.

By way of example, the new application or part of an application, may be launched by the user of the device, the operating system itself, or an already running application or process. The launch of a new application or part of an application in the application layer corresponds to the starting, launching, or forking of a process in the LINUX operating system layer.

In some embodiments, the method further comprises providing security policies for the applications in the application layer in a policy database. In some further embodiments, the policy database is stored on the device or is stored remotely but is accessible to the device. In one embodiment, the policy database may be provided in the form of a policy configuration file or files.

In some embodiments, the method further comprises defining and storing security policies for the applications in the application layer in a policy database.

In some embodiments, the operating system is the ANDROID operating system. In some further embodiments, the mother process is the Zygote process.

Attaching a monitor process to the new process in the LINUX operating system layer may comprise configuring the monitor process as a master process and the associated new process as its target process. Additionally, attaching the monitor process to the new process, in some embodiments, comprises requesting the kernel to execute a tracing system call that is configured to intercept all or at least a set of system calls executed by the target process and report those to the master process prior to execution of such system calls. By way of example, the tracing system call may be a process trace system call (ptrace). In some such embodiments, the kernel is configured to report to the master process system calls made by the target process both prior to and after the execution of the system call, and, in some embodiments, before the kernel actually resumes the target process execution.

In a further embodiment, the monitor process may be configured to access and retrieve the security policy for its target process from a security system service at the application layer which has access to the configurable security policies for the applications of the application layer in the policy configuration file. In some such embodiments, the monitor process at the LINUX operating system layer is configured to establish a communication link with the security system service at the application layer. By way of example, the communication link may be a direct link such as a transmission control protocol (TCP) link or connection, a UNIX socket, shared memory, messages, pipes or other means of IPC.

In some embodiments, the method further comprises loading the new process monitor with the relevant security policies for its target process by:
  monitoring the specialization process of the target process as it specializes as the intended application;
  extracting application identification data from the specialization process that is indicative of the application the target process is specializing as; and
  retrieving the relevant security policies for the target process based on the extracted application identification data.

By way of example, the application identification data may be the application package name. In one form, the method comprises extracting the application identification data from a system call invoked by the target process as it specializes. In another form, the method comprises extracting the application identification data from a specialization data file where the full application package name of the target process is written to during the specialization process. In other embodiments, optionally the identification data could be retrieved by local data storage or remote data sources.

Retrieving the relevant security policies for the target process based on the extracted application identification data may comprise sending a request for the security policies to a security system service in the application layer, the request comprising the application identification data.

In another embodiment, the method comprises retrieving the relevant security policies for a target process based on a user-space control parameter indicative of the specific user-space instance currently operating on the device. The user-space control parameter may comprise data that identifies or is indicative of the currently operating user-space instance, selected from a plurality of user-space instances. In one embodiment, the user-space instances may correspond to operating domains, such as work domain or private domain.

In some embodiments, the monitor process is configured to enforce the retrieved security policy for its target process by implementing a security action at the LINUX operating system layer in regard to the detected system call based on the retrieved security policy. The security action may comprise any one or more of the following: allowing the system call to proceed, blocking the system call from proceeding, modifying parameters of the system call prior to execution or return values generated by the system call after execution, or prompting the user of the device to select a security action. By way of example, the monitor process may implement a security action by instructing and controlling the kernel in regard to its execution of the requested system call by the attached monitored process.

Each process monitor may be configured to enforce security policies based on parameters extracted from the detected system calls. For explicit system calls, the security policies may be evaluated and enforced based directly on extracted system call parameters. For implicit system calls, the process monitors may be configured to retrieve further information about the system call from the security system service in the application layer before evaluating and enforcing the security policies.

The method may further comprise initially stalling execution of the new process until the monitor process has been attached to the new target process. Such stalling of execution of the new process may comprise injecting a breakpoint in the code of the target process to prevent it from executing and subsequently removing the breakpoint to allow the new process to specialize as the new application and execute once the monitor process has been established and attached to the new process. By way of example, the breakpoint may be an endless loop or a breakpoint machine instruction.

Monitoring system calls to the kernel made by a mother process may comprise establishing a main monitor process before the mother process initiates and attaching the main monitor process to the mother process by configuring the main monitor process as a master process and the mother process as its target process. Further, attaching the main monitor process to the mother process may also comprise requesting the kernel to execute a tracing system call that is configured to intercept all or at least a set of system calls executed by the mother process and report those to the main monitor process prior to execution of the system call.

In some embodiments, the method may further comprise attaching a new individual monitor process to each newly launched process created by the mother process, each individual monitor process being configured to enforce the security policy corresponding to the application for its attached monitor process.

In a second aspect, some embodiments comprise a security system for an operating system running (e.g., executing) on a device that comprises a LINUX-based kernel, and a system architecture defined by a LINUX operating system layer associated with the kernel and the higher application layer comprising applications, the system comprising:

a main monitor process running at the LINUX operating system layer which is configured to detect the launch of a new process in the LINUX operating system layer by a mother process, the new process corresponding to the launching of a new application or part of an application in the application layer by the user of the device;

a process monitor attached by the main monitor process to each new process created by the mother process and each process monitor being configured to monitor the system calls made by its attached process to the kernel; and a security system service running at the application layer that is operable to access stored configurable security policies for the applications of the application layer, and which communicates with each process monitor in the LINUX operating system layer the security policies corresponding to its attached process, and wherein each process monitor is configured to retrieve and enforce the security policy configured for its attached process based on the parameters of the detected system calls.

In one embodiment, the system architecture is further defined by a middleware layer between the LINUX operating system layer and higher application layer.

The security system may further comprise an accessible policy database comprising stored configurable security policies for the applications in the application layer. The policy database may be stored on the device or remotely stored and accessible to the device.

In some embodiments, the operating system is the ANDROID operating system. In some such embodiments, the mother process is the Zygote process.

The main monitor process is typically attached to the mother process. The attachment may be created by a process trace system call, with the main monitor configured as the master process and the mother process being configured as the target process.

Each process monitor may be attached to its respective process by a process trace system call, with the process monitor being the master process and its respective attached process being the target process.

Each process monitor may be configured to load the security policies for its attached target process by retrieving the security policies from the security system service. Each process monitor may be configured to monitor the specialization process of its target process to extract application identification data indicative of the application the target process is specializing as, and to retrieve the relevant security policies for the target process from the security system service based on the extracted application identification data.

In some embodiments, the process monitor(s) communicate with the security system service over a communication link or mechanism between the LINUX operating system layer and application layer. By way of example, the communication mechanism may be client-server transactions over a TCP link or similar.

The second aspect of such embodiments may have any one or more features mentioned in respect of the embodiments of the first aspect above.

In a third aspect, some embodiments comprise a method of configuring a process monitor attached to a new target process in a security system for an operating system running on a device that comprises a LINUX-based kernel, and a system architecture defined by a LINUX operating system layer associated with the kernel and the higher application layer comprising applications, the method comprising:

monitoring the specialization process of the target process as it specializes as its intended application;

extracting application identification data from the specialization process that is indicative of the application or type of application the target process is specializing as;

retrieving security policies specific to the target process from a policy database based on the extracted application identification data; and configuring the process monitor to enforce the retrieved security policies.

In one embodiment, the system architecture is further defined by a middleware layer between the LINUX operating system layer and higher application layer.

In an embodiment, the method further comprises retrieving the relevant security policies specific to the target process based on a user-space control parameter indicative of the specific user-space instance currently operating on the device. In some such embodiments, the user-space control parameter is data that identifies or is indicative of the currently operating user-space instance, selected from a plurality of user-space instances. In one embodiment, the user-space instances may correspond to operating domains, such as work domain or private domain.

In a fourth aspect, some embodiments comprise a method of linking a security policy stored in a policy database that is specific to an application in the application layer with a new corresponding process launched in the LINUX operating system layer in a security system for an operating system running on a device that comprises a LINUX-based kernel, and a system architecture defined by a LINUX operating system layer associated with the kernel and the higher application layer comprising the applications, the method comprising:

monitoring the specialization process in the LINUX operating system layer of the new process as it specializes as its intended application;

extracting application identification data from the specialization process that is indicative of the application or type of application the target process is specializing as; and creating a link between the new process and a security policy from the policy database based on the application identification data.

In one embodiment, the system architecture is further defined by a middleware layer between the LINUX operating system layer and higher application layer.

In one form, creating a link comprises retrieving the security policy from the policy database and loading it into a process monitor attached to the new process for enforcing them.

In one embodiment, creating a link comprises retrieving the relevant security policies specific to the new process based on a user-space control parameter indicative of the specific user-space instance currently operating on the device. The user-space control parameter may comprise data that identifies or is indicative of the currently operating user-space instance, selected from a plurality of user-space instances. In one embodiment, the user-space instances may correspond to operating domains, such as work domain or private domain.

In a fifth aspect, some embodiments comprise a method of implementing security policies at the LINUX operating system layer, the policies being defined for applications or types of applications in the application layer, wherein the method comprises monitoring the loading and/or identification of code used by a new LINUX operating system process to specialize into its intended application, and linking a security policy or policies for implementing at the LINUX operating system layer to the new LINUX operating system process based on the loaded or identified code.

By way of example, the security policies may be defined for each application, a type of application or a set of them.

In some embodiments, linking a security policy to the new LINUX operating system process comprises identifying a security policy for new LINUX operating system process from the code used by the new LINUX operating system process to specialize into its intended application.

In some embodiments, the application layer is the ANDROID operating system layer.

The third-fifth aspects of the embodiments described above may comprise any one or more features mentioned in respect of the first and second aspect embodiments.

In sixth aspect, some embodiments comprise a method of securing an operating system running on a device comprising a LINUX-based kernel in a LINUX operating system layer, the system architecture comprising an application comprising applications in an application layer above the LINUX operating system layer, the method comprising:

embedding a monitoring entity within each newly launched process in the LINUX operating system layer corresponding to a new application or an application component in the application layer;

configuring each newly launched process to redirect at least some of its shared or dynamic library symbol invocations to the embedded monitoring entity within the process;

configuring each embedded monitoring entity to analyze redirected symbol invocations made by its associated process and perform a security action based on a security policy associated with the process.

In some embodiments, the shared or dynamic library symbol invocations correspond to or represent function invocations or function calls in a shared or dynamic library that are intended to invoke one or more system calls in the kernel mode.

In one embodiment, the method comprises redirecting all symbol invocations made by a process to the embedded monitoring entity within the process. In another embodiment, the method comprises redirecting a predefined or predetermined set of symbol invocations made by a process to the embedded monitoring entity within the process.

In one embodiment, the method further comprises retrieving the relevant security policies specific to a process based on a user-space control parameter indicative of the specific user-space instance currently operating on the device. The user-space control parameter may comprise data that identifies or is indicative of the currently operating user-space instance, selected from a plurality of user-space instances. In one embodiment, the user-space instances may correspond to operating domains, such as work domain or private domain.

In some embodiments, the security action may comprise any one or more of the following:

denying execution of the function call represented by the symbol in the shared or dynamic library to prevent its execution and the execution of any system call(s) it may use, allowing execution of the function call represented by the symbol by sending the function call to the intended shared or dynamic library for execution to allow invocation of it and of any system call(s) it may use, or modifying the symbol invocation by sending a modified function call to the intended shared or dynamic library for execution to allow invocation of a modified system call in the kernel.

Embedding a monitoring entity within each newly launched process may comprise embedding a process monitor method or function within the process.

Configuring each newly launched process to redirect shared or dynamic library symbol invocations to the embedded monitoring entity may comprise configuring a Function Call Interposition (FCI) mechanism for each newly launched process. By way of example, the FCI mechanism is configured to intercept and redirect symbol invocations to the embedded process monitor with the process.

In one form, the FCI mechanism comprises configuring or providing a set of proxy functions (proxy function library) in each new process that intercept the symbol invocations and redirect them to the embedded monitoring entity within each process. The proxy function library in some such embodiments, is configured to intercept symbol invocations intended for shared or dynamic libraries.

In a first form, configuring an FCI mechanism for each process comprises configuring the runtime linker to link the process to the proxy function library before any other shared or dynamic libraries. By way of example, the method may comprise configuring the LD_PRELOAD environment variable to instruct the runtime linker to link to the proxy function library when a process is launched.

In a second form, configuring an FCI mechanism for each process comprises modifying the process image to redirect dynamically linked symbol invocations to the proxy function library of the process. In some embodiments, this step comprises modifying the address entries of the symbols in the Global Offset Table (GOT) of the process to point to an entry in the proxy function library of the process, and where the GOT is part of the Executable and Linkable Format (ELF) of the process. By way of example, the proxy function library may be in the form of a Proxy Offset Table (POT), and each entry in the POT may be configured to point to the embedded monitoring entity of the process.

In a third form, configuring an FCI mechanism for each process may comprise:

configuring the runtime linker to link any mother process to the proxy function library before any other shared object libraries; and modifying the process image in memory of any new processes launched by the mother process to redirect shared or dynamic library symbol invocations to the proxy function library of the process.

By way of example, the operating system may be the ANDROID operating system, and the mother process the Zygote process.

In some embodiments, the method may further comprise initiating a System Call Interposition (SCI) mechanism if a process attempts to load and/or execute untrusted native code, the SCI mechanism being configured to intercept system calls made to the kernel by the code and direct those to a monitoring entity to implement a security action. In some such embodiments, the SCI mechanism is temporarily activated only while the untrusted native code is executing, and is deactivated once the untrusted native code completes execution. The monitoring entity may be the embedded monitoring entity of the process or a separate monitoring entity associated with the process.

In one embodiment, the method may further comprise initiating an SCI mechanism if a parent process launches a new child process to execute untrusted native code. In some such embodiments, the method may comprise initiating an SCI mechanism in the form of a process trace system call to attach the parent process (master process) to the new child process (target process) such that any system calls invoked by the new child process are intercepted and directed to the embedded process monitor of the parent process to implement a security action.

In another embodiment, the method may further comprise initiating an SCI mechanism if a process attempts to execute untrusted native code by dynamically loading new symbols from a shared library.

In a seventh aspect, some embodiments comprise a method of securing an operating system running on a device comprising a LINUX-based kernel in a LINUX operating system layer, the system architecture comprising applications in an application layer above the LINUX operating system layer, the method comprising:

intercepting shared or dynamic library symbol invocations made by processes that are intended to invoke system calls in the kernel;

initiating a security action for intercepted symbol invocations based on a security policy configured for the application corresponding to the process calling the intercepted symbol invocation.

In an eighth aspect, some embodiments comprise a security system for an operating system running on a device that comprises a LINUX-based kernel, and a system architecture defined by a LINUX operating system layer associated with the kernel and the higher application layer comprising applications, the system comprising:

an embedded monitoring entity within each launched process in the LINUX operating system layer, each launched process corresponding to an application in the application layer;

an interceptor associated with each process that is configured to intercept at least some of the shared or dynamic library symbol invocations made by its associated process and redirect them to the embedded monitoring entity within the process initiating the symbol invocations, and wherein the embedded monitoring entities are configured to analyze the intercepted symbol invocations made by their associated processes and perform a security action based on a security policy associated with the process.

In one embodiment, the system architecture is further defined by a middleware layer between the LINUX operating system layer and higher application layer.

The various embodiments of the eighth aspect may further comprise any one or more of the features mentioned in respect to the embodiments of the fourth-seventh aspects.

In a ninth aspect, some embodiments comprise a method for securing an operating system running on a device comprising a LINUX-based kernel and a system architecture defined by a LINUX operating system layer associated with the kernel and the higher application layer comprising applications, the method comprising:

creating a monitoring entity which monitors system and/or library function calls invoked by a mother process to detect the creation of a new process which will correspond to a new application in the application layer; and creating a new monitoring entity to monitor to the newly launched process once it is created by the mother process, the new monitoring entity being configured to detect system and/or library function calls made by the new process and to retrieve and enforce security policies configured for the new process based on the parameters of the detected system and/or library function calls.

In one embodiment, the system architecture is further defined by a middleware layer between the LINUX operating system layer and higher application layer.

In one form, the monitoring entity is defined as a LINUX operating system process. For example, the monitoring entity may be a separate monitor process linked or attached to the target process it is monitoring. In another form, the monitoring entity may be an embedded process monitor method or function within the target process being monitored.

The application may be an application program or an application component such as, but not limited to Activities, Services, Content Providers or Broadcast receivers.

In one embodiment, the method may further comprise retrieving the relevant security policies specific to the new process based on a user-space control parameter indicative of the specific user-space instance currently operating on the device. In some such embodiments, the user-space control parameter is data that identifies or is indicative of the currently operating user-space instance, selected from a plurality of user-space instances. In one embodiment, the user-space instances may correspond to operating domains, such as work domain or private domain.

In a tenth aspect, some embodiments comprise a method for securing an operating system running on a device comprising a LINUX-based kernel and a system architecture defined by a LINUX operating system layer associated with the kernel and the higher application layer comprising applications, the method comprising:

creating a monitoring entity which monitors, directly or indirectly, system calls invoked by a mother process to detect the creation of a new process which will correspond to a new application in the application layer; and creating a new monitoring entity to monitor to the newly launched process once it is created by the mother process, the new monitoring entity being configured to detect, directly or indirectly, system call invocations made by the new process and to retrieve and enforce security policies configured for the new process based on the parameters of the detected system call invocation.

In one embodiment, the system architecture is further defined by a middleware layer between the Linux layer and higher application layer.

In one form, the monitoring entities directly monitor or detect system call invocations by intercepting the system call invocations to the kernel. In another form, the monitoring entities indirectly monitor or detect system call invocations by intercepting shared or dynamic library symbol invocations that are intended to invoke one or more system calls to the kernel.

In one embodiment, the method further comprises retrieving the relevant security policies specific to a new process based on a user-space control parameter indicative of the specific user-space instance currently operating on the device. In some such embodiments, the user-space control parameter is data that identifies or is indicative of the currently operating user-space instance, selected from a plurality of user-space instances. In one embodiment, the user-space instances may correspond to operating domains, such as work domain or private domain.

In an eleventh aspect, some embodiments comprise a method of securing an operating system running on a device comprising a LINUX-based kernel in a LINUX operating system layer, the system architecture comprising applications in an application layer above the LINUX operating system layer, the method comprising:

detecting shared or dynamic library symbol invocations made by processes using a first monitoring mechanism and initiating a security action for detected symbol invocations based on a security policy associated with the respective process invoking the symbol invocation;

detecting high-risk processes attempting to execute one of a predefined set of high-risk actions;

initiating a second monitoring mechanism to monitor system calls invoked by detected high-risk processes.

In some embodiments, the method comprises initiating or activating the second monitoring mechanism temporarily. In particular, the method according to some embodiments comprises initiating or activating the second monitoring mechanism only while the high-risk process is executing. In one example, the method comprises deactivating the second monitoring mechanism once the high-risk process finishes executing. In another example, the method comprises deactivating the second monitoring mechanism once dangerous or untrusted symbols have been unloaded. In one form, the second monitoring mechanism may be disabled when the high-risk process unloads the untrusted symbols using, for example, dlclose function call.

In one form, the first monitoring mechanism is an FCI mechanism in each process that is configured to intercept and redirect shared and dynamic library symbol invocations that may be intended to invoke one or more systems calls in the kernel to a monitoring entity associated with the process, the monitoring entity initiating a security action in response to each intercepted symbol invocation.

In one form, the second monitoring mechanism is an SCI mechanism configured for each detected high-risk process. In some embodiments, each SCI mechanism is configured to intercept and redirect system calls made to the kernel by the high-risk processes to a monitoring entity associated with the process, the monitoring entity initiating a security action in response to each intercepted system call.

By way of example, high-risk actions may comprise any one or more of the following:

detecting a process attempting to load and/or execute untrusted native code, and/or detecting a process attempting to execute or invoke code which may result in that process or a child process invoking system calls that bypass the first monitoring mechanism, and/or detecting a process invoking the ldopen function call to load shared objects (e.g. written in native code).

In one form, the method may comprise initiating an SCI mechanism if a parent process launches a new child process to execute untrusted native code. In some such embodiments, the method comprises initiating an SCI mechanism in the form of a process trace system call to attach the parent process (master process) to the new child process (target process) such that any system calls invoked by the new child process are intercepted and redirected to a monitoring entity associated with the parent process to implement a security action.

In a twelfth aspect, some embodiments comprise a method of securing an operating system running on a device comprising a LINUX-based kernel in a LINUX operating system layer, the system architecture comprising applications in an application layer above the LINUX operating system layer, the method comprising:

initiating a primary monitoring mechanism configured to detect at least some shared or dynamic library symbol invocations made by processes, and executing a security action for detected symbol invocations based on security policies associated with the processes invoking the detected symbol invocations;

detecting high-risk processes attempting to execute one of a predefined set of high-risk actions and switching to a secondary monitoring mechanism to detect system calls invoked by detected high-risk processes; and executing a security action for each detected system call based on security policies associated with detected high-risk processes invoking the detected system calls.

In one form, the primary monitoring mechanism is an FCI mechanism configured to detect shared or dynamic library symbol invocations that may be intended to invoke one or more system calls to the kernel, and the secondary monitoring mechanism is an SCI mechanism configured to detect system calls to the kernel.

In a thirteenth aspect, some embodiments comprise a method of linking an application-specific security policy or policies to a new process in an operating system of a device, the device having an operating system operable to run processes and middleware operable to cause the operating system to launch a new process by forking or spawning the new process from an existing process or a mother process and to cause the new process to specialize to run the application using code that is specific to the application, the method comprising:

detecting the new process;

monitoring for a predefined event or predefined identification threshold after detecting the new process; and linking a security policy or policies to the new process once the predefined event is detected or predefined identification threshold is reached.

In some configurations, detecting the new process comprises detecting the launch of the new process, and monitoring for a predefined event or predefined identification threshold after detecting the new process. In one form, launching of the new process comprises forking the new process from a parent or mother process.

In an embodiment, the operating system comprises a LINUX-based kernel in a LINUX operating system layer and where the system architecture comprises applications in an application layer above the LINUX operating system layer.

In one form, the predefined event is the completed fork of the new process. In another form, the predefined event is the specialization of the new process with its application-specific code. In another form, the predefined event is the beginning of the execution of the application-specific code.

In one form, the predefined identification threshold corresponds to collecting or receiving enough data or evidence indicating or identifying that the new process launched in the LINUX operating system layer corresponds to the application in the application layer the user intended to launch.

In one form, linking a security policy or policies to the new process comprises: extracting application identification data indicative of the application or type of application the process will specialize as, or is specializing as, or has specialized as; and retrieving a security policy or policies from a policy database based on that application identification data.

In another form, linking a security policy or policies to the new process comprises: monitoring execution of the new process after it has specialized; characterising the type of application based on its execution; and retrieving a security policy or policies from a policy database based on that characterization.

In some embodiments, linking a security policy or policies to the new process comprises configuring a monitoring entity associated with the process with the security policy or policies, the monitoring entity being configured to monitor the execution of the process and enforce the security policy or policies.

In one form, the application identification data is the application name or program name.

In one form, the application name is retrieved from a file. In another form, the application name is retrieved from the memory of the new process. In another form, the application name is pushed to the process from an external process over an IPC channel. In another form, the application name is requested or pulled from an external process over an IPC channel.

In some configurations, the monitor may be configured to link or associate defined policies with a process by monitoring the loading and/or identification of code used by the process to specialize into its intended application, and linking a policy file or files to the process based on the loaded or identified code. In one such configuration, the monitor is configured to link or associate defined policies to a process after the process has been started. In another such configuration, the monitor is configured to link or associate defined policies to a process dependent on data or code used to specialize the process to a given application or application type.

In some configurations, the monitor may be configured to link to associate defined policies with a process by: monitoring the specialization of the process as it specializes as its intended application; extracting application identification data from the specialization process that is indicative of the application the process is specializing as; and linking a policy file or files to the process based on the extracted application identification data.

In some configurations, the monitor may be configured to link or associate defined policies with a process by: detecting the launch of the process; monitoring for a predefined event or predefined identification threshold after detecting launch of the process; and linking a policy file or files to the process once the predefined event is detected or predefined identification threshold is reached.

In some configurations, the monitor may comprise: a monitoring entity which monitors, directly or indirectly, system calls invoked by a mother process to detect the creation of a new process which will correspond to a new application, and wherein the monitor is configured to create a new monitoring entity to monitor the newly launched process once it is created by the mother process, the new monitoring entity being configured to detect, directly or indirectly, system call invocations made by the new process and to enforce policies linked or associated with the new process based on the parameters of the detected system call invocation. In one such configuration, the monitoring entities may directly monitor or detect system call invocations by intercepting the system call invocations to the kernel. In another such configuration, the monitoring entities may indirectly monitor or detect system call invocations by intercepting shared or dynamic library symbol invocations that are intended to invoke one or more system calls to the kernel.

In one form, the monitor may be code stored on the device and is operable when the code is executed by the device. In another form, the monitor may be a hardware component of the device.

In a fourteenth aspect, some embodiments comprise a method of linking an application-specific security policy or policies to a new process launched in an operating system, comprising:
  detecting the launch of the new process;
  delaying linking of a security policy or policies to the new process at least until the new process begins specializing with its application-specific code for execution.

In some embodiments, the method comprises linking a security policy or policies to the new process once the new process has completed specialization.

In a fifteenth aspect, some embodiments comprise a device comprising an operating system to run processes and a middleware layer operable to launch applications, wherein an application launched by the middleware layer is run using one or more processes in the operating system, the operating system having a user layer and a kernel wherein the processes run in the user layer of the operating system and interact with other processes running in the user layer through the kernel, the interaction being in response to calls to the kernel made by the processes, the device further comprising:
  one or more policy files defining policies for interaction of processes with the kernel of the device; and
  a monitor configured to monitor interaction of a process with the kernel to link or associate defined policies to the process, and to read code defined in the policy file or files linked or associated to the process.

In some configurations, the middleware layer may be operable to cause a process to spawn or fork from and existing process or a mother process and to cause the process to specialize to run an application using code specific to the application.

The monitor code may be further operable to enforce policies defined in the policy file or files linked or associated with the process.

The operating system may be the LINUX operating system or a LINUX-based operating system.

In some configurations, the monitor may be configured to link to associate defined policies with a process by: monitoring the specialization of the process as it specializes as its intended application; extracting application identification data from the specialization process that is indicative of the application the process is specializing as; and linking a policy file or files to the process based on the extracted application identification data.

In some configurations, the monitor may be configured to link or associate defined policies with a process by: detecting the launch of the process; monitoring for a predefined event or predefined identification threshold after detecting launch of the process; and linking a policy file or files to the process once the predefined event is detected or predefined identification threshold is reached.

In some configurations, the monitor may be further configured to enforce the policy or policies defined in the policy file or files linked or associated with the process.

The monitor code may be configured to monitor interaction of a process with the kernel by monitoring shared or dynamic library symbol invocations and/or system calls and the policy file or files may define actions in response to given symbol invocations or system calls made by the process linked to the policy file or files. The actions may include one or more of: blocking the symbol invocation or system call, redirection of symbol invocations to an alternative library address, logging the symbol invocation or system call, killing the process, and suspending the symbol invocation or system call to allow authorization of the symbol invocation or system call by an operator.

In some configurations, the monitor may be configured to link or associate defined policies with a process by monitoring the loading and/or identification of code used by the process to specialize into its intended application, and linking a policy file or files to the process based on the loaded or identified code.

The monitor code may be operable when executed to link or associate the policy to a process after the process has been started. The monitor code may be operable when executed to link or associate the policy to a process dependent on data or code used to specialize the process to a given application or application type.

The monitor code may be operable when executed to run a library function within the process to read code defined by one or more policy definitions linked to the process. The code may be operable when executed to start a monitor process operable to monitor a given application dependent on one or more policy definitions linked to the process. The monitor code may be operable when executed to run in combination or switch between a library function within a process and to start a monitor process operable to monitor the process.

In some embodiments, the monitor code will link one or more policy definitions to a given process dependent on the application being run using the given process so that a policy specific to an application or type of application is applied to the process.

In some configurations, the monitor may comprise: a monitoring entity which monitors, directly or indirectly, system calls invoked by a mother process to detect the creation of a new process which will correspond to a new application, and wherein the monitor is configured to create a new monitoring entity to monitor the newly launched process once it is created by the mother process, the new monitoring entity being configured to detect, directly or indirectly, system call invocations made by the new process and to enforce policies linked or associated with the new process based on the parameters of the detected system call invocation. In one form, the monitoring entities may directly monitor or detect system call invocations by intercepting the system call invocations to the kernel. In another form, the monitoring entities may indirectly monitor or detect system call invocations by intercepting shared or dynamic library symbol invocations that are intended to invoke one or more system calls to the kernel.

In one form, the monitor is code stored on the device and is operable when the code is executed by the device. In another form, the monitor is a hardware component of the device.

In a sixteenth aspect, some embodiments comprise a method of virtualizing an operating system on a device to provide a plurality of isolated user-space instances operable on the device, the operating system comprising a LINUX-based kernel and a system architecture defined by a LINUX operating system layer associated with the kernel and the higher application layer comprising applications, the method comprising:
  intercepting system and/or library function calls made by processes, each process corresponding to an application in the application layer; and
  initiating a security action for intercepted system and/or library function calls based on at least a user-space control parameter indicative of the specific user-space instance currently operating on the device and a security policy associated with the process.

In one embodiment, the system architecture is further defined by a middleware layer between the LINUX operating system layer and higher application layer.

In some embodiments, the user-space control parameter is data that identifies or is indicative of the currently operating user-space instance, selected from a plurality of user-space instances. In one such embodiment, the user-space instances may correspond to operating domains, such as work domain or private domain.

The security policy may be application-specific or a global policy relating to all or a set of applications. In some embodiments, each security-policy is user-space specific such that only applies to an application or set of applications running in a particular user-space instance.

In some embodiments, the method comprises providing a policy database comprising a plurality of sets of security policies, each set of security policies corresponding to at least one of the user-space instances. In some embodiments, each user-space instance may comprise a different set of security policies for applying to applications running during operation of its user-space instance on the device.

In an embodiment, the method may further comprise selecting or linking a security policy to a process from a policy database based on at least the user-space control parameter. In another embodiment, the method further comprises selecting or linking a security policy to a process from a policy database based on the user-space control parameter and application identification data indicative of the application corresponding to the process invoking the system call.

In one form, intercepting system call invocations comprises directly intercepting system call invocations to the kernel. In another form, intercepting function calls comprises intercepting shared or dynamic library symbol invocations that are intended to invoke one or more system calls to the kernel.

In an embodiment, intercepting system call invocations, directly or indirectly, comprises implementing an SCI and/or FCI mechanism.

The security action may comprise any one or more of the following: allowing the system call to proceed, blocking the system call from proceeding, modifying parameters of the system call prior to execution or return values generated by the system call after execution, or killing the process.

In a seventeenth aspect, some embodiments comprise a virtualization system for virtualizing an operating system on a device to provide a plurality of isolated user-space instances operable on the device, the operating system comprising a LINUX-based kernel, and a system architecture defined by a LINUX operating system layer associated with the kernel and the higher application layer comprising applications, the system comprising:
  a monitoring entity associated with each launched process in the LINUX operating system layer, each launched process corresponding to an application in the application layer;
  an interceptor associated with each process that is configured to intercept system and/or library function calls, and redirect them to the monitoring entity associated with the process initiating the system and/or library function calls, and
  wherein the monitoring entities are configured to analyze the intercepted system and/or library function calls made by their associated processes and perform a security action based on at least a user-space control parameter indicative of the specific user-space instance currently operating on the device and a security policy associated with the process.

In one embodiment, the system architecture is further defined by a middleware layer between the LINUX operating system layer and higher application layer.

The sixteenth and seventeenth aspects, as described above, may comprise any one or more of the features mentioned in respect to the embodiments of the previous aspects.

Functionality of some embodiments may be defined by the received functional code, such as web code, web application code or other application code, to be monitored at the layer of processes accessing the resources of the device via the kernel which execute that functionality of the received code.

Some embodiments use data or code used to specialize the process to associate a policy for functional code to a process executing the functionality defined in the code so that monitoring of received code can be performed for a process.

In an eighteenth aspect, some embodiments comprise a device comprising one or more resources including a processor and configurable to functionalities defined in functional code received by the device, the device also comprising an operating system including a user layer operable to run processes and a kernel operable to provide interfaces for the processes to use one or more resources of the device, wherein the device stores launcher code operable to launch received functional code by causing a process to spawn or fork from another process and to specialize dependent on the functional code whereby functionality defined for the device by functional code is executed with a spawned or forked process using resources of the device via interfaces provided by the kernel, wherein the device also stores policy code defining a policy for each functional code or type of functional code received, and wherein the device comprises a monitor which is operable to associate policy code with the process and to monitor each process dependent on policy code associated with the process.

The monitor code may be operable to take security actions dependent on a policy. A security action may comprise logging a call made by a process and associating that log entry with the functional code or type of functional code associated with the process. The launcher code may define a middleware, such as the ANDROID operating system. The launcher code may define a browser such as Chrome or Chrome OS.

The monitor code may be operable to associate the functional code, or type of functional code, to a process dependent on code or data used to identify functional code to be used to specialize the process.

In a nineteenth aspect, some embodiments comprise a computer-readable medium having stored thereon computer readable instructions that, when executed on a processing device, cause the processing device to perform any one or more of the methods defined in the embodiments of the previous aspects.

In a twentieth aspect, some embodiments comprise a system or device having a processor configured or programmed to carry out or execute any one or more of the methods defined in the embodiments of the previous aspects.

DEFINITIONS

The phrase "specialization process" or term "specializing" as used in this specification and claims is intended to mean, unless the context suggests otherwise, the process by which a newly created process, for example in the LINUX operating system layer of a LINUX-based operating system, identifies the corresponding application in the application layer to which it relates and then retrieves and loads the application-specific code for that application for execution, or similar such processes in other UNIX or LINUX-based operating systems, including the ANDROID operating system, iOS, Chromium, and Chromium OS.

The term "attached" or "attaching" as used in this specification and claims is intended to mean, unless the context suggests otherwise, creating a relationship between two processes in the LINUX operating system layer whereby one process is configured to monitor and control the other process in parent-child or master-target relationship, and by way of example includes attachment by way of a process trace system call, e.g. ptrace, or any other mechanism that creates a link or attachment between processes which enables one process to control one or more aspects or functions of the other process.

The term "LINUX" as used in this specification and claims is intended to mean, unless the context suggests otherwise, any LINUX-based operating system employing a LINUX operating system, or UNIX operating system, or a UNIX-like kernel.

The phrase "LINUX operating system layer" as used in this specification and claims is intended to mean, unless the context suggests otherwise, the layer in the operating system architecture for describing the operation of processes in User Mode (User Layer) and their interaction with the kernel in Kernel Mode (Kernel Layer).

The phrase "middleware layer" as used in this specification and claims is intended to mean, unless the context suggests otherwise, the layer in the operating system architecture for describing the software operating between the LINUX operating system layer and the application software in the application layer.

The phrase "application layer" as used in this specification and claims is intended to mean, unless the context suggests otherwise, the layer in the operating system architecture for describing the operation of user application software and services.

The phrase "mother process" as used in this specification and claims is intended to mean, unless the context suggests otherwise, typically the process running after boot-up of the operating system that controls the launch or initiation of all new children processes at the LINUX operating system layer via interaction with the kernel, and for example in the context of the ANDROID operating system is equivalent to the Zygote process which initiates new processes by forking a new replica or image of itself, and for example in the context of Chromium or Chromium OS is the equivalent of the main process running the browser which initiates new processes by forking or spawning a replica or image of itself, and may also be referred to as a "parent process".

The terms "fork", "forking", "forked" as used in this specification and claims are intended to mean, unless the context suggests otherwise, the creation or spawning of a new process, and where typically in a LINUX-based OS the new process is created or spawned by a mother process and starts as a replica or image of the mother process, but the terms are intended to refer to any other mechanism by which a new process is initiated or created.

The term "monitoring" as used in this specification and claims is intended to mean, in the context of a master-target process relationship, where the master intercepts, controls, modifies and/or traces system calls made by the target process to the kernel, and may also include or be referred to technically as "interposing" and/or "interleaving".

The phrases "System Call Interposition (SCI)" and "SCI mechanism" or "SCI configuration", as used in this specification and claims are intended to mean, unless the context suggests otherwise, the method of intercepting system calls initiated by a process by directly detecting and/or intercepting the system call made or invoked in the kernel mode of the LINUX operating system layer, including, by way of example but not limited to, the interaction between a shared object library and the system call gateway in the kernel, or direct system calls made to the system call gateway in the kernel from native code without using a shared object library, and where the SCI mechanism may be implemented by using ptrace for example or any other suitable interception mechanisms or systems.

The phrase "system call gateway" as used in this specification and claims is intended to mean, unless the context suggests otherwise, the entry point or an entry point in the kernel where system calls will or are executed.

The phrases "Function Call Interposition (FCI)" or "FCI mechanism" or "FCI configuration", as used in this specification and claims are intended to mean, unless the context suggests otherwise, the method of detecting or intercepting shared or dynamic library symbol invocations initiated by a process, and where the symbol invocations represent function invocations or function calls from the process to a shared object library in the user mode of the LINUX operating system layer, and where the set of monitored symbol invocations are those which may be intended to invoke one or more system calls in the kernel mode of the LINUX operating system layer.

The phrases "function calls", "symbol invocations", "shared or dynamic library symbol invocations" or "shared object library function calls" as used in this specification and claims are intended to mean, unless the context suggests otherwise, function invocations made by a process to a shared or dynamic library that may be intended to invoke one or more system calls in the kernel mode.

The term "symbol" as used in this specification and claims is intended to mean, unless the context suggests otherwise, an entry in a table of a shared or dynamic library that corresponds to or represents a function.

The phrase "policy database" as used in this specification and claims is intended to mean, unless the context suggests otherwise, any electronic source or combination of sources, whether stored locally on the device or accessible remotely, which contains data indicative of the security policy or policies configured or defined for applications running on the device, and may be in the form of or comprise a policy configuration file comprising data defining one or more security policies, a set of policy configuration files each comprising data defining one or more security policies, or any electronic source or form of accessible electronic security policy.

As used herein the term "and/or" means "and" or "or", or both.

As used herein "(s)" following a noun means the plural and/or singular forms of the noun.

The various embodiments comprise in the foregoing and also envisage constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of device running an Operating System (OS) such as by way of example, but not limited to, ANDROID operating system OS, iOS, Chromium, Chromium OS, or any other Linux-based OS, and by way of example the device may be, but is not limited to, a desktop, laptop, notebook, tablet or mobile device. The phrase "mobile device" includes, but is not limited to, a wireless device, a mobile phone, a smartphone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.).

BRIEF DESCRIPTION OF THE DRAWINGS

The various embodiments herein will be described by way of example only and with reference to the drawings, in which.

DETAILED DESCRIPTION

1. Overview of Security System

Figure 1:
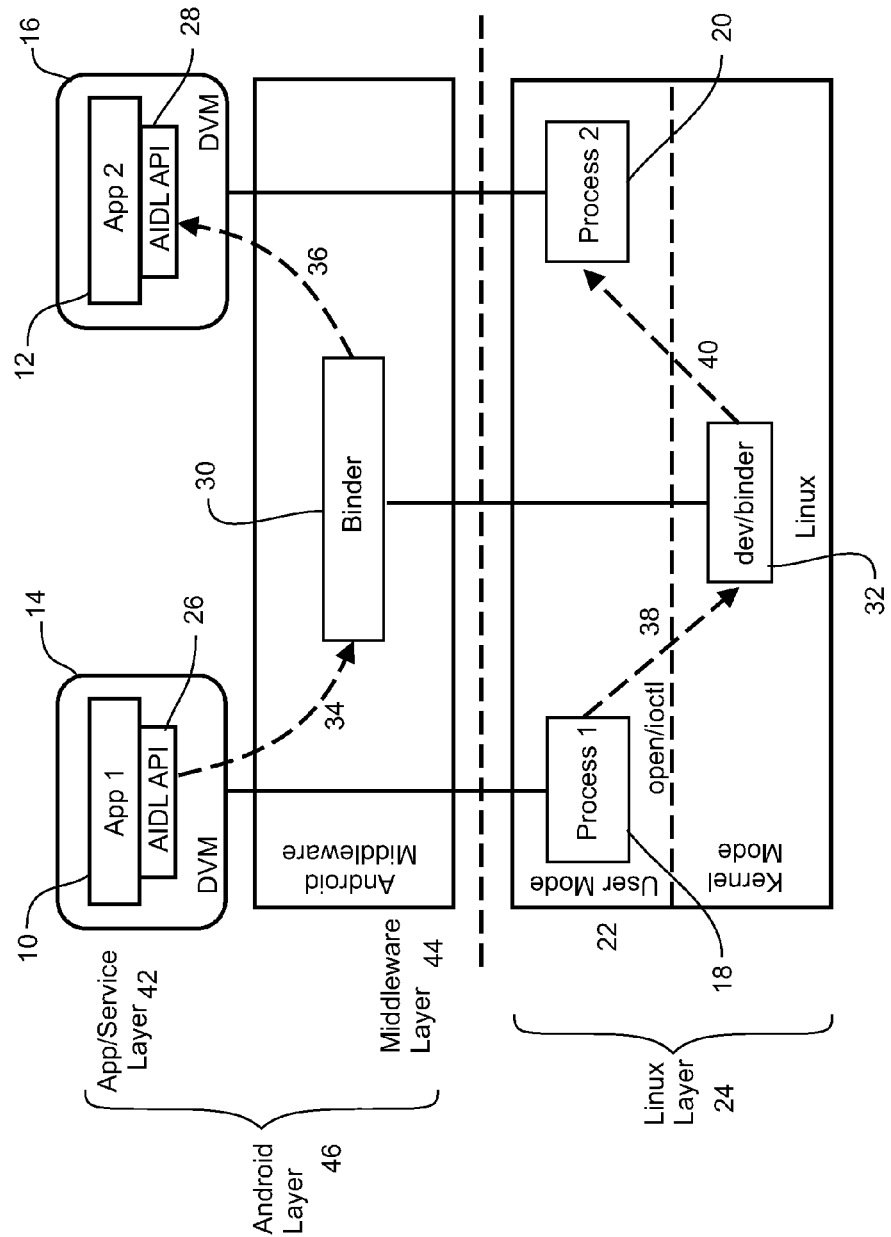
FIG. 1 is a schematic diagram of an ANDROID operating system and showing an example of the IPC mechanism.

In conventional UNIX and LINUX operating systems, security systems have been proposed to mitigate malware IPC attacks between application programs by intercepting system calls to the kernel. System calls are a key mechanism that need to be monitored because they can be used to access sensitive parts of the operating system that are controlled by the kernel, for example the file system, shared memory, network connections and the like. For setting security policies it is often necessary to know which application has invoked a specific system call. In the ANDROID OS, an application may include one or multiple processes. In turn, each process may run one or multiple threads concurrently to execute instructions, some of which may be trigger system calls that interact with the kernel. In conventional UNIX and LINUX operating systems the name of a process is known to the kernel as the binaries are launched by the user via a shell. The security system monitors all system calls and based on the relevant policy specified for a process they are either allowed or blocked. This prevents malicious processes from executing illegal system calls, while allowing normal processes to carry out their functions. Such security systems do not work on the ANDROID operating system, which uses a distinctly different way of launching and managing its applications. In particular, the kernel is not aware of which processes corresponds to which application in the ANDROID operating system layer until a very late stage and therefore determining which applications may be attempting to communicate with each other via system calls is very difficult to ascertain.

The present subject matter relates to a security system for the ANDROID operating system or other computer architectures having similar structures or configuration. The security system utilizes an approach that allows monitoring user space code without the need to modify the ANDROID operating system framework or the underlying LINUX operating system kernel. In particular, the security system provides a way to be configured to control Inter-Process Communication (IPC) or Inter-Component Communications (ICC) between applications to mitigate attacks that malware might perform on sensitive applications and their data. In principle, some embodiments herein are able to control and enforce security policies to any process running on an ANDROID OS. This includes system services that are offered in the stock ANDROID operating system (such as SMS service, Activity Manager, Service Manager, etc.). In this way, various embodiments mitigate vulnerabilities present in the ANDROID operating system services that might be exploited by malicious code.

The security system is implemented based on a feature unique to ANDROID operating system, namely the mother process called Zygote. Every ANDROID operating system application is run as a child process forked out from the Zygote mother process and then it specializes itself into the specific application by loading the specific application package and all the classes within it, and making use of Java reflection it will eventually start the application by invoking the static main method. In general, each time a new application is launched, the security system utilizes the Zygote process to configure a monitoring entity associated to the newly launched process at the LINUX operating system layer. This monitoring entity may in one form be an embedded process monitor method or function, such as additional code added to the new process' image in memory or, alternatively, in another form a separate process that is attached to and monitors the newly launched process. The security system is able to enforce a set of security policies, which can be provided by sources internal or external to the security system itself, such as a systems administrator, the device user, a third party service or system, an ANDROID operating system application, or a combination of these.

The security system enables the specification or configuration of application-specific security policies at the application layer, which can be enforced in the LINUX operating system layer. The security system will be described by way of example with specific reference to an ANDROID operating system on a device running the ANDROID operating system. However, it will be appreciated that the security system may be configured to operate on any other suitable operating system having a similar architecture to the ANDROID operating system or any other operating system or platform that, whether mobile or otherwise, uses a mother process to launch new processes in the LINUX operating system layer such as, but not limited to, the LINUX operating system, a UNIX operating system, or mobile operating systems like iOS for example.

The security system can be configured to monitor system calls that are performed by the kernel on behalf of processes. In particular, the security system is configured to monitor and implement security actions for system calls made by processes based on a security policy setting for the application corresponding to the process. The security action may include preventing system calls from executing, modifying system call parameters, modifying the returning values of the system calls, allowing system calls to execute depending on the security policy prescribed for the process initiating the system call or forcing the finalization of the process.

System calls are special functions that are performed by the Kernel on behalf of processes. They are viewed as low level operations that the Kernel executes as services for the processes to provide access to services managed by it. System calls are usually made available to user mode code through a system call number and a hardware interrupt, and are frequently invoked through library functions that are linked against the process code. In the Executable and Linkable Format (ELF), libraries are a special type of object code, which provides reusable symbols that can be imported from other object code. A special case of libraries are shared objects (or shared libraries), which are intended to be shared by executable files and other shared objects.

Shared objects can be either statically or dynamically linked. In the former case, the symbols are copied into the object file during linkage time, while in the later the symbols are resolved during execution. Dynamically linked symbols can be resolved either during the process image load into memory or the first time they are used, which is known as lazy binding.

The libc library is a common component on all LINUX-based systems, and amongst other things, it provides a set of functions that can be used to invoke system calls from user mode code. The ANDROID operating system provides its own libc implementation, namely Bionic libc. A special feature of the ANDROID operating system, compared to a normal LINUX operating system configuration, is that the libc is linked dynamically to reduce the process memory footprint. This means that those symbols that are usually used by executables to invoke system calls are linked dynamically.

Figure 2:
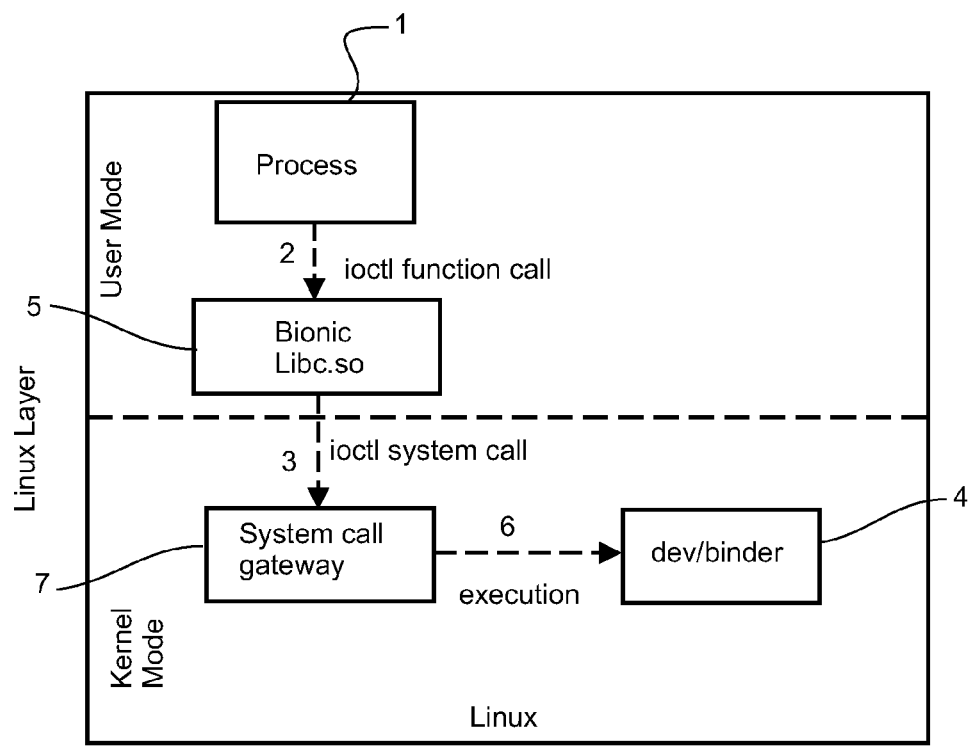
FIG. 2 is a schematic diagram showing the interdependency between shared library function call and system call mechanisms in the LINUX operating system layer.

FIG. 2 provides an overview of this system call mechanism. By way of example, when a process 1 performs an ioctl system call 3 to the Binder 4, it actually invokes the ioctl function (2) provided by the libc.so 5. This function will invoke the ioctl system call 3 in the kernel and the operation will be executed 6 in supervisor mode.

The security system may monitor and intercept system calls made by monitored processes using various methods or a combination of methods, and may optionally dynamically switch between these methods in some embodiments. In a first example configuration, the security system may be configured to monitor system calls by performing System Call Interposition (SCI) which involves directly intercepting the interaction between the shared object library 5 and the system call gateway 7 in the kernel mode of the LINUX operating system layer. In particular, the security system may implement an SCI mechanism that monitors the execution of processes and directly detects and/or intercepts the system call 3 through the system call gateway 7 in the kernel mode of the LINUX operating system layer. Alternatively, in a second example configuration, the security system may be configured to monitor system calls by performing Function Call Interpositions (FCI) which involves intercepting function calls 2 from the process 1 to the shared object library 5 in the user mode of the LINUX operating system layer, where the set of function calls being monitored relate to those used to invoke system calls in the kernel mode. In particular, the security system may implement an FCI mechanism that monitors the execution of processes and detects and/or intercepts function calls to shared object libraries in the user mode that are intended to invoke system calls in the kernel mode.

Figure 13:
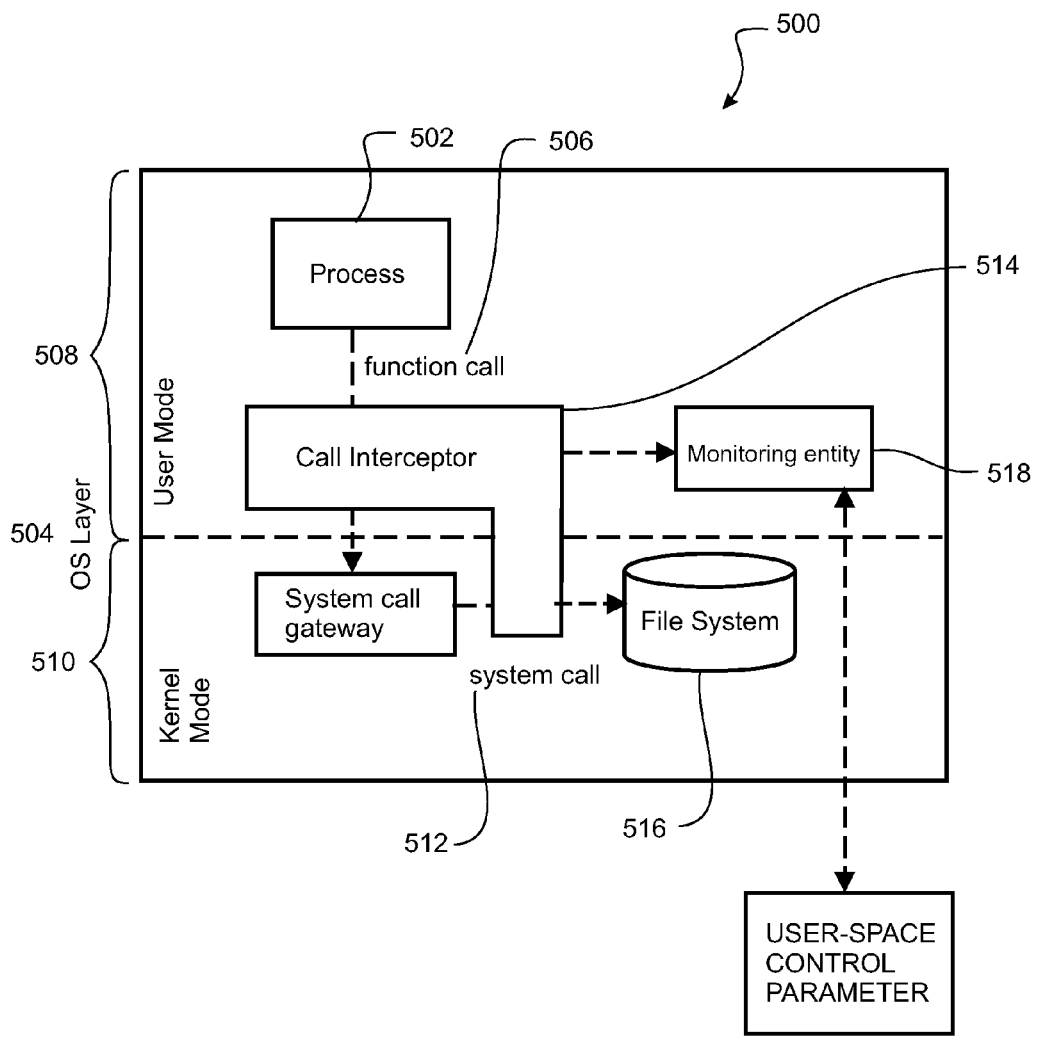
FIG. 13 is a schematic diagram of a security system adapted to provide virtualization for different user-space instances in a third embodiment.
Figure 14:
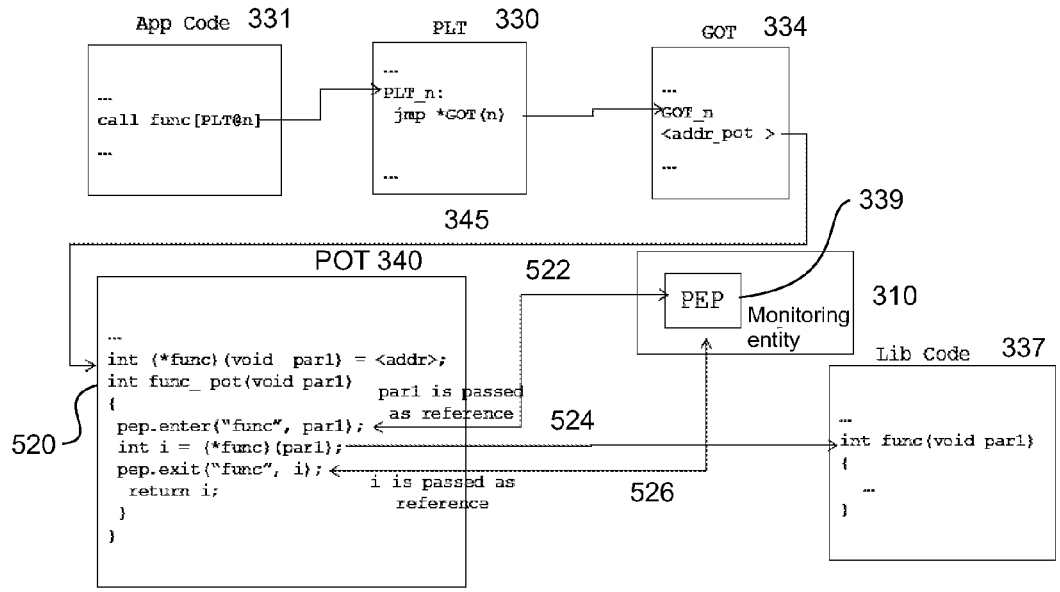
FIG. 14 is a flow diagram showing the system operations carried out when implementing an FCI mechanism to provide virtualization in the third embodiment security system.
Figure 15:
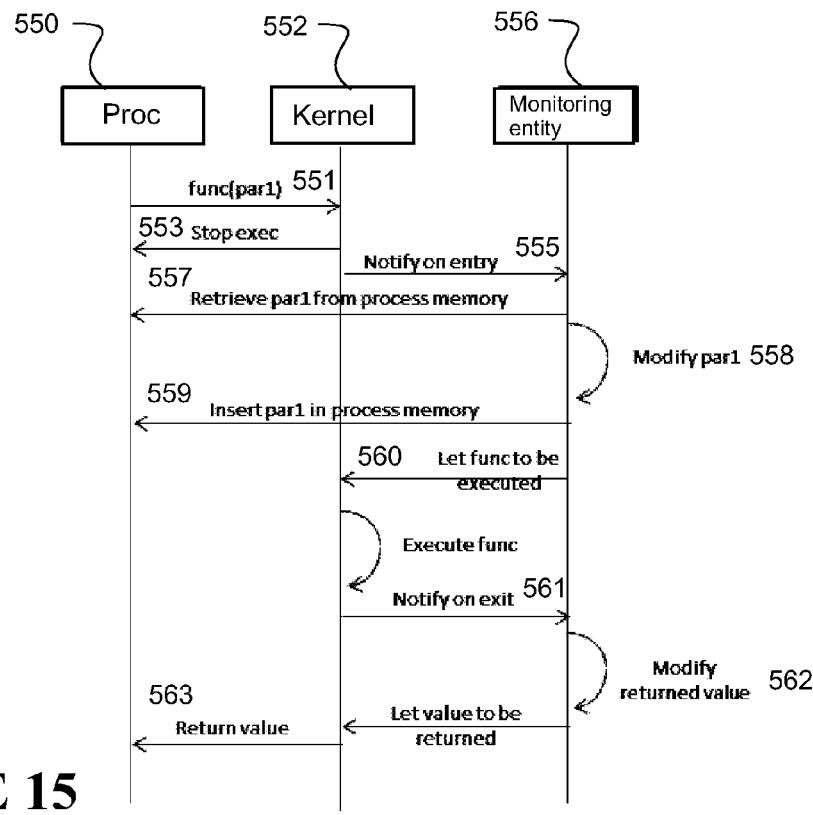
FIG. 15 is a flow diagram showing the system operations carried out when implementing an SCI mechanism to provide virtualization in the third embodiment security system.

With reference to FIGS. 3-7, a first embodiment of the security system utilises SCI mechanisms or configurations will be described. With reference to FIGS. 8-11, a second embodiment of the security system will be described which utilises FCI mechanisms or configurations. With reference to FIGS. 13-15, a third embodiment of the security system will be described that provides virtualization for different user-space instances on the device using the SCI and/or FCI mechanisms of the first and/or second embodiments.

2. First Embodiment Security System—SCI Configuration Overview

In this first embodiment, the security system runs a system process that attaches to the Zygote process and intercepts all its fork system call invocations, so that whenever a fork system call is intercepted, the security system starts monitoring the new process and enforcing the specific security policies for that specific ANDROID operating system application.

In this first embodiment, the security system generates a separate process monitor (monitoring entity) for monitoring each newly launched process in the LINUX operating system layer. Each process monitor is configured to implement an SCI mechanism to monitor and intercept system calls made by its target process.

In this first embodiment, the security system uses the support of the system call gateway to monitor system calls to the kernel. The security system configures or instructs the system call gateway to send a special signal to the process monitor associated with a target process each time that target process tries to invoke a system call in the kernel mode. In one example, this is achieved through the use of the ptrace system call. When a process monitor invokes ptrace to attach to a target process, each time the target process invokes a system call the gateway will suspend the target process and send a signal to its process monitor, and will then await a security action from that process monitor. The use of ptrace as an SCI interception mechanism will be described in more detail later.

The first embodiment security system will now be described in further detail with reference to FIGS. 3-7.

Main Components of Security System

Figure 3:
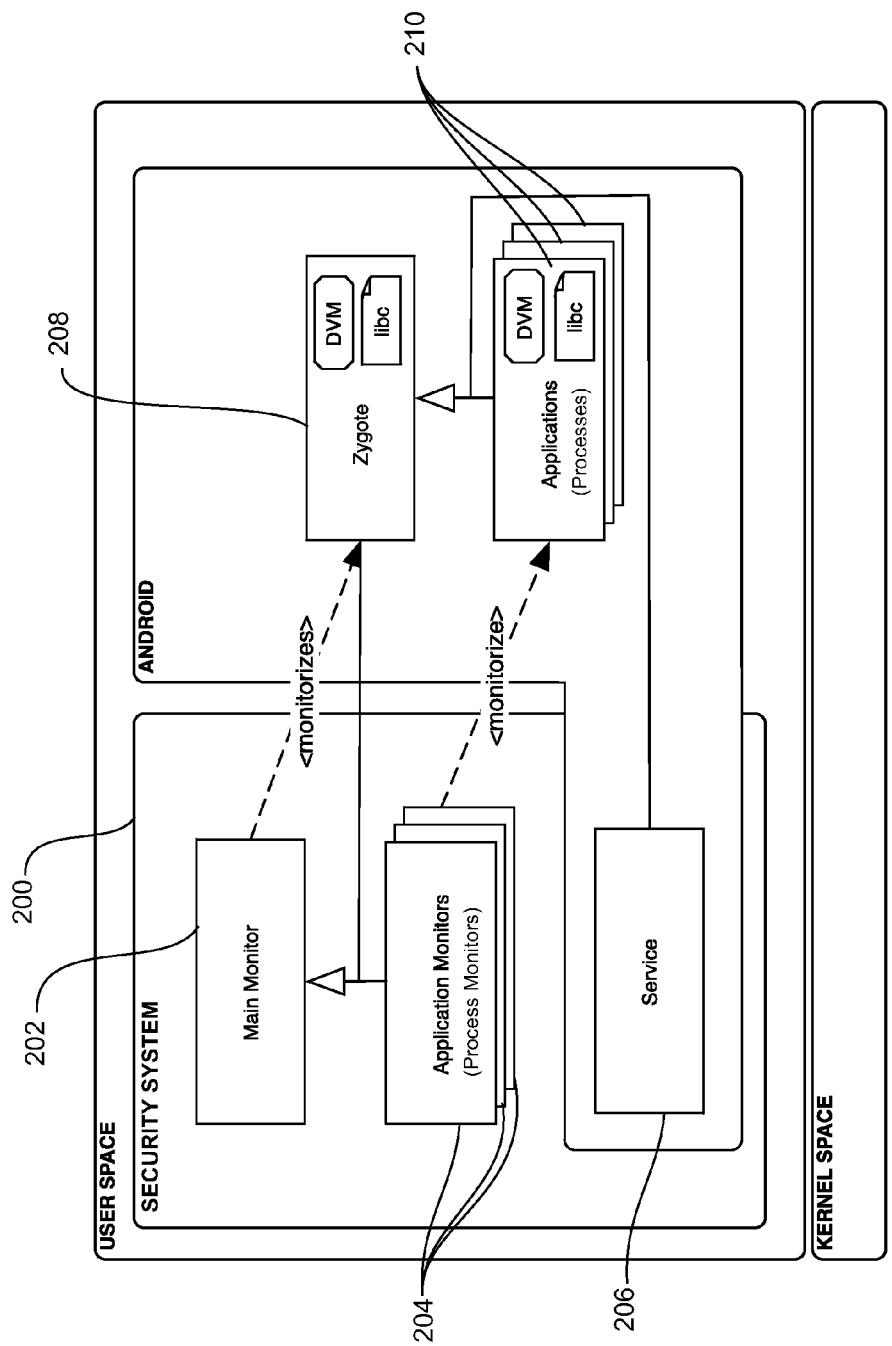
FIG. 3 is a schematic diagram of the framework basic architecture for the security system in accordance with a first embodiment which is based on System Call Interposition (SCI)

Referring to FIG. 3, the first embodiment security system 200 comprises three main components or modules, namely a main monitor 202, application or process monitors 204, and a security system service 206.

The monitors 202, 204 (monitoring entities) are in charge of enforcing a set of security policies for one or more processes and are implemented as LINUX operating system processes. The monitors contain the policy enforcement point as well as the policy decision point, which will be described later. In this embodiment, there is a single main monitor 202 that is configured to monitor the Zygote system process 208. The rest of the process monitors 204 are forked out of this main monitor process. There may be zero or more application monitors 204, one for each ANDROID operating system application 210 that is forked out of the Zygote process. Process monitors 204 are created as children of the main monitor 202 when a fork system call from the Zygote process is intercepted. In contrast to the main monitor 202 that is configured to monitor the main Zygote thread, the individual process monitors 204 are configured to monitor all threads and sub-processes that belong to the application which they are attached.

The security system service 206 is configured as an ANDROID operating system service in the Application layer that provides access to all the ANDROID operating system framework functionality in the ANDROID operating system layer to the monitors 202, 204. In this embodiment, the monitors 202, 204 in the LINUX operating system layer communicate with the security system service 206 in the Application layer using a client-server communication configuration such as, but not limited to, internal UNIX sockets.

Example Configuration and Operation

Figure 4:
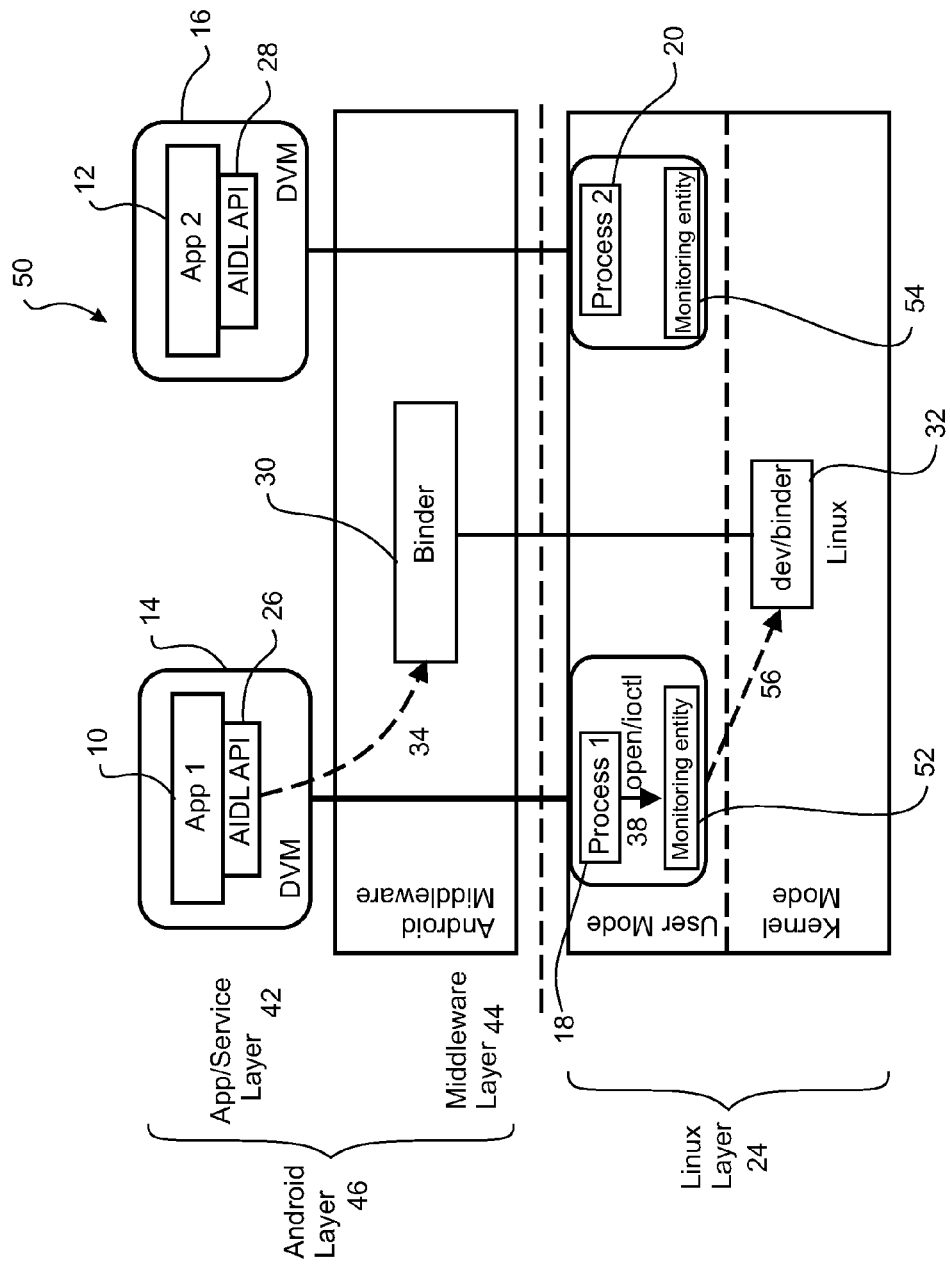
FIG. 4 is a schematic diagram showing the ANDROID operating system of FIG. 1 implementing the first embodiment security system.

Further explanation of the security system configuration and functionality of the main modules will now be described with reference to the example in FIGS. 4-6. FIG. 4 corresponds to the architecture described in FIG. 1 and like numerals represent like components. In brief, each LINUX operating system process 18, 20, in the LINUX operating system layer that belongs to an ANDROID operating system application 10, 12 has its own attached process monitor shown at 52, 54 respectively. Each process monitor 52, 54 is configured to intercept all or a subset of the system calls that the attached LINUX operating system process 18, 20 executes on behalf of its associated application 10, 12. When each LINUX operating system process executes a system call, the attached process monitor intercepts the system call and undertakes a security action based on a security policy associated with the application, which indicates whether the LINUX operating system process has authorization to execute that system call. By way of example, the process monitor may be configured to allow the system call, block the system call, modify the parameters of the system call, modify the values returned by the system call or other suitable security action, or a combination of these. If the LINUX operating system process is authorised to execute the system call, the process monitor lets the execution of the system call proceed. Alternatively, the process monitor may block the system call from executing or otherwise modify the system call parameters or return values. For example, the process monitor is able to retrieve the parameters of the system call and additionally the values that the system call returns. This enables the process monitor to modify the system call, for example by filtering out one or more return values or changing or modifying one or more parameters of the system call prior to execution depending on the configured security policy for the application. Additionally, security actions can be taken depending on the value of a system call's parameters. By way of example, the process monitor may be configured to modify the system call rather than blocking the system call for application that may crash as a result of a blocked system call.

By way of example, the process monitor 52 may be configured to intercept IPC, which uses system calls 34 to interface the Binder subsystem 30. This can be done by intercepting the open and ioctl system calls 38 which destination is the binder kernel driver 32. The process monitor 52 then decides based on the security policy configured for the associated application 10 in the application layer and other parameters extracted from the process execution state whether to block the system call or otherwise allow the system call to proceed in its original or a modified state as shown at 56.

Each process monitor is created by the main monitor which is a LINUX operating system process created at boot-up of the device before the initiation of any application and which will be explained in further detail later. The security policy dictating the authorizations of applications installed on the device in the application layer and in particular which application may communicate with each other or employ each other's services or permissions or other sensitive stored data is configurable and stored and/or retrieved by a security system server in the application layer which will be described in further detail later. The security policies may be stored in memory locally on the device or remotely on an external storage capacity, server or network accessible by the device.

Each process monitor is attached to its corresponding LINUX operating system process by establishing the process monitor as the master process and associated LINUX operating system process as its target process and using a tracing system call that is configured to enable a master process to control a target process by inspecting its memory and registers and intercepting its system call invocations. In this embodiment, the tracing system call is the process trace system call (ptrace). To use ptrace, the master process has to be either running as the root user or the same user as the target process. The master process will become the parent of the target process and will be able to monitor and control all the child processes and threads that are created by the target process.

As mentioned, the security system is configured to monitor all applications and corresponding processes executed on the device running the ANDROID operating system by exploiting a configuration feature of the ANDROID OS, which controls the management and launching of applications. In the ANDROID operating system, all applications in the application layer are launched by a special mother process, known as the Zygote process. The Zygote process is the only process that has the right to create a new ANDROID operating system application and its corresponding LINUX operating system process. Hence, all ANDROID operating system applications and their corresponding LINUX operating system processes that execute on the ANDROID operating system are in practice children of this Zygote process. The configuration of the security system and operation of the main modules will now be described in further detail.

Security System Start-Up

The security system starts as a part of the ANDROID operating system. As mentioned, the security system controls the mother or Zygote process so that every time a new LINUX operating system process (corresponding to an ANDROID operating system application) is started, a new monitor can be attached to the process. Controlling the Zygote processes achieved by modifying the booting sequence of the ANDROID operating system.

By way of example, the booting sequence is modified such that the main monitor of the security system replaces the initial Zygote process. During the boot process the initialization script is run and the main monitor is started. The Zygote process is then launched as a child of the main monitor. The main monitor then executes a tracing system call, such as ptrace(request=PTRACE_ATTACH), to attach to the child Zygote process to control its execution from the first moment it begins, by intercepting system calls to the kernel made by the Zygote process. In particular, the ptrace (request=PTRACE_SYSCALL) system call is used to notify the kernel that the main monitor should receive a notification every time the target Zygote process enters or exits to and from a system call. At this point in boot-up, the main monitor is now attached to and monitoring the Zygote process.

In this embodiment, the security system service is also started by the ANDROID operating system during the boot process. By way of example, the security system service is located within the directory for system applications such that it launches before a user can log-in or any user application can be run on the device running the ANDROID operating system. Once the security system service is running, every time a new ANDROID operating system application is forked from Zygote, a new process monitor is forked from the main monitor and attached to the new application process, as explained in further detail next.

Generation of Process Monitors for Newly Launched ANDROID Operating System Applications Overview The sequence of main operations executed by the security system to generate and configure a process monitor for a newly launched ANDROID operating system application will be described. When the security system starts, only the main monitor process is running, along with the security system service. The main monitor is attached to and monitoring the Zygote process. New process monitors are created as children of the main monitor as a result of the fork system call invocations made by the Zygote process, which is called every time a new application is launched in ANDROID operating system. In particular, the main monitor is configured to detect the fork system call invocations made by the Zygote process, and create a new process monitor for each new application launched.

Figure 5:
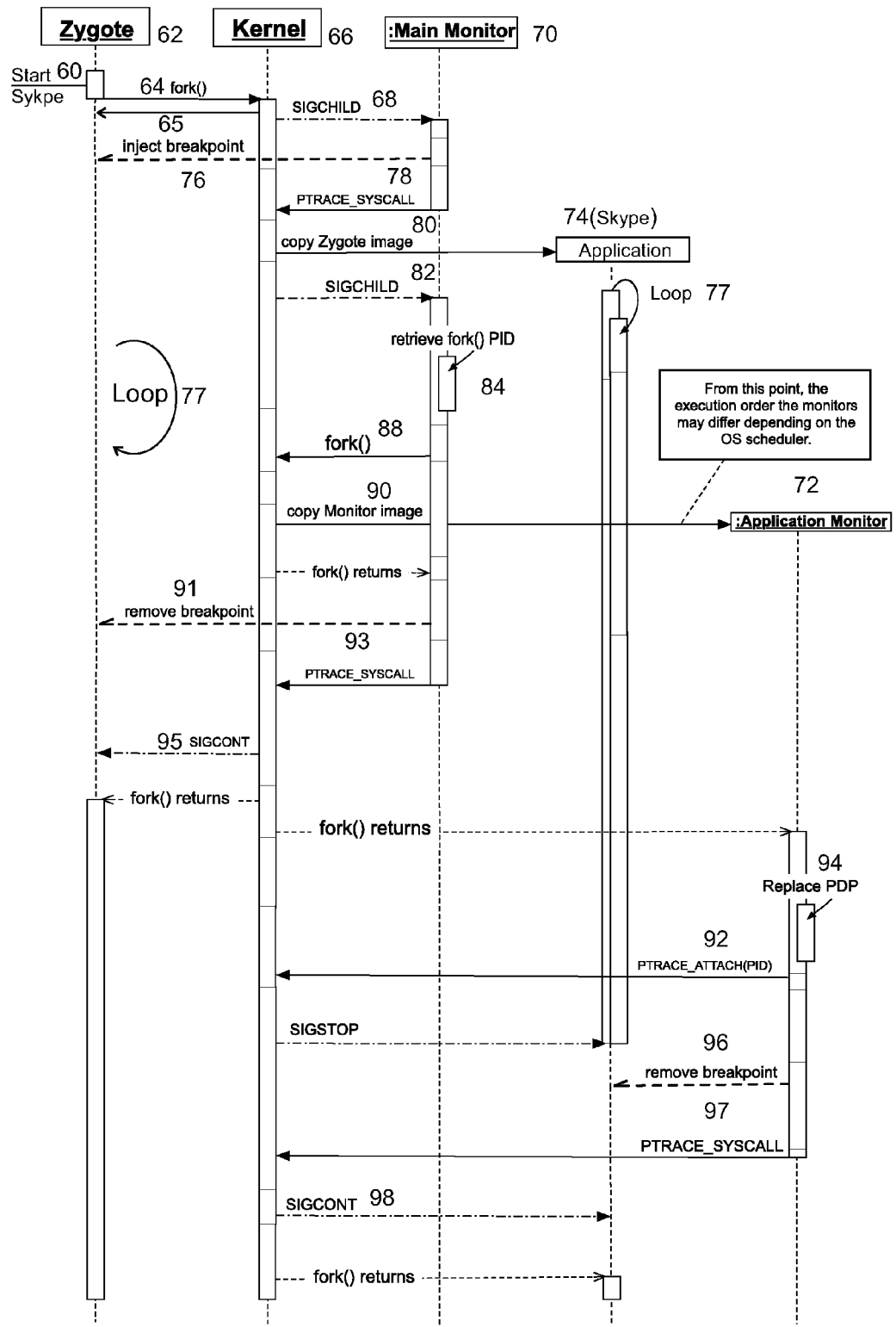
FIG. 5 is a flow diagram of the system operations carried out by the first embodiment security system when creating a new process monitor for a newly launched application on a device running the ANDROID operating system.
Figure 6:
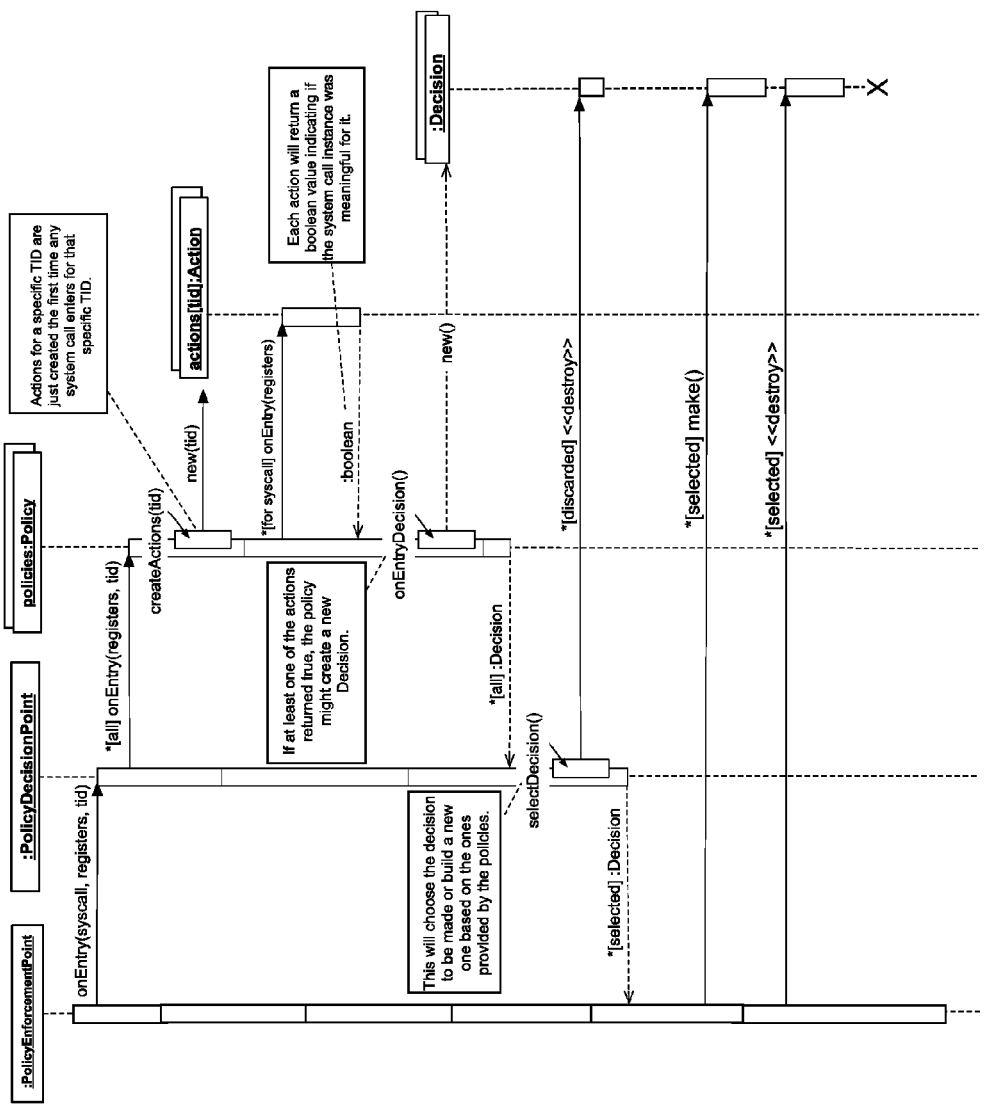
FIG. 6 is a flow diagram of an example decision generation process in the first embodiment security system.

Referring to FIG. 5, the scenario of a user launching the Skype application on their smartphone running the ANDROID operating system will be used by way of example. When the user clicks on the Skype icon on their smartphone a message or signal 60 is sent to the Zygote process 62 to fork a new process 74 that executes in a copy of the DVM for the Skype application.

Every time Zygote 62 invokes a fork system call 64, it will be suspended 65 by the kernel 66 and the main monitor 70 will be notified by the kernel via a signal 68 (e.g. SIGCHILD) and woken up. The kernel dispatches these signals because the main monitor 70 is monitoring Zygote 62 through the ptrace system call. A new process monitor 72 is now be created by invoking the fork system call from the main monitor 70 and once forked, it will attach to the newly created process 74.

Due to the scheduling performed by the LINUX operating system scheduler, there's no way to guarantee that the process execution order will allow the new process monitor 72 to attach to the new LINUX operating system process 74 corresponding to the Skype application before it executes any system calls. In some circumstances, the new process 74 could start executing its code without the process monitor 72 be able to control it, which could lead to security issues.

In order to avoid this situation, the main monitor is configured to inject a breakpoint 76 (e.g. an endless loop 77) into the Zygote process code, so that when its image is duplicated to create the new process 74, the new copy will contain that breakpoint as well. The new process 74, now containing the breakpoint 77, is initially stuck inside it, so will not be able to execute any other code until the breakpoint is removed by the process monitor. This is performed right after the process monitor 72 has effectively attached by means of ptrace to the new process 74. By way of example, the breakpoint may be a breakpoint machine instruction, an infinite loop in ARM assembly code or any other equivalent method of stalling program execution on processors that use other instruction sets. An example of the breakpoint injection for this embodiment and the remaining process monitor 72 generation will be further described below.

Breakpoint Injection

As set out above, every time a new ANDROID operating system application 74 forks from Zygote 62, the security system injects a breakpoint 76 into Zygote 62 so that when its image is duplicated, the new process 74 will contain the breakpoint as well and the new process monitor 72 can attach to it before it continues its execution without missing any system calls.

As mentioned, the "breakpoint" 76 may be, for example, an infinite loop in ARM assembly code. The breakpoint is injected 76 at the current program counter address (PC) within the Zygote process memory as follows using the following procedure. Firstly, in order to resume the Zygote program execution, the state of Zygote registers should be backed-up in the memory of the main monitor 70, as well as the Zygote program code that will be replaced by the breakpoint itself. By way of example, the main monitor 70 may copy part of the Zygote process image into its own memory using ptrace(PTRACE_PEEKDATA) which allows to read data from the monitored process memory, in this case Zygote. The main monitor may read and store the state of the Zygote process registers in its own memory using ptrace (PTRACE_GETREGS). After this, the main monitor 70 is configured to reset the PC to its previous address (that will later contain the breakpoint) so that it continues its execution at the breakpoint code injected. The register R1 of Zygote 62 is set to zero using ptrace(PTRACE_SETREGS), which enables the breakpoint. Next, the main monitor is configured to inject the breakpoint code into Zygote. The main monitor 70 contains a function that contains inline ARM assembly code that executes an infinite loop (based on the value of R1), and this is the code that is injected into the Zygote process memory. The breakpoint function machine code is obtained from the function address in the main monitor memory as an array of bytes. Then the breakpoint code is copied from the main monitor memory into the Zygote memory at the program counter address using ptrace(PTRACE_POKEDATA) which allows the tracer to insert data into the monitored process memory space.

New Process Creation, after Breakpoint Injection

Once the breakpoint code has been inserted into Zygote as above, the main monitor 70 invokes ptrace(PTRACE_SYSCALL) 78 to notify the kernel to allow the kernel space code of the Zygote fork system call to execute. As the fork system call executes 80, a new process 74 (intended to eventually be Skype in this example) is created. The new process 74 is a clone of Zygote 62, which means that it is a duplicate of the Zygote process image in memory, including the injected breakpoint. The newly created process 74 may then run, but will be stalled in the breakpoint loop 77. The main monitor 70 is then configured to wait until it receives the fork system call exit notification. In particular, the main monitor 70 is configured to monitor for the exit notification and intercept it.

New Process Monitor Creation

When the fork system call returns in Zygote (the system call is exiting), the process will be still stopped 66 and the kernel will notify the main monitor 70 via signal 82 (e.g. SIGCHILD). At this point, the Process Identification (PID) of the new process 74 is already available as it's provided as the return value of the fork system call. Each process has a unique PID that allows the kernel to identify the different processes running. The main monitor 70 is configured to retrieve the PID of the new process 74 as shown at 84 from Zygote. For example, the main monitor 70 may retrieve the PID from the Zygote process register R0 using ptrace(PTRACE_GETREGS). The main monitor 70 is then configured to generate a new process monitor 72 which will attach to that retrieved PID.

The main monitor 70 forks the new process monitor 72 by executing a fork system call 88 to the kernel 66. When the main monitor process forks 90 a new process, the newly created process monitor 72 is at the beginning of its execution an exact replica of the parent main monitor process. This means that when the main monitor 70 forks the new process monitor 72, the process monitor has in its memory the PID of the new process 74 (intend to eventually be Skype) created by Zygote 62 and retrieved from the Zygote registers.

The main monitor 70 is then configured to replace the breakpoint code in Zygote 62 with the original code backup at the original location using ptrace(PTRACE_POKEDATA) and resets the registers to their original stored values using ptrace(PTRACE_SETREGS) as shown at 91. The main monitor then resets the PC of Zygote to its backed up value and requests the kernel to continue the Zygote process by means of ptrace(PTRACE_SYSCALL) 93, resuming the Zygote process via a SIGCONT signal 95, and waiting for further fork invocations.

The newly created child process monitor 72 uses the PID in its memory to attach itself to trace the new Skype process using ptrace(PTRACE_ATTACH) as shown at 92. The process monitor 72 is also configured to replace a main dummy policy decision point from the main monitor with one specific for application it is monitoring as shown at 94, which will not yet contain any security policies until the application package name (in this case Skype) associated with the monitored new process 74 is known. Once attached, the process monitor 72 is able to trace the new process 74, so it can be configured to replace the breakpoint code in the new process 74 with the original code as shown at 96, and initiate execution of the new process by means of ptrace(PTRACE_SYSCALL) 97, which will deliver SIGCONT 98 to the new process 74. This is done in a similar manner to the way the main monitor 70 replaced the breakpoint code in the Zygote process 62, as discussed above. The monitored new process 74 can now start executing. As the process monitor 72 is attached to the new process 74, it can intercept and control all the system calls that this process executes.

Configuration of Security Policy for New Process Monitor

At this point, there will be the main monitor 70 tracing/monitoring Zygote 62, and a new process monitor 72 tracing/monitoring the newly created LINUX operating system process 74 which hasn't specialized into the Skype ANDROID operating system application yet. The new LINUX operating system process 74 is not yet executing the code of the Skype application and at this early stage there's no way to know which application the process will belong to. This means that the specific security policy for the new process monitor 72 cannot be loaded until the new process 74 specializes. The security system is configured to retrieve and load a specific security policy or set of policies to the new process monitor 72 based on application identification data that is indicative of the ANDROID operating system application the new LINUX operating system process 74 is specializing as. In this embodiment, the application identification data is the application's package name and the process monitor 72 is configured to retrieve this during the specialization of the new process 74 it is monitoring.

To specialize, the new process 74 needs to retrieve the get access to the Skype application package name so that it can then load the Skype application specific bytecode from the application database on the device for execution. During the specialization process or stage, the ANDROID operating system framework writes the application's package name into a specialization file (e.g. /proc/self/cmdline within the /proc pseudo-filesystem). This occurs right after the new process 74 is forked and before the static main method is invoked using reflection, which means that no developer code has been executed yet.

The ANDROID Process Java class (android.os.Process) invokes, through the Java Native Interface (JNI), the function android_os_Process_setArgV0 setting the package name as parameter. This will internally call the ProcessState::setArgV0( ) method which resets the process argv[0], which effectively changes the specialization data file (i.e. updates it with the application's package name) and then after this sets the process name by using the prctl(PR_SET_NAME) system call. The process name that can be set through the prctl( ) system call is limited to 16 bytes, which means that in some cases, the package name in this system call might not be complete. There are no system calls generated by the monitored process 74 when the argv[0] parameter is set into the specialization data file, which actually contains the whole package name.

In this embodiment, instead of checking the application name specified by the prctl( ) function parameters, the process monitor 72 is configured to read the contents of the specialization data file which contains the full application package name, set when the argv[0] was overwritten. In particular, the process monitor 72 is configured to detect when the prctl( ) system call is exiting with the PR_SET_NAME value set. Once this is detected, the process monitor 72 knows that the full application package name has now been written to the specialization data file. The process monitor 72 is configured to then read and retrieve the full application package name from the specialization data file upon detection of the prctl( ) system call exiting.

Once the package name (e.g. com.skype.apk) has been obtained by the process monitor 72, it can then retrieve and load the security policy or policies specific to that application. In particular, the process monitor policies can be initialized and policies can be enforced specific to that process. The package name is forwarded to the process monitor's policy decision point, which will load the specific policies for the monitored process. To do this, the process monitor 74 may make use of a special service in the application layer framework called the security system service, which will be described in further detail later on.

Operation of Monitors

Overview

Each process monitor is configured to enforce the retrieved security policy for its attached new process by implementing a security action at the LINUX operating system layer in regard to the detected system call based on the retrieved security policy. The security action may comprise any one or more of the following: allowing the system call to proceed, blocking the system call from proceeding, or modifying parameters of the system call prior to execution or return values generated by the system call after execution. By way of example, the monitor process may implement a security action by instructing and controlling the kernel in regard to its execution of the requested system call by the attached monitored process. An example implementation of the enforcement of policies is explained below, although it will be appreciated that alternative enforcement mechanisms may be used.

In this embodiment, the main monitor and process monitors each contain two components, namely a policy enforcement point and a policy decision point. The policy enforcement point is in charge of tracing the monitored process through its system calls and enforcing the policies and provides the information from the process state to the policy decision point. The policy decision point generates decisions based on the process state and the policies assigned to it. These decisions are sent to the enforcement point, which makes sure they are enforced.

The policy decision point uses a policies repository, which depends on the security system configuration for each decision point, and that might change on runtime if the configuration is eventually modified. Depending on which type the monitor belongs to (e.g. main monitor or an individual process monitor) it will contain a different type of policy decision point.

The main monitor contains a dummy decision point that is used to intercept the fork( ) system call and retrieve the PID of the new process in order to generate new application process monitors, as explained previously.

In contrast, the process monitors are able to retrieve the application package name associated with their respective target process and perform the policy initialization. By way of example, there may be various types of policies supported by the process monitors, such as:

IPC interception: Intercepts Inter-Process Calls generated from the monitored process. In order to do so, it intercepts those ioctl( ) system calls which destination is the Binder pseudo-device (/dev/binder).

Networking: Controls communication through TCP/IP or other network protocols between different processes running either locally or remotely. This includes control over which external servers, clients or peer to peer networks (for example over the Internet) a process can contact.

Shared memory: block inter-process communication through shared memory. Specifically block access to the various ANDROID operating system shared memory services, ANDROID operating system shared memory (ashmem), Process memory allocator (PMEM and processor specific variants (CMEM, NVMAP, etc.) and the Android ION memory allocator. Furthermore, a child process can be prevented to use shared memory mechanisms with its parent.

File system: Block certain processes to access, create, read, modify and/or write to a specific file or folder in the file system. Establishes disk quotas for a given application and can provide a sandboxed environment so that each application has access to its own virtual file system.

Telephony, Short Message Service (SMS) and Multimedia Messaging Service (MMS): block a process to access Telephony, SMS and/or MMS services on the ANDROID operating system. If needed, a policy can be set to prevent that a process initiates Telephone calls or sends SMS or MMS messages to a specific number or contact.

Subscriber Identity Module (SIM) access: block a process from accessing sensitive information from the SIM card installed in the device; such as the Integrated Circuit Card Identifier (ICCID), International Mobile Subscriber Identity (IMSI), Authentication key (Ki), Location Area Identity (LAI), stored SMS messages, Unstructured Supplementary Service Data (USSD) codes and contacts lists.

Sensor and other hardware access: block a process from accessing sensors and other types of input or output hardware that may be present in the device; such as camera sensors, microphones, light sensors, Global Positioning System (GPS) receiver, motion sensors, accelerometers, gyroscopes, keyboards, buttons, displays, projectors, printers.

Near Field Communication: block a process from using Near Field Communication (NFC) or other types of wireless communication to establish a new connection or monitor a communication session that is already in progress.

These policies are loaded with the specific policy configuration associated with application package name in a policy database, stored on the device or remotely accessible. The policies may be modified and updated during the application execution if desired. Some policies, or any other components within the monitors, may need to get access to functionality that is only available from the ANDROID operating system application layer but not from the native code layer, such as access to the GUI or the different ANDROID operating system services like the Package Manager, Activity Manager and so on. The monitors can use such ANDROID operating system Framework functionality through querying the security system service running in the application layer using transactions, as will be explained further later.

Policy Enforcement Mechanism

As discussed, the main monitor 70 and process monitors are processes in the LINUX operating system layer that are attached to Zygote and any application processes, respectively. A tracing system call is used to attach the main monitor 70 and process monitors to their respective target processes. In this embodiment, the process trace (ptrace) system call is used to attach the main monitor 70 to its target process, namely the Zygote process 62, and each process monitor to its respective target processes. The target processes become the child of their respective monitor or parent process once the ptrace system call is executed to attach the monitor to the target.

In regard to the process monitors, ptrace is configured to trace the target process main thread (by default) and also the rest of process threads and sub-processes, in this embodiment. Such tracing is helpful in some embodiments, such as with regard to ANDROID operating system applications, which are typically multi-threaded applications. By configuring ptrace in such way, this ensures that the process monitors will receive notifications of any system calls executed by every single thread and process that descends from the root application process.

The policy enforcement mechanism takes place in the policy enforcement point within each monitor. The policy enforcement point enforces the policies by tracing the monitored process system calls, and making decisions based on the information that can be extracted from them.

The process monitors attach to their respective target processes (using e.g. ptrace(PTRACE_ATTACH)) and then they notify the kernel they should be notified every time their target process executes a system call (using e.g. ptrace(PTRACE_SYSCALL)).

Once this setup has been performed, the process monitors go to sleep (e.g. invokes waitpid( )) after attaching to the monitored target process. This blocks the process monitor until a system call is invoked by the monitored target process. When a system call is made by the target process, the kernel will suspend the target process execution and will unblock the process monitor (e.g. using SIGCHILD signal). The waitpid( ) function will return the ID of the thread (TID) that generated the system call as well as some additional process state information that is used for other purposes. At this point the process monitor is configured to retrieve the state of the monitored process registers, from where the system call number can be obtained. The thread ID, system call number and the state of the process registers are forwarded to the policy decision point, that depending on its policies, will consider the system call relevant or not. If it is not relevant, it will return immediately with no decision to the enforcement point. If it is relevant, the policy decision point will analyze the process state and depending on it, it may or may not return a decision to the enforcement point, e.g. a security action to execute. The decision generation mechanism is explained in further detail later. After the decision point returns, the enforcement will continue the monitored process if the decision indicates to do so or implement any other security action indicated by the decision, including blocking the system call, modifying parameters of the system call or return values, requesting user input for implementing user-selected security actions, or even killing the application process altogether. In case the process is allowed to continue and after the decision is enforced, the process monitor will notify the kernel to continue the process execution (eg. ptrace(PTRACE_SYSCALL)) and goes back to sleep (e.g. invokes waitpid( )) waiting for notification of the next system call made by the target monitored process.

Policy Generation Mechanism

Decisions are security actions that have to be executed in order to enforce a set of policies. The policy decision point within each process monitor is the component in charge of the decision generation, which takes place every time the policy enforcement point intercepts a system call. In this embodiment, each policy decision point contains a set of policies, depending on the monitor type and the security system configuration for the monitored application. These policies, also known as low-level policies, in contrast to user-defined policies (those that are specified in the application layer), are defined within the security system itself. A user-defined policy can be translated into one or more low-level policies and can affect one or more monitors depending on its semantics.

The enforcement point triggers the decision generation mechanism. After intercepting a system call, it retrieves the state of the registers for the process that generated it and checks if such call is either entering or exiting. The policy decision point, as well as policies, have two entry points, one for the entering system calls, and another for the exiting ones. This is due to that the information that can be retrieved at each point is different so different decisions can be made during each stage. Then, the enforcement point forwards to the specific entry point within the decision point the system call number, the state of the process registers, and the TID that generated such system call, (this information being referred herein as the process state). The process state is passed to each one of the policies that may or may not return a decision. In one form, just the first decision returned by a policy is taken into account, and the rest are discarded. In another forms this could be modified by assigning different priorities to each policy or using other selection mechanisms. In this embodiment, even if a decision has already been generated by one of the policies, the process state is still passed to the rest of policies, in case they need it to track the process history.

In this embodiment, policies are not monolithic components, they are made instead of reusable modules that can belong to one or more policies know as action modules. Action modules are associated to a unique system call and extract information from the process state, in order to provide information that can be used by the policy to generate a decision. Action modules, the same as the decision point and policies themselves provide two entry points, one for the entering system calls and another one for those that exit, but in contrast to them, they are specific for each thread, so they don't need the thread identifier except at the time they are built. Each policy specifies a list of action modules that is instantiated for each thread and running within the monitored ANDROID operating system application (as well as sub-processes), in such way so that whenever a policy entry point is invoked, if the list of action modules for that thread does not exist, it is created, and it is removed once the thread or process exits. With this approach, each thread execution can be tracked independently and additional security checks could be performed.

When the policy entry point is invoked, it will loop over all the actions for the TID that generated the system call that are associated to that specific system call. Should any of these action modules consider the system call invocation is meaningful for it (for instance, ioctl( ) on some specific device or open( ) on just socket descriptors), the policy will check the data gathered by those action modules and generate a decision (security action). The decision is then returned to the policy decision point, which will decide if should be sent back to the enforcement point or not depending on the other policies results. Finally, if the decision point has returned any decision, the enforcement point will ensure the decision is made in order to enforce the policy that generated it. This process is shown diagrammatically in FIG. 6.

Security System Service

Overview

The security system service is an ANDROID operating system system service in the application layer that exposes all the ANDROID operating system Framework functionality to the monitors in the LINUX operating system layer. It runs on start-up, before any user application. In contrast to normal ANDROID operating system services that provide services to other ANDROID operating system applications or services, this service does not expose its functionality through intent action filters or an AIDL interface in this embodiment. Instead, the security system service provides its functionality to the process monitors through a communication link or process between the application layer and LINUX operating system layer. In this embodiment, the communication between the security system service in the application layer and the process monitors in the LINUX operating system layer occurs via requests to a UNIX socket, i.e. the security system service listens for requests on a TCP port. These requests are known as transactions. Each transaction has a unique ID and may contain zero or more parameters that are set by the process monitor and processed in the service, which eventually returns a result back to the process monitor.

Each transaction has a client part, that is the process monitor, and a server part represented by the security system service. The client part sets the transaction identifier (transaction ID) and the parameters and sends them serialized through a socket to the security system service. Transactions are synchronous, so the process monitor gets blocked waiting until the transaction has been processed. The security system service is configured to wait for requests on the security system service socket. Every time a new transaction is received, the security system service retrieves the transaction ID, and builds the server part of the transaction, which deserializes the parameters from the socket, and the new transaction is put into a thread pool queue. Once there is an available thread to process the transaction, the transaction runs and performs its functionality. It will return and a serialized result will be sent to the requesting process monitor. To finish the process, the process monitor receives the transaction response, which is deserialized, and will unblock, continuing its execution. In this embodiment, the communication link may use Transport Layer Security (TLS) for protecting the confidentiality of the communication between the security system service and the process monitors. It will be appreciated that other communication links or mechanisms could be used to enable communication between the security system server and process monitors in other implementations, including, but not limited to, shared memory space or similar.

The security system service, operating in the application layer for accessing the services of the ANDROID operating system framework, allows the specification of per-application policies through the standard ANDROID operating system interface (such as an Application for example). Also, it allows the process monitors to deal with the specific way in which the ANDROID operating system implements IPC calls. The security system service provides to the process monitors an entry point to the upper level of ANDROID operating system services and in doing so the process monitor is able to enforce its policies. These aspects are explained further below.

EXAMPLE

Setting a Security Policy

Figure 7:
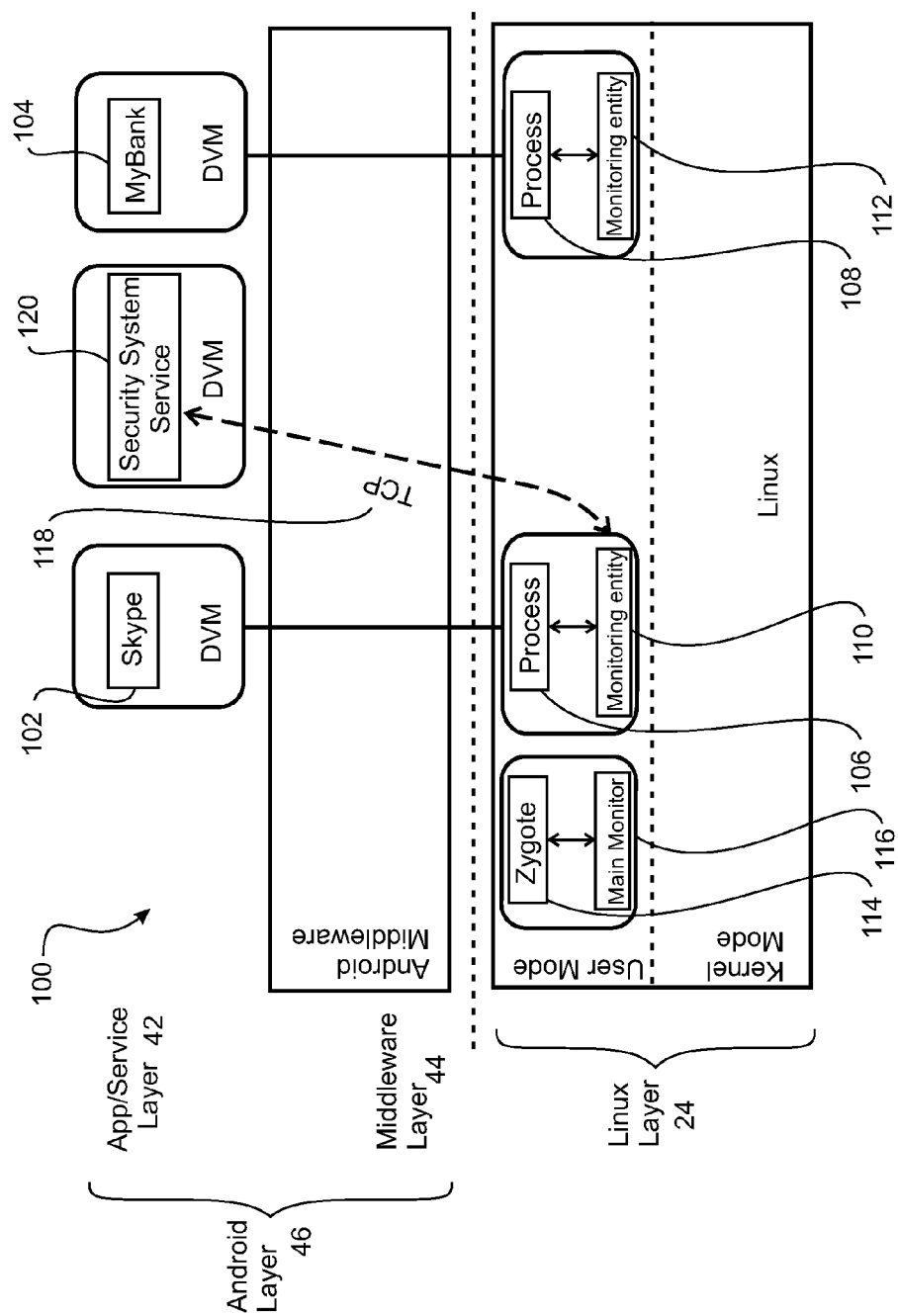
FIG. 7 is a schematic diagram of the ANDROID operating system architecture and an example configuration of the first embodiment security system for controlling inter-process communication between application components in accordance with the configured security policies.

Referring to FIG. 7, an example implementation of the security system showing the functionality of the security system service on a device 100 running the ANDROID operating system will be described by way of example. The device running the ANDROID operating system has a Skype application 102 and MyBank application 104 running in the application layer 42, each having or being mapped to a corresponding LINUX operating system process 106, 108 respectively in the LINUX operating system layer 24. Attached to each LINUX operating system process 106, 108 is a corresponding process monitor 110, 112 respectively. Zygote 114 and its attached main monitor 116 are also shown in the LINUX operating system Layer. The security system service 120 is shown running in the application layer 42 as a normal ANDROID operating system service. By way of example, a TCP communication link is shown between the process monitor 110 associated with the Skype application and the security system service 118, and a similar communication link exists or can be established between any other process monitors and the security system service also.

The process monitor 110 attached to the Skype application can use the functionality of the security system service 120 for loading policies specific to the Skype application. In particular, when the process monitor 110 is configuring itself, it retrieves the application package name associated with the process 106 to which it is attached (as previously explained) and then uses this application identification data to request the security policy or policies for that application from the security system service 120, which has access to the policy database, such as a policy configuration file where the policies are stored. The security policies for the applications may be stored in a policy configuration file on the device permanent storage, in memory or alternatively in a remote location on a server or network or other device accessible by the security system service. The security policies may be configured and stored in the policy configuration file in various ways. The policies may be configured via a custom security system application with a GUI that can be launched on the application layer and operated by the user or system administrator, automatically set by virtue of the application permissions during application installation, retrieved from a network or server operated by a third party, or may be configured in any other suitable way.

By way of example, the MyBank application 104 is a sensitive application that the user wants to protect. The user does not trust the Skype application 102 to call through IPC the MyBank application. The security administrator can define a high level policy such as: Skype not Auth IPC to MyBank. This policy has to be translated in the low level policy that the process monitor 110 can enforce. For instance, for controlling IPC communication between applications, a low level policy may be implemented such as: IPCPolicies that deny an IPC call between the application represented by the "CallingAppPackName" and the application in the "TargetAppPackName". The policy might be: DenyIPCPolicies (CallingAppPackName, TargetAppPackName, Type). This policy takes as argument the package name of the calling application, the package name of the target application and a parameter specifying if the target is either an application or a service. For our case, when the process monitor 110 attached to Skype contacts the security system service 120 to request the Skype policies when initializing, the security system service will retrieve the relevant policies from the policy database and reply with the parameters specifying the package name for Skype, for the MyBank app and that MyBank is an application. The process monitor 110 can then load the IPC policy as follows: DenyIPCPolicies("com.skype.app","com.mybank.app", APPLICATION).

Monitoring IPC System Calls

In this embodiment, the other main functionality of the security system service is to help process monitors resolve the application name its attached monitored process is trying to communicate with, so that it can then enforce any particular policies in relation to that IPC. In the ANDROID operating system, the IPC call mechanism uses a special type of messages for performing the remote method invocation called 'intents'. An intent represents an abstraction of a remote procedure call and is the main way in which the Binder manages the IPC between different applications. There are two types of intent supported in the ANDROID operating system: explicit and implicit intents. Explicit intents define which application is the receiver of the intent. The process monitor can directly capture explicit intents and extract the target application (or its package name) from the associated system call parameters being executed by the monitored process. Implicit intents specify the action that should be performed, but not the target application or service. Then it is up to the ANDROID operating system framework to find the best matching destination for the intent. The ANDROID operating system run-time and specifically Activity Manager decides which activity would be the target of the intent. Activity manager contacts the Package Manager to resolve implicit intents. Package manager is one of the system services which maintain some information about the installed applications and services on the device running the ANDROID operating system.

From the process monitor point of view, when its monitored application is executing an IPC system call using an implicit intent, the process monitor is able to capture the intent and extract its contents, but the extracted information is not enough for evaluating its security policies. An IPC security policy needs as a parameter the target application, but implicit intents only provide the description of the requested service. Because the Package Manager is a service running in application layer on top of the ANDROID operating system, the process monitor is not able to access it directly. However, the process monitor is configured to interact and communicate with the security system service running on the application layer via a UNIX socket, and can send a request for information indicative of the target application associated with the implicit intent to the security system service, so that it can enforce and relevant security policies in relation to that intent.

For example, with reference to FIG. 7, let's assume that the MyBank application 104 has a method "myPrecious" that is invoked for "getting some precious stuff", and that the Skype application 102 wants to send an implicit intent to an application that has the "myPrecious" method with the description "getting some precious stuff". In the ANDROID operating system (without the security system installed), when the Skype application 102 sends the intent through the Binder, the Binder will ask the Package Manager which app has the "myPrecious" method with the description "getting some precious stuff". The Package Manger will reply with the MyBank application 104. Thus the Binder will send the intent to the MyBank application that will reply to the request giving to the Skype application 102 the precious stuff, which could lead to security issues. When the security system is installed on the device running the ANDROID operating system, the above process changes as explained below to minimise such security risks.

When the security system is installed on the device running the ANDROID operating system such that a process monitor 110 is attached to the Skype application, it will intercept the system call that is generated when the implicit intent is sent from Skype application to the Binder. The process monitor 110 is configured to retrieve the information in the intent but initially the policies in the process monitor can't determine the package name of the target application, which is not yet known. The process monitor 110 cannot access the Package Manager in the ANDROID operating system layer directly, but the security system service 120 can as it is a standard ANDROID operating system service running at the application layer on top of ANDROID operating system with a special communication link for the process monitors, i.e. the TCP connections. When the process monitor 110 intercepts the system call with the implicit intent, it is configured to copy the application description and method, and sends it to the security system service 120 through the TCP link 118 with a request for the package name of the target application. The security system service 120 is configured to receive and processes the transaction, and asks the Package Manger to provide the package name of the target application that satisfies the description based on its configuration. The Package Manger will return the "com.mybank.app" package name to the security system service that will forward it to the process monitor 110 using the same TCP link 118. Now, the process monitor 110 has the package name information and can evaluate and enforce its security policies. In this, case the policy described above will be evaluated and since it is a deny policy, the action will be denied.

3. Second Embodiment Security System—FCI Configuration

Overview

In this second embodiment, the security system utilises the Zygote process to configure an embedded monitoring entity, such as an embedded process monitor method or function, within each newly launched process. During or at some time after launch of the each new process, its embedded monitoring entity is loaded or configured with the security policy associated with the application in the application layer to which the process in the LINUX operating system layer corresponds. In this embodiment, the security system enables the embedded monitoring entity to detect and intercept dynamically linked symbols invocations made by their processes using an FCI mechanism or configuration. As will be explained in further detail later, the FCI mechanism intercepts dynamically linked symbols invocations (which may be intended to invoke one or more system calls in the kernel mode of the LINUX operating system layer) directed to the a shared object library in the user mode of the LINUX operating system layer and redirects those to the embedded monitoring entity within the process. The embedded monitoring entity processes the function call corresponding to the detected symbol invocation and implements a security action based on the security policy configured for the process. As with the first embodiment security system, the security action may vary from: allowing the function call to proceed, modifying the function call in any of its parameters and/or returned values, or halting the function call for example, all of which will have a corresponding effect on any eventual system call executed or invoked in the kernel mode or any other side effect.

Figure 8:
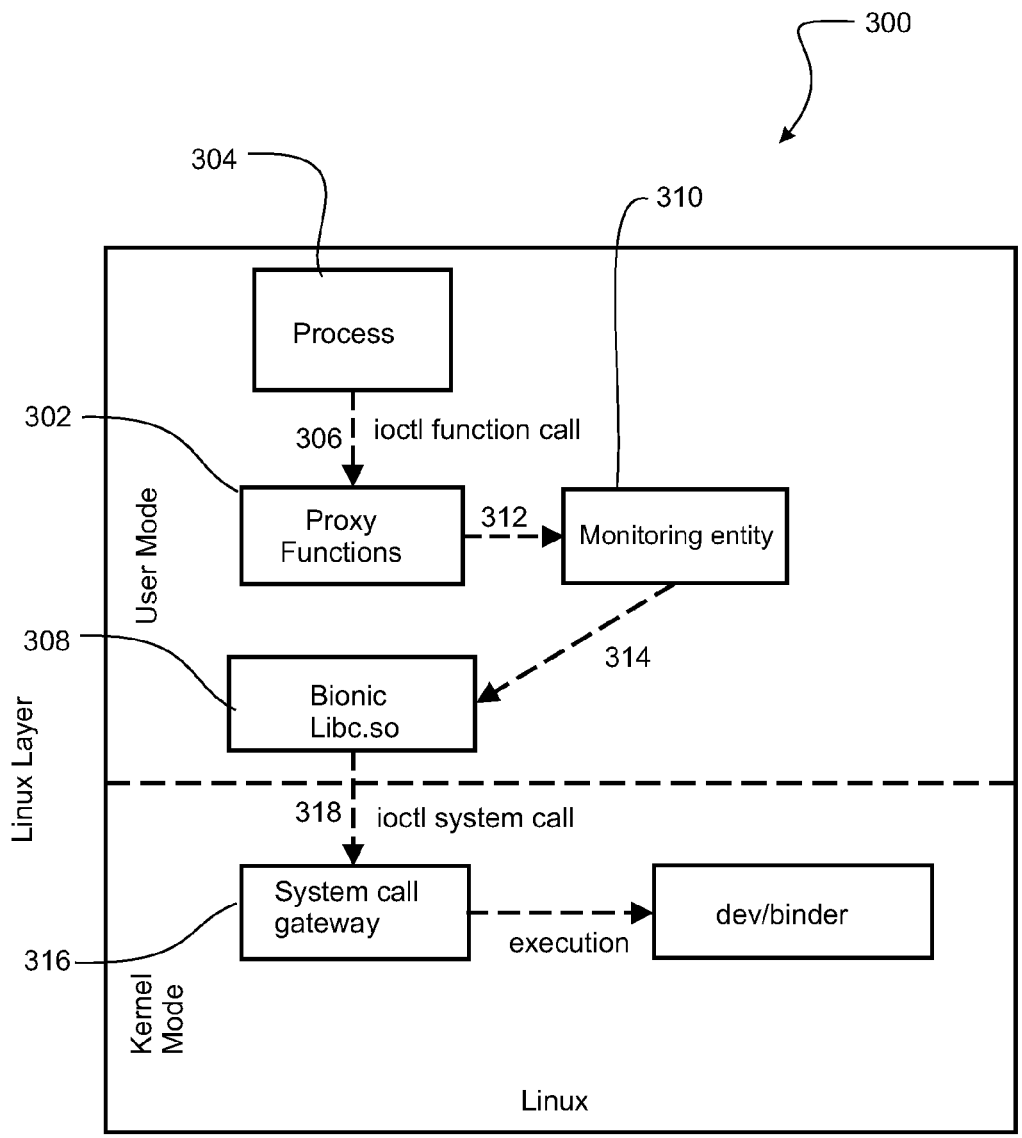
FIG. 8 is a schematic diagram of the framework basic architecture for the security system in accordance with a second embodiment which is based on Function Call Interposition (FCI)

Referring to FIG. 8, the general configuration of the FCI mechanism for the second embodiment security system 300 will be explained. In this embodiment, the security system is configured with a set of proxy functions (proxy functions library) 302. The proxy functions library may be a shared library that is dynamically linked to each process, such that each process can be considered as having its own proxy functions library, which in this embodiment is in the form of a Proxy Offset Table (POT) as will be explained later. When a process 304 invokes a function call 306, instead of going directly to the shared library 308 as previously described with reference to FIG. 2, the dynamically linked symbol invocation 306 is intercepted by the proxy functions library 302.

This proxy functions library 302 or interception module provides a customised version of the dynamically linked symbols that redirect the invocation or function call to the monitoring entity 310 associated with the process 304 as shown at 312. This customised versions of the dynamically linked symbols have exactly the same signature (and may have the same name) as the actual symbol they are intended to intercept.

FIG. 8 shows a monitoring entity 310 as a separate module to its associated process 304 for clarity, however in this second embodiment, the monitoring entity 310 is an embedded method or function provided or operating within the process 304. Based on the security policy or policies configured in the monitoring entity 310 for the process 304, the monitoring entity 310 implements a security action or decision on the detected function call. By way of example, the monitoring entity may allow, deny or modify the execution of the function call, or kill the monitored process 304 making the function call altogether. If the execution is allowed (in its original or a modified form), then the monitoring entity forwards the actual function call invocation (in its original or modified form) to the actual shared object library that contains the original symbol 308 as shown at 314. After this, the execution of the function and any system calls it may internally invoke is performed as usual with the shared object library 308 performing the actual invocation on the system call gateway 316 as shown at 318, and as previously described with reference to FIG. 2. If the execution is denied, the monitoring entity will disable the invocation of the symbol to prevent the function call executing, and may optionally execute other additional security actions, depending on the nature of the associated system call that was to be invoked and/or security policy associated with the process, such as kill the entire process or return a value or error code to the process to prevent crashing as previously discussed in relation to the first embodiment security system.

The above FCI mechanism may be implemented in various forms. In particular, various methods may be utilised to redirect the execution path of function calls from the actual shared library 308 to the new proxy functions library 302 created by the security system without modifying the ANDROID operating system and the application code associated with applications in the application layer. Various forms of implementing an FCI configuration to redirect the execution path to the proxy functions library 302 will now be described in further detail.

First Form—LD_PRELOAD Variable

In a first form, the second embodiment security system, the FCI mechanism is implemented using the LD_PRELOAD environment variable. The LD_PRELOAD is an environment variable that is used by the runtime linker and can be used for linking user-specified shared objects before other libraries during an executable load stage. In this first form, the security system can configure the LD_PRELOAD variable to tell the runtime linker to link the proxy functions library 302 when a new process 304 is launched.

In this form, the LD_PRELOAD approach is only effective when a process is being launched. Once in execution, if the process loads new symbols from any shared object, the LD_PRELOAD settings will not affect the newly loaded symbols. In particular, the loaded code from a shared object can invoke function calls directly to the shared object library 308 bypassing the proxy functions library 302.

Second Form—PLT/GOT Interposition

In a second form, the second embodiment security system may implement an FCI mechanism by employing a PLT/GOT interposition. The second form will be described in further detail with reference to FIGS. 9A and 9B.

Figure 9A:
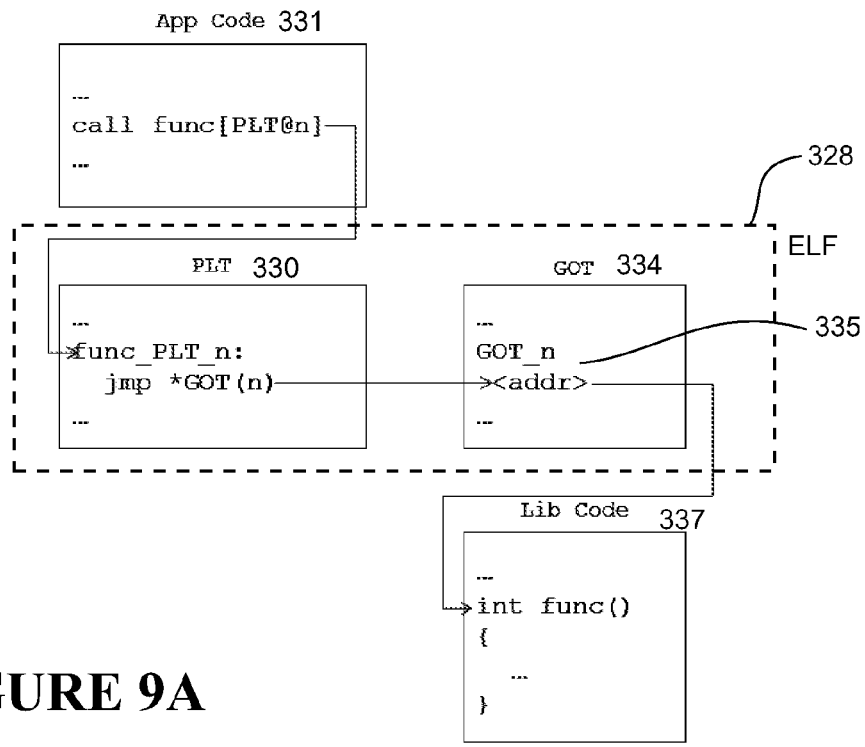
FIG. 9A is a schematic diagram of the typical PLT/GOT indirection mechanism in the ANDROID operating system.

In the ANDROID operating system, all binaries compiled with the standard NDK toolchain, and in particular, the binary in charge of launching the Zygote mother process (/system/bin/app_process) are linked against the Bionic libc library 308 (shown in FIG. 8). This library, in contrast to a normal LINUX operating system distribution, is dynamically linked and its code, once loaded in memory is shared by all the running applications. Referring to FIG. 9A, the PLT/GOT indirection mechanism will be described further. A shared object (or shared library) is a special type of file which structure is defined by the Executable and Linkable Format (ELF) 328. During execution, invocations by application code 331 to the symbols provided by shared objects are translated to jump instructions to entries inside the procedure linkage table (PLT) 330, a data structure defined as part of ELF specification. The entries of this PLT 330 are stub functions that when invoked perform a jump instruction 333 into entries within a global offset table (GOT) 334, (also defined by the ELF specification). Finally, the entries in the GOT 334 are the real addresses 335 of the target symbols in the shared object's code 337 loaded in memory where the actual symbols reside.

Figure 9B:
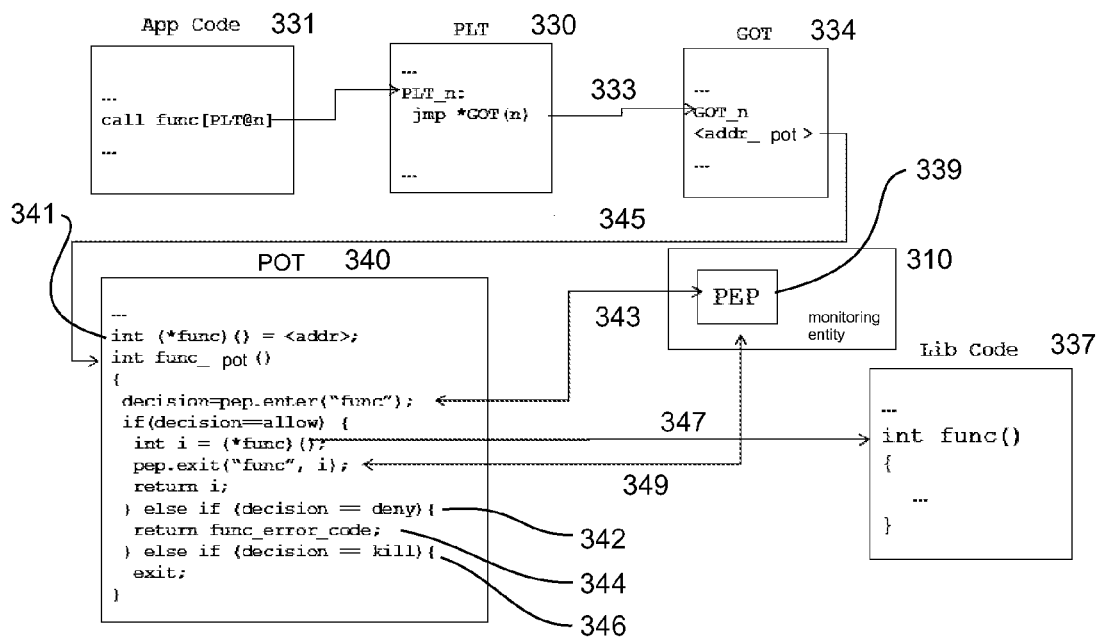
FIG. 9B is a schematic diagram of the modified PLT/GOT indirection FCI mechanism in accordance with the second embodiment security system for intercepting dynamically linked symbol invocations.

In the second form, the second embodiment security system 300 is configured to implement an FCI mechanism by modifying the PLT/GOT indirection mechanism described as shown in FIG. 9B. In the second form, the security system is configured to re-write the entries in the GOT to point function invocations to a new Proxy Offset Table (POT) 340. Each entry in the 340 points to the embedded monitoring entity 310 embedded in the process and invokes a Policy Enforcement Point (PEP) 339 inside the monitoring entity 310. The monitoring entity 310 will then analyze the symbol being invoked against the security policies configured for the process and implement a security action. If the monitoring entity 310 allows the symbol invocation, the actual symbol 337 will be invoked by the monitoring entity itself.

In this embodiment, the security system is configured to modify the GOT 334 entries by changing the original address in the GOT with an address pointing to the wrapper function 345 in the POT 340. The original address is stored in the POT 340 as a function pointer 341. The function pointer 341 has the same signature as the original function: it does not take any argument and returns an integer. The entry in the POT that will be invoked from the GOT 334 also has the same signature as the original function. When the application 331 invokes this function func, the wrapper function in the POT 340 will execute the following steps. First it will invoke the PEP 339 method enter 343 in the monitoring entity 310. This enter method informs the PEP 339 that the application 331 is going to execute the invocation of the function func (note that the invocation is not executed yet). The PEP 339 will take the name of the function and the function parameters (in this example func does not take any parameters). The PEP 339 will pass this information to the other modules in the monitoring entity 310 to decide on a security action.

After the evaluation of the policies inside or accessed by the monitoring entity, if the PEP 339 returns 343 'allow' then the function func can be executed 347. In this example, the function func returns an integer. After the function returns, the security system is configured to perform a second check after the function has completed its execution and returned its value. This enables the monitoring entity to check and modify the returned value of the function, if required by the security policy set for the application 331 invoking the function. For example, the monitoring entity may remove some sensitive information or data, or modify the returned value or values with fake ones. This second check is performed by invoking the PEP method exit 349 inside the monitoring entity 310 and providing as an argument the value returned by the function.

The enter method of the PEP 339 can also return a 'deny' value 342, if the security policy dictates that the application 331 should not be allowed to invoke the function func. In this case, a function specific error code 344 is returned to the application 331. Alternatively, the enter method of the PEP 339 can return a decision to 'kill' 346 the application. In this case, the wrapper function 345 will perform an exit terminating the process and its application.

The way in which the GOT is populated depends on the compilation settings of the program, i.e. operating system and/or applications. By the default, the GOT entries are populated using a lazy load approach. The first time a process invokes a dynamically linked symbol the actual address of the function is resolved and inserted in the GOT. This means that the memory pages of the GOT need to be modifiable at runtime. Another option is the Relocation Read Only (RELRO). This option specifies that the runtime linker has to resolve all the dependencies in the GOT during the loading time of the process. This option still includes modifying the GOT memory pages during runtime, although these modifications are only done at loading time. Finally, there is the FULL RELRO option that perform the same operations as the RELRO, but once the GOT is populated the memory pages as set as read only. This means that only the process itself can change these entries. By way of example, the ANDROID operating system Jelly Bean (version 4.1) Google utilises the FULL RELRO option for compiling ANDROID operating system and system applications code.

In the second form, the POT 340 represents the proxy functions library 302 which intercepts and redirects dynamically linked symbol invocations from its associated process to the embedded monitoring entity 310. In one example, the security system is configured to inject code that modifies the GOT entries in each newly launched process. As the monitoring entity is running within the same process, by using the system call mprotect( ), the security system can set the memory pages of the GOT 334 as writable, perform the modifications and then execute the mprotect( ) system call to set back the permissions to read-only as used in FULL RELRO.

In another example, the security system may utilise Libhijack, which is a C library, to inject the code for modifying the GOT entries into each new relaunched process during execution time. In particular, the security system may utilise Libhijack to modify the GOT entries of a target process to redirect the function calls. Libhijack makes use of the ptrace system call for modifying the memory pages of a target process. However as Libhijack is based on ptrace, it cannot be used when the FULL RELRO option is used, such as in the ANDROID operating system Jelly Bean.

Third Form—Hybrid FCI Mechanism Combining LD_PRELOAD Variable and PLT/GOT Interposition In a third form, the security system implements a hybrid approach combining the simplicity of the LD_PRELOAD with the robustness of the PLT/GOT injection to implement the FCI mechanism. In this third form, the security system utilises the mother process, Zygote, to configure and implement the FCI mechanism as further explained below.

Figure 10:
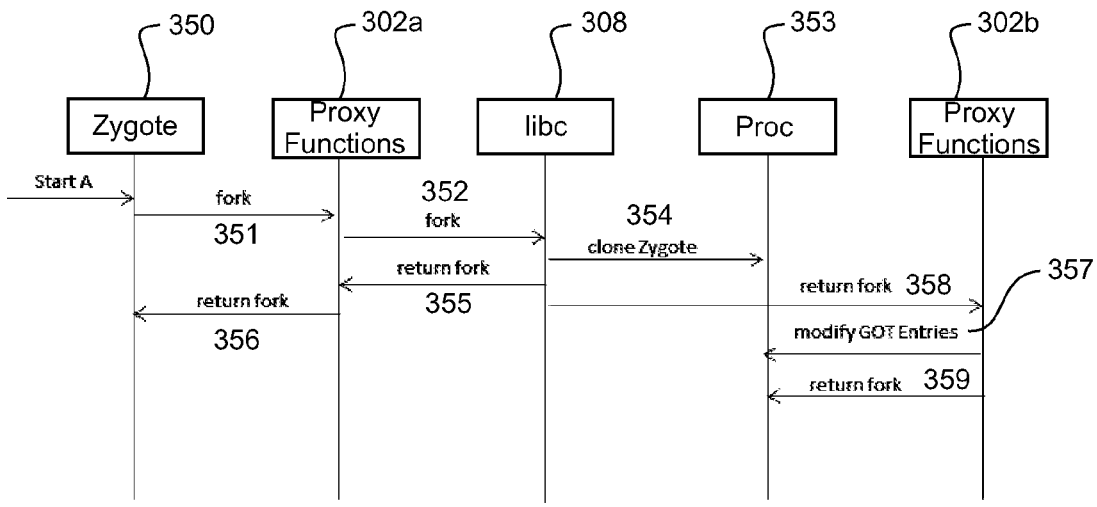
FIG. 10 is a flow diagram showing the system operations carried out by the second embodiment security system when launching a new process with an embedded FCI mechanism.
Figure 11:
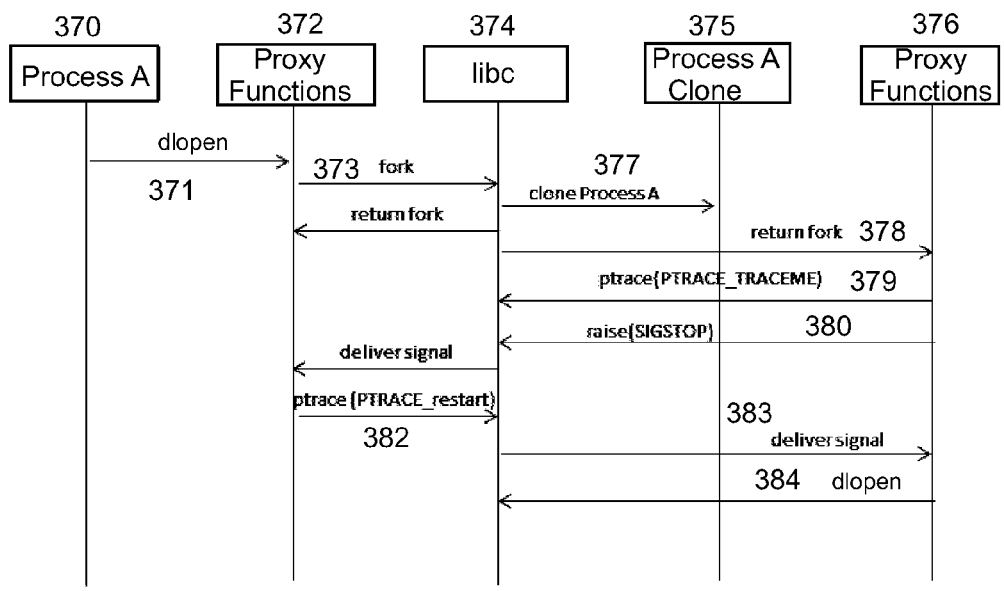
FIG. 11 is a flow diagram of the system operations carried out by the second embodiment security system to dynamically switch to monitoring based on an SCI mechanism as carried out by the first embodiment security system.

Referring to FIG. 10, firstly, the init.rc file is modified to set a value of LD_PRELOAD for the mother Zygote process to point to the Proxy Functions library 302*a*. As the security system is initially only interested in monitoring Zygote's invocations to the fork( ) system call, the security system creates one single proxy function for fork( ) in the Zygote process. When a process is forked 351 from Zygote 350, the fork proxy function, with the same signature and name as the original fork( ) function, placed in the Proxy Functions library 302*a* will be called. This modified fork proxy function will just forward 352 the invocation to the real fork function in the libc library 308 to spawn a new child process 353. When the child process 353 is created it will be an exact copy or clone 354 of the parent process, that is Zygote 350. This means that also Zygote's libraries will be copied in the new child process 353. In particular, the modified LD_PRELOAD setting will be valid also for the child process such that it points to its own proxy functions library 302*b*. When the kernel 308 completes the fork, it returns a value to both the parent Zygote 350 and child processes 353. However, before returning to the actual processes, the libc library 308 will go through the proxy functions libraries 302*a*, 302*b* of both processes. The fork( ) proxy function 302*a* for the Zygote process 350 will just return 355, 356 without any modifications. However, the proxy function library 302*b* of the child process 353 will perform the modifications of the GOT entries 357 using the mprotect( ) system call approach described above, before returning 358, 359. From now own, any function call executed by the child process 353 will be intercepted by the modified GOT entries.

When the new process 353 specializes as the intended application, the embedded process monitor method (monitoring entity) will link or load the appropriate security policies for the application. As previously noted, the monitoring entity is embedded or part of the same process that it is monitoring, in contrast to the first embodiment security system where the process monitor is a separate process attached to its target process. In this second embodiment, the embedded process monitor method has access to the package name of the application that the new process is specializing as, and therefore can retrieve the appropriate security policies in a manner similar to that previously described with reference to the first embodiment security system.

In this form, the main advantage of implementing the FCI mechanism for the new child process 353 through the PLT/GOT modifications is that even if the child process loads external libraries as shared objects the PLT/GOT modifications will be still effective. The same cannot be said for using LD_PRELOAD only, as in the first form. Because the system is only interested in intercepting the fork( ) symbol invocation from the main Zygote executable code (but not from other shared objects used by it) using the LD_PRELOAD FCI mechanism is adequate.

If the new process 353 invokes a fork to start a new child process, all the GOT modifications will be copied in the child process memory. Thus the child process will have an embedded FCI mechanism with its own proxy functions library and will be monitored as well by its own embedded process monitor method.

Deployment of Third Form Hybrid FCI Mechanism

To deploy the security system in the ANDROID operating system, the security system code will be compiled in a security system shared object. The shared object will be deployed in the /system/lib or /vendor/lib that are the standard folders where libraries are located in the ANDROID operating system. Alternatively, the security system code could be deployed in any other folder.

To enable the security system, the init.rc file is changed to set the environment variable LD_PRELOAD to point to the security system shared object. When Zygote is started at booting time, the runtime linker will load the security system shared object before any other libraries. In this way, when Zygote executes a fork, the proxy function for the fork( ) symbol will be invoked instead of the actual fork( ) provided by the Bionic libc.

Security Considerations

There are several security considerations to discuss that arise from using the third form FCI hybrid mechanism.

First of all, with this approach the security system code will be part of the target process image. As such, the target process might execute code to modify the GOT entries to point to the original memory addresses, bypassing the monitoring entity. To avoid this issue, once the GOT entries have been modified, the security system makes the memory page of the GOT entries read-only by means of the mprotect( ) function call. This means that in the case that the target process wants to change the GOT entries, first it has to call the mprotect( ) function call to make the memory pages writable. However, the security system can be configured to intercept this call (through its mprotect proxy function in the proxy function library) and deny its execution via the embedded monitoring entity. As an example, the execution may be denied if the security system detects the process is trying to unprotect memory pages that belong to the GOT.

Code used from statically linked libraries is included as part of the text region of the binary, which means that it will not be under the control of the security system, using the approach provided by this embodiment. However, this approach assumes that all code that has been statically linked is trusted code. The security system's main concern are those shared objects that may be loaded in runtime.

System calls can be invoked by means of syscall( ) function call providing the system call number followed by the necessary parameters. This can bypass the security system for such system calls. In order to avoid this, the security system can be configured to intercept the syscall( ) library function and retrieve the system call number corresponding to the system call that the process wants to execute. Instead of using the system call from the original library, the monitor can redirect the execution to the proxy function corresponding to such system call.

The function dlsym( ) takes a handle of a dynamic library returned by dlopen( ) and a symbol name string as parameters, and returns the address where that symbol is loaded into memory. As a special pseudo-handle, the RTLD_NEXT constant can be passed to it in order to find the next occurrence of a function in the search order after the current library. This means that the modification of the entries in the GOT have to be done in a recursive way. This also applies in the case where a shared object makes use of a second shared object. To be able to intercept the function call from the second shared object we have to perform a recursive injection to avoid this issue.

Dynamic Switch to SCI Mechanism—Ptrace

There are cases in which is still possible to bypass the third form hybrid FCI mechanism.

For instance, the process might want to load by means of the dlopen function call untrusted symbols from a random shared object. The modifications of the GOT entries will not be valid for this code as the program's binary hasn't been linked against such shared object, so there are no entries in the PLT/GOT for such symbol.

Another issue is with in-line assembly code that allows applications to bypass libc library in order to invoke system calls through machine code. In this case, the code is put by the compiler within the binary's text region, and no library calls are invoked, as the machine code that invokes the system call is put there at compilation time. This means that the security system can be bypassed using this mechanism.

However, the security system can be configured to detect the above behaviour. For the case of the dlopen function call, the process has to invoke the symbol, which is provided by libdl.so, and linked dynamically. The security system provides a proxy function for this symbol what means that it can control which shared objects are loaded in runtime. For the in-line assembly code issue, the security system can be configured to parse untrusted native code to detect the instruction that generates the hardware interruption to change into supervisor mode (SWI #0 on ARM).

In both the above cases, the security system can dynamically switch to the use of an SCI mechanism such as ptrace( ) as it is done for the first embodiment security system. By way of example with reference to FIG. 11, when a process 370 invokes the dlopen function call 371, the security system intercepts the function call with the dlopen proxy function in its proxy function library 372. The dlopen proxy function will be configured to fork a new process that is an exact clone 377 of the running process 370 including the proxy functions library 376.

When the fork returns 378 on the cloned process 376, the cloned proxy function library 376 will disable the proxy functions library and invoke the ptrace system call 379 with the option PTRACE_TRACEME. This option tells the kernel that the child process 375 wants to be monitored by another process 370. The child process 375 also raises a SIGSTOP 380 to be stopped until the parent process 370 allows it to resume its execution. When the child process 375 resumes its execution, it will continue with the dlopen 384 operation and the shared object (new native code) will be loaded within its image so that its symbols will be accessible to the process.

On the other hand, the monitoring parent process will also disable the proxy functions library 372 and by invoking ptrace with the option PTRACE_SYSCALL 382 will deliver a signal 383 for letting the new process 375 continue its execution until its next system call.

The monitoring entity in the parent process can then execute a security action regarding the intercepted system calls based on the security policy associated with the parent process. In other words, the parent process 370 it attached to the child process 375 such that it is configured to monitor system calls made by its target child process 375 via ptrace as in the first embodiment security system.

When the shared object is unloaded, the clone process 375 can be killed and the execution of the main parent process 370 will be resumed as before with the FCI mechanism of the proxy functions intercepting the function calls. For example, the monitoring entity can be configured to detect the call to dlclose to be notified that the shared object is unloaded.

4. Timed (Late/Delayed/Lazy) Security Policy Binding

Overview

Loading or linking security policies from a security policy database or policy configuration source to the monitoring entity attached to or embedded within a new process corresponding to a newly launched application involves obtaining information to correctly identify the application that such process has specialized as.

Figure 12:
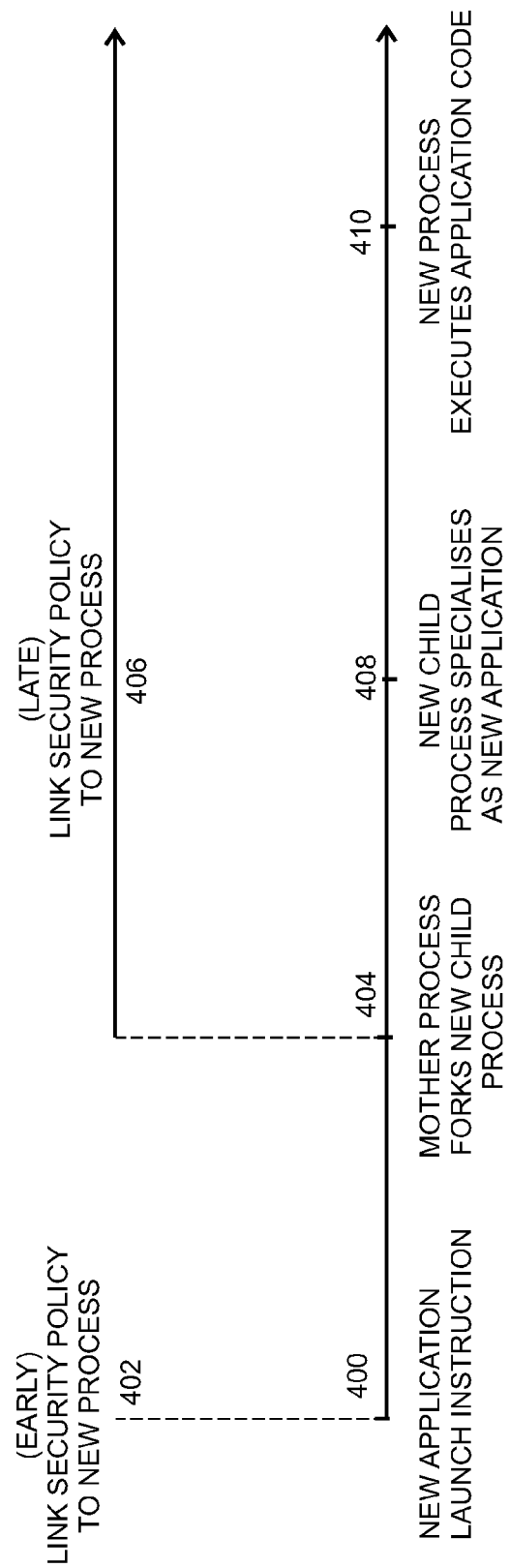
FIG. 12 is a timeline of the launch of a new process corresponding to a new application, and a late security policy binding mechanism in accordance with an embodiment.

As previously discussed, in conventional UNIX and LINUX operating systems, security systems have been proposed that link security policies to new processes immediately based on launch information directly available to them from the shell command line, which contains as an argument the application name of the newly launched application. Referring to FIG. 12, such security systems link or retrieve the application identification data necessary to link the security policy or policies to the new process at 402, based on the initial launch instruction 400, e.g. the shell command line arguments. This early security policy binding mechanism means that security policies are associated with the new launched application before the actual application code of the new process even starts to specialize. The main issue with this approach is that a malicious application might fool the system by late specialization into a different application than the one used in the shell arguments: as a result, the wrong set of security policies might be associated to the new process.

Referring to FIG. 12, the security system in at least some embodiments uses a late security policy binding mechanism, in which the linking or association of a security policy or policies to a newly launched process is timed or delayed until a predefined identification threshold is reached or a predefined event has occurred, such as at least until on or after the new process is forked 404 by the mother process as shown at 406. For example, the application identification data (which is used to link or associate the correct security policy or policies) corresponding to the application or type of application that the new process is specializing as is not determined or extracted until on or after the new process is forked 404. In this description, the phrase "linking" or "associating" a security policy with a process is intended to mean the extraction of the application identification data (e.g. application name, signature or package name) of the application in the application layer to which the new process will specialize as such that the security policy or policies are determined based on that application identification data, and/or the actual configuring or loading of the security policy or policy into the monitoring entity attached to or embedded into the new process.

In one form, the security policy is linked on or soon after the new child process has been forked 404. In another form, the security policy is linked as the new child process is specializing 408, or once the new process has specialized, with the application code. In another form, the security policy is linked on or after the new process begins executing 410 the loaded application code after specialization. In another form, the security policy is linked only when a predefined identification threshold is reached that corresponds to collecting or receiving enough or sufficient data or evidence indicating or confirming that the new process launched in the LINUX operating system layer corresponds to the application in the application layer the user intended to launch.

The above late security policy binding mechanism may be applied or implemented to either of the first or second embodiment security systems described above in the context of the ANDROID operating system. Additionally, this late policy binding mechanism may be applied to other operating systems, including LINUX operating system or UNIX operating systems, iOS, or any other operating system that launches new processes with a mother process, as will be explained further below by way of example only.

The late security policy binding mechanism may be implemented in the context of the security systems described in the first or second embodiments, or in the context of any other operating system security system in which it is necessary to associate an application-specific or application-type specific security policy or policies with a newly launched process executing the application.

ANDROID Operating System

As previously explained for the first embodiment security system, the application identification data (e.g. the full application package name) is retrieved during the final step of the specialization process of the new forked child process. In particular, as the security system is configured to rely on the last step executed by the child process specializing 408 into an application when it sets its application name into the specialization data file, e,g, within the /proc filesystem. When the application has specialized, it will set its name into the /proc/self/cmdline file after the prctl system call exits. This occurs after the process is forked 404 and before the new process begins executing 410 the actual application code.

Other methods for extracting or identifying the application or type of application a process has or is specializing as may also be used, and some other examples will be explained in further detail later.

LINUX Operating System

The late security policy binding mechanism may also be used when the security system is deployed or implemented on a LINUX operating system. In the LINUX operating system, the /proc filesystem is used for maintaining information about the running processes (as in the ANDROID operating system). As with ANDROID operating system, after the process has specialized, the application identification data relating to the newly launched process is set in the /proc filesystem, and can be retrieved to enable the appropriate security policy or policies to be linked to the new process.

iOS—Mobile Operating System

The security system described can also be deployed on the iOS platform. The main requirements for the first embodiment security system to work on iOS is: (i) a System Call Interposition mechanism such as ptrace or similar for tracing process execution; and (ii) a mechanism for attaching process monitors to the processes.

As iOS is a LINUX-based OS, the ptrace tool is present. However, in iOS ptrace is frequently used by application developers to deny debuggers to attach to their applications. The ptrace option PT_DENY_ATTACH. This option is a protection mechanism to avoid attaching to processes. This means that no other processes are able to attach to the process that uses this option in its code. To bypass this restriction and be able to attach to a process (even if it is protected by the PT_DENY_ATTACH option) there are several solutions.

It is also possible to attach a process monitor to an application process in iOS. Applications in iOS are written in Objective-C, a superset of C. As with all C programs, Objective-C programs start with a main method. This main method is automatically created for all applications in iOS and it is placed in a separate main.m file in the Supporting Files group. All the applications have the same main method. Each main method calls the UIApplicationMain method, which is responsible for loading the class specific to the application that is being launched.

In order to attach to a process monitor to a new process, the security system is configured to modify the main method of each application installed on the device running the iOS. In particular, the security system is configured to modify the iOS to launch the main monitor of the security system first and then the main monitor will launch each application using UIApplicationMain. The modification of the main method code is automated. The security system is provided with a script that deploys the security system through an application and this causes all the main.m files to be modified. Additionally, the script is configured to modify the main.m file of any applications downloaded onto the device after the security system has been installed.

The main.m file is compiled code, and there are various ways in which it can be modified or replaced with a modified version. Alternatively, the security system may be configured to patch the executable of the application using the otool to disassemble the binary main.m code and then patch it with the necessary ARM code to insert the call to the main monitor code of the security system.

Once the security system is installed such that a process monitor is able to attach to and monitor an application, the late security policy binding mechanism can be used to link a security policy or policies to the application. iOS is based on the UNIX operating system and it uses its own version of the /proc filesystem. However, to access the application identification data or information contained in the /proc filesystem, the sysctl special system call may be used. This system call retrieves information on the kernel state including the name of the running processes. Using the sysctl system call, the security system can wait until the process name is set (by this time sysctl will be able to retrieve it) and load or link the security policies to the process.

UNIX-Based Operating Systems Generally

In general, the late security policy binding mechanism can be applied to any UNIX-based systems (including the ANDROID operating system, the LINUX operating system and iOS as noted above) where a new process is created and its specialization application package name is set in a separate location accessible directly (as for /proc in the ANDROID operating system and the LINUX operating system for example) or indirectly (as for sysctl in iOS for example) by the process monitor attached or embedded in the process. This is because in UNIX-based systems when a process is launched, it is forked from a parent process. For example, in the case of the LINUX OS there is a special process called init, which is responsible for starting any new process through the command shell. When the security system is deployed in LINUX operating system, a main monitor may be attached to init and any time a new process is forked, a new process monitor will be attached. The security policy to be linked to the new process and enforced on the process monitored is then determined using the late security policy binding mechanism.

Examples of Process Specialization

In UNIX/LINUX operating systems, the creation 404 of a process is separated from its specialization 408, as shown in FIG. 12. The creation of a process is performed by means of a fork system call. When a process calls fork a child process that is the exact copy of the parent process is created 404. The two processes will continue execution independently from each other. However, each process has to know whether it is the child or the parent process. This can be done by the value that is returned by the fork. In the parent process, the fork returns the Process ID (PID) of the newly created child process. In the child process, the fork returns 0. Because PID 0 is not assigned to any process, the child process knows that it is the child and that it has to specialize.

In the ANDROID operating system, processes are created in a way similar to the UNIX/LINUX operating systems. However, the way in which they specialize is different. In the UNIX/LINUX operating systems the child process specializes by means of calling one of the system calls from the exec family. When a process calls the exec system call, the process ceases executing its current program and begins executing a new program from its beginning. The exec system call uses the name of the program and the parameters to be passed to the program as arguments. There are several ways in which a child process gets the application name of the program to execute or specialize as, as further explained below.

Retrieving Application Name Hard-Coded into Parent Process

In one example, the program name is already hardcoded in the parent process code. After the fork of the new child process, the child process will use the name for executing it through a execvp system call. In this example, the application identification data can be extracted directly from the child process code after forking.

Retrieving Application Name from a File

In another example, the parent process can also retrieve the program name from outside its code. For instance, it could read it from a file. In this example, the application identification data can be extracted directly from such a file.

Retrieving Application Name from External Process Communicating with Parent Process.

In another example, the parent process could receive commands from an external process using an Inter Process Communication (IPC) channel, such as a socket like a UNIX socket. In this case, the client socket is opened in the parent branch of the fork. When the parent receives the program name through the socket, it forks the child process. When forking, the program name will be contained in the child memory since it is still a copy of the parent process.

Retrieving Application Name Pushed to Child Process by an External Process

In another example, the child process may be configured to open an IPC channel and waits for the program name to be provided through that IPC channel. By way of example only, the child process may use a socket to listen for program names. In this example, the program name is pushed to the child. In this case, the client socket is opened in the child branch of the fork.

Retrieving Application Name Pulled by Child Process from Another Process

In another example, the child process may be configured to establish an IPC channel with another process. In this example, the child process may be configured to send a request for pulling the program name from the other process. In this case, the client socket will be opened in the child branch of the fork.

ANDROID Operating System—Application Name Retrieval

In the ANDROID operating system, applications are usually Java programs compiled into bytecode which executed in a Dalvik Virtual Machine and optionally can execute native code placed in shared objects through the Java Native Interface (JNI). The Zygote process is the only process that can create new applications. Zygote receives from internal UNIX socket the commands to fork new applications. The command contains the name of a Java class name that will be loaded in the child process' virtual machine using Java Reflection. The class provides the static main method of the application to be run. However, the class name does not represent the package name of the application. This information will be retrieved from the manifest file of the application and then set in the /proc filesystem using the prctl system call as previously explained.

Linking Security Policy During Process Execution

The various examples demonstrate how an application-specific security policy may be linked with a newly launched process after forking of the new process and during specialization of the process as the application, using a late security policy binding mechanism.

In other forms, the late security policy binding mechanism may delay linking a security policy until after the process has specialized, and once it is executing the application code. In this example, the late security policy binding mechanism is configured to monitor the execution of the application code, characterise the type of application that is executing, and link a security policy or policies appropriate to that determined application type. By way of example, the security system may characterise the type of application based on various process actions, including but not limited to:

- What hardware resources the process is attempting to access, e.g. camera, network, storage, memory, GPS sensors, microphone.
- What data the process is trying to access and/or modifying, e.g. SMS, emails, account information, pictures, videos, passwords.
- What other processes it is trying to communicate with: accessing other applications in the device, requesting accesses to sensitive services such as the dialer or the SMS sending service.

The security system may block the process from executing any prohibited actions until the characterization is complete, and the security policy linked. Once the security policy is linked to its process monitor, the process is allowed to continue with normal execution to the extent allowed by its process monitor based on the security policy.

5. Third Embodiment Security System—Virtualization to Provide Isolated User-Space Instances Overview With reference to FIGS. 13-15, a third embodiment of the security system is provided that is adapted to provide a light virtualization mechanism in which multiple isolated user-space instances or domains are provided within the same OS and device. The light virtualization mechanism utilises either or both of the SCI and FCI mechanisms described in the previous embodiments for intercepting function calls and/or system calls, and making a security decision/action about the function call or system call depending on a control parameter or parameters (herein user-space control parameter) indicative of the specified or selected user-space instance, such as a domain or user-profile, that is currently operating on the device. For example, the control parameter defines the security policy to apply to the intercepted function call or system call. The system is configured such that each process is monitored and executed in relation to a specific user-space instance, e.g. domain, as specified by the control parameter. The domain specified by the control parameter will constrain how a given process will interact with other processes and access the resources.

System Configuration

Referring to FIG. 13, an example of the functionality and main components of the third embodiment security system 500 adapted to provide virtualization will be described. A process 502 (which corresponds to an application in the application layer) in the OS layer 504 interacts with other processes and accesses the resources in a device (such as the filesystem 516 for example) through the execution of system calls supported by the OS, as explained in the previous embodiments. The process 502 first executes an invocation of a function of a library (such as libc) as shown by the function call 506 in user mode 508. Normally, the function call 506 is then mapped by the shared library (not shown) into a system call 512 executed in kernel mode 510. However, in this embodiment, as with the previous embodiments, the function calls 506 and/or system calls 512 are detected and intercepted by a call interceptor 514. The call interceptor 514 is configured to utilise the SCI and/or FCI mechanisms previously described to intercepts the function and/or system calls. For example, the call interceptor may be configured to intercept function calls through the injection of special function hooks in the process ELF (i.e. the FCI mechanism previously described) and system calls by means of ptrace (i.e. the SCI mechanism previously described).

When a call 506, 512 is intercepted, the call interceptor 514 forwards the call information to the monitoring entity 512 attached to and/or embedded within each process. The monitoring entity will then retrieve the appropriate security policy to apply to the call based on the user-space control parameter or variable 519 defining the specific user-space operating. The monitoring entity will then implement a security action based on that retrieved security policy in the same manner as previously described, such as allow the call, deny the call, kill the process, or modify the parameters of a call and/or the returned values of a call. Virtualization is provided in this modified security system by configuring the monitoring entities to select the security policy to apply based on the user-space control parameter that defines the user-space that is operating. Additionally, the security policies provided in the policy database are expanded to cater for the plurality of different user-space instances that may operate on the device, as will be explained in more detail below.

With this configuration, the security system is able to dynamically apply different security policies to applications depending on which user-space instance is operating, to thereby control the way the processes corresponding to the applications execute their operations and access the resources of the device. This virtualization mechanism enables fine-grained isolation as it is able to constrain a specific process execution, without necessarily controlling the entire OS. As each process is not aware of the call interceptor, there is no need to modify the process or the OS. Additionally, this virtualization mechanism does not require policies to be hard-coded in the system, and therefore they can be changed dynamically.

Policy Database

As with the previous embodiments, a policy database comprising the security policies that are applied/enforced by the monitoring entities is provided. The policy database may be in the form of a policy configuration file or files for example which define the policies. The policies provided may include application-specific policies, one for each user-space instance or group or subset of user-space instances, and/or global policies applicable to all or a subset of applications, one for each user-space instance or group or subset of user-space instances.

The security policies control which processes can communication with each other, how they can utilise/access device resources, data or files, or other general application/process privileges and permissions, based on which user-space they are operating in.

User-Space Control Parameter

The user-space control parameter defines the user-space instance that is operating on the device. The nature of the user-space control parameter depends on the number of different user-space instances provided or made available to a user. In one example, the security system may provide two user-space instances, namely private domain versus work domain, or standard user versus guest user, and the control parameter defines which domain has been activated, and therefore which security policies to apply to intercepted calls made by processes operating. In another example, the security system may provide multiple user-space instances, one for each different user or user-profile login on the device, and each of these user-space instances may further have a specified private domain versus work domain.

The user-space control parameter may be manually set by the user of the device via system configuration settings or by a system administrator, or automatically set by the security system based on the user login to the device, or otherwise set by a remote $3^{rd}$ party system communicating with the device.

Security Action Taken by Monitoring Entity

For detected function calls and/or system calls, the monitoring entities associated with each process is configured to execute a security action based on the security policy configured for the user-space instance operating as determined by the user-space control parameter. The security action taken may be based on a global policy which applies to at least the process invoking the call, an application-specific policy associated with the process, or a combination of these policies. If conflicting policies are provided, the monitoring entity may be configured to resolve the conflict in favour of the global policy over the application-specific policy, or vice versa, based on security system settings.

Example Scenario

An example configuration of a security system configured for light virtualization will be described by way of further explanation with reference to FIGS. 13-15.

In this example, the security system is configured to support two separate user-spaces, namely Work Domain (WD) and Private Domain (PD). The WD specifies security policies that allow the execution of enterprise-approved processes and access to sensitive commercial data. The PD allows the execution of processes related to the private sphere of the device user.

Each application/process on the device might be operable in both domains. The security system is therefore configured to provide a virtualization abstraction that allows such applications/processes to execute but with different privileges depending under which domain it is executed. For instance, one of the processes might be the Skype application. The security policies configured for Skype in the WD would be different to those configured for the PD. For example, when Skype is executed in the WD, Skype should provide the user with contacts that are work-related. Also, if the user wants to send commercial data through Skype, the application should have privileges to access sensitive data. On the other hand, when Skype is executed under the PD, the application should provide only contacts that are not related to the work environment. Also, the application should not allow the user to send over a chat sensitive data.

To be able to support this scenario, the security system is configured to differentiate the enforcement of security policies that apply to the same application but under different security domains. The call interceptor 514, which implements either or both of the FCI and SCI mechanisms, allows a very fine-grained level of enforcement to be able to differentiate access to resources. The security system is configured to provide the applications with a virtualised set of system calls on top of the ones provided by the OS. Either the FCI or SCI mechanisms can be used to implement such a virtualization mechanism.

By way of example, the operation of the security system to control the contact lists that Skype can assess depending on the domain it is being operated in will be described. The device is provided with multiple files (one for each domain) where the Skype contacts are stored. The contract list file for the WD is stored in /data/data/WD/skype/contact.ast. The contact list for the PD is stored in /data/data/PD/skype/contact.ast. This allows the system to separate between application-specific files. When Skype performs a read system call, the application is not aware of the existence of multiple contact files. It will try to open on the standard directory used, that is /data/data/app/skype/contact.ast. However, the security system is configured to intercept this system call and depending on which domain is active (either WD or PD), the monitoring entity associated with Skype can change the parameter in the call to point to the right contact list file, as will be explained further below with the call virtualization mechanisms of FCI or SCI.

If we now assume that a rouge application is deployed in the WD. This rouge application tries to access the cotanct.ast file and send it to a malicious server. The security system can enforce security policies to stop the rouge application from establishing a connection with the malicious server on the basis of a global security policy for the WD that specifies that all applications in the WD are only allowed to connect to a list of well-known servers.

Call Virtualization Through FCI

To virtualise calls, the security system can use function call interposition (FCI) to intercept the function calls before they are transferred into system calls executed by the kernel, and implement the any assigned security action. The security system is configured to use the GOT/PLT indirection mechanism and to interpose a hook proxy offset table (POT), similar to that described with respect to FIG. 9B. FIG. 14 provides an example of how FCI is used for virtualizing function calls, and like numerals reference like components with respect to FIG. 9B. In this specific example, the FCI mechanism is used to virtualise a function called func. This function takes one parameter par1 and returns an integer. The function inside the GOT 334 points 345 to a hook function 520 in the POT 340. When the hook function 520 in the POT 340 is executed, it will forward 522 the parameter par1 to the PEP 339 in the monitoring entity 310 using the method enter of the PEP. The parameter par1 is passed as reference, meaning that the PEP 339 in the monitoring entity 310 can directly modify its value. Once the value of the parameter is modified, if required, the original function is called with the modified parameter 524. The value that is returned by the function execution is provided to the PEP 339 in the monitoring entity through the method exit 526. Also in this case the return value is passed as reference. The PEP 339 may also then modify the return value, and then return that modified value to the calling process. The actual modifications of the function parameters and returned values are controlled by means of security policies enforced in the monitoring entity. As previously discussed, the security policy applied is dependent on the user-space control parameter that defines the user-space (e.g. domain) that the process is operating in.

Call Virtualization Through SCI

To virtualise calls, the security system can alternatively or additionally use system call interposition (SCI) to intercept the system calls in the kernel mode. In this case, the security system can use the system call ptrace as previously described in regard to the SCI mechanism. Another approach could be to modify the OS to intercept all system calls. In the following example, the system operations are described in the context of using a tool such ptrace. As previously described, with such a tool, once the kernel is about to execute system call on behalf of a process, the kernel will notify the monitoring entity associated with the process twice: before the system call is actually executed (on entry), and after the system call has been executed but before the returned value is provided to the calling process (on exit).

FIG. 15 shows a message sequence chart of the virtualization of the system call func when SCI is used. When the process 550 requests 551 the execution of the system call, the kernel 552 stops 553 its execution and notifies 555 the monitoring entity 556. The monitoring entity 556 retrieves 557 from the process memory the value of the parameter of the system call. The monitoring entity 556 can then modify 558 the value according to the security policies to be enforced.

Afterwards, the value of the parameter will be re-inserted 559 in the process memory. At this point, the system call is ready to be executed and the monitoring entity 556 notifies 560 the kernel 552 to let it run. When the kernel 552 completes the execution but before it returns the value to the calling process 550, the kernel notifies 561 again the monitoring entity 556. In this case, the monitoring entity 556 retrieves the returned value and modifies 562 it accordingly to the policies. Once the returned value is modified, it is returned 563 to the calling process 550. As with the FCI approach, the actual modifications of the system call parameters and returned values are controlled by means of security policies enforced in the monitoring entity, and the security policy applied is dependent on the user-space control parameter that defines the user-space (e.g. domain) that the process is operating in.

6. Device Hardware Configuration and Installation of the Security System

Figure 16:
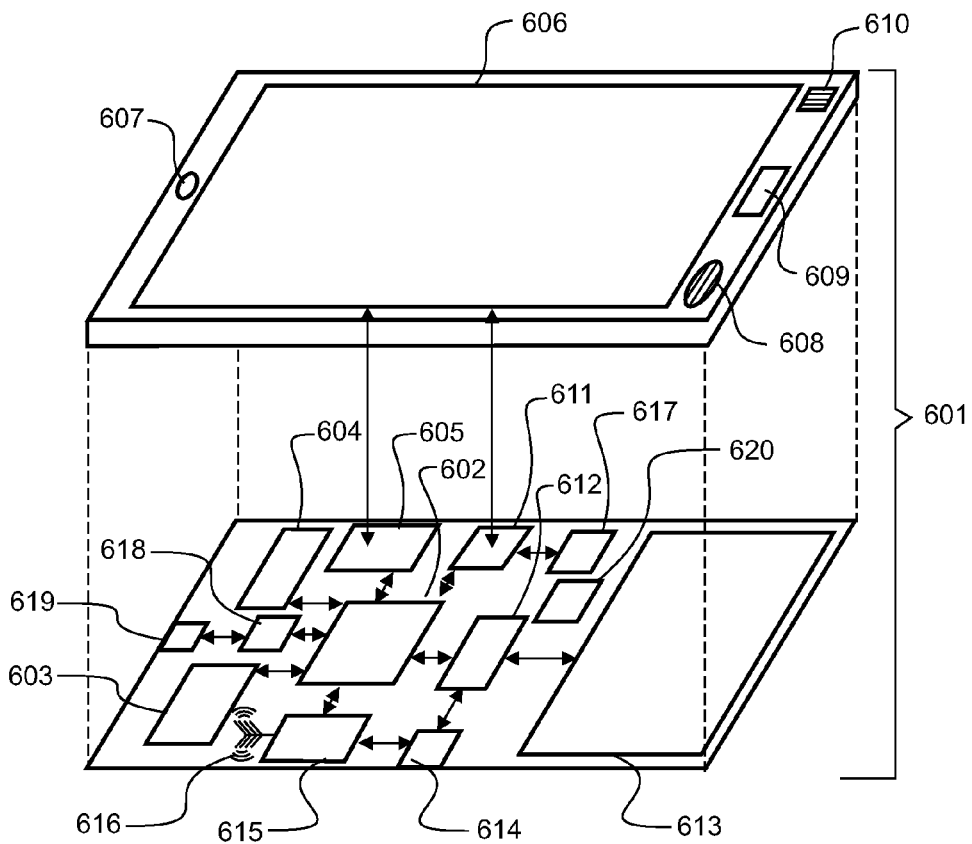
FIG. 16 is a schematic diagram of the hardware componentry of a typical smartphone or tablet device upon which the security system may run.
Figure 17:
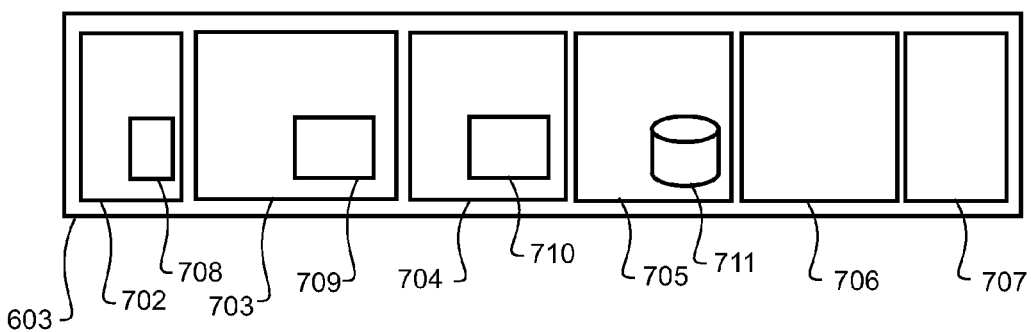
FIG. 17 is a schematic diagram of the typical storage device partitions in a device running an Operating System such as the ANDROID operating system.

As set out above, the embodiments of the security system may be implemented on any suitable hardware device or system running the ANDROID OS or LINUX-based OS, or similar. With reference to FIGS. 16 and 17, an example of the hardware componentry of a typical smartphone or tablet device upon which the security system may run will be described, and the security system installation process.

Referring to FIG. 16, typically a device 601 such as a smartphone or tablet contains the following components: a processor 602 that executes instructions that are either stored in a permanent storage device 603 and/or in volatile memory 603. Images, video and other multimedia output from the processor can be displayed using a monitor/display/touchscreen 606. Display data for the display 606 is prepared by the graphics device/touchscreen controller 605 which may be embedded in the processor 602. A user can operate the device through the touch screen 605 or buttons 609. Such instructions can be fed back to the processor 602, optionally through a controller device 605. Sound can be outputted through loudspeakers 608 which may be provided with a signal through an I/O interface 610 that may be embedded in the processor 602. Optionally, the touchscreen 606 may be provide haptic feedback, controlled by the I/O 610 interface to the user. Optionally, the device is shaken or rumbled to alert the user with the rumble/shaking device 620 controlled by the I/O 610 interface. The device may be equipped with several sensors to record sound using microphones 610 and images or video using cameras 611. There can also be position (such as Global Position System receivers), acceleration (accelerometers), orientation (tilt & gyroscopes) and environmental (temperature, light, radiation, moisture, gas, pressure) sensors 617. The device and all its components are powered by a battery 613. Alternatively the device could be powered through a wired interface 614. Power is regulated and distributed by a power management system 612. The battery can be charged through a wired 614 or wireless 612 interface.

To connect to the outside world and communicate data the device can use either a wired 614 or other (wireless) connectivity 615. The (wireless) connectivity 615 may be radio or light based communication. An antenna is used to transmit and receive radio signals for wireless communication 616. This antenna may or may not be embedded in the device. The wired or wireless connection may provide networking capabilities. For telecommunications subscription information the device may use a Subscriber Identity Module 619, which may be a card inserted into the device. The Subscriber Identity Module 619 may interface with the processor 602 through a controller 618.

An Operating System, such as the ANDROID operating system, can be used to let the user control both hardware and software in the device. The operating system is software including a set of instructions for the processor 602 that is normally installed on the permanent storage device 603. When the device is operating the Operating System may also be placed, in part, in the volatile memory 604.

Malicious software or code (instructions) may be placed on the device storage locations 603,604 by a (unaware) user or another party through the wired interface 614 or wireless connectivity 615,616. It can trick the Operating System in letting the processor 602 perform instructions for malicious purposes. To prevent the processor 602 from carrying out malicious instructions the security system described in the previous embodiments is installed on the device and will interact with the operating system. The security system is typically installed on the device storage locations 603,604.

Referring to FIG. 17, an example of how the security system is installed on the storage device 603 will be explained. Typically, a storage device 603 with an Operating System (O.S.), such as the ANDROID operating system, installed contains the following partitions: boot 702, system 703, recovery 704, data 705, cache 706 and miscellaneous (misc.) 707.

First Embodiment Security System Installation

In order to deploy the security system using the first embodiment the following modules should be modified. The main monitor binary should be placed into the device's boot 702 partition. Also, the init.rc 708 file, which is part of the boot 702 partition should be modified in order to modify the "zygote" service, which should point to the monitor binary location. In order to modify the device's original boot 702 partition, the partition image should be pulled out from the device. In a second stage, the binary file should be unpacked, resulting in the kernel image and the bootloader image. The bootloader image should then be patched by copying the main monitor binary into it (typically in the /sbin folder) and modifying the init.rc 708 file to update the "zygote" service. Once patched, the bootloader can be repacked along with the kernel image to generate a patched version of the boot 702 partition, which should be pushed back into the physical device.

The security system service should be place into the system 703 partition. In order to do so, the system 703 partition should be remounted with write permissions, so that the service package file can be copied into it (typically into the /system/app). Once copied, the partition can be remounted back to its readonly state. Optionally, the monitor binary may be also installed within the system 703 partition (typically within /system/bin). Optionally, a backup of the security system and/or local policy configuration file (or policy database) may be stored in the recovery partition 704. In case of installing a local policy configuration file (or policy database), it will be placed in the data 705 partition (typically within /data/system), along with any other data files that the security system might need to use (this may include a copy of all system components to re-enable the framework after OS actualizations).

Once all components have been deployed into the device, it should be restarted to finalize the process. Once the device has rebooted, the security system is up and running.

Second Embodiment Security System Installation

In order to deploy the security system using the second embodiment the following modules should be modified. The init.rc 708 file, which is part of the boot 702 partition should be modified in order to modify the "zygote" service, which should environment should be set so that LD_PRELOAD point to the proxy function library location. In order to modify the device's original boot 702 partition, the partition image should be pulled out from the device. In a second stage, the binary file should be unpacked, resulting in the kernel image and the bootloader image. The bootloader image should then be patched by modifying the init.rc 708 file to update the "zygote" service. Once patched, the bootloader can be repacked along with the kernel image to generate a patched version of the boot 702 partition, which should be pushed back into the physical device.

The security system service should be place into the system 703 partition. In order to do so, the system 703 partition should be remounted with write permissions, so that the service package file can be copied into it (typically into the /system/app). Once copied, the partition can be remounted back to its readonly state. The proxy functions library should also be installed within the system 703 partition (typically within /system/lib). In case of installing a local policy configuration file (or policy database), it will be placed in the data 705 partition (typically within /data/system), along with any other data files that the security system might need to use (this may include a copy of all system components to re-enable the framework after OS actualizations). Optionally, a backup of the security system and/or local policy configuration file (or policy database) may be stored in the recovery partition 704. Once all components have been deployed into the device, it should be restarted to finalize the process. Once the device has rebooted, the security system is up and running.

7. Fourth Embodiment Security System—Google Chrome OS

The embodiments of the security system above may also be adapted/applied to other LINUX-based operating systems, such as the Google Chrome operating system (OS). The Chromium Projects include Chromium that is the open-source project behind Google Chrome Browser; and the Chromium OS that is the open-source project behind the Google Chrome OS.

The two projects have a large portion of their code base in common. In particular Chromium OS/Google Chrome OS is a LINUX-based operating system that executes solely web-based applications. This OS takes a minimalist approach where the only applications residing in the device are the browser (that is Google Chrome), media player and file system. Essentially, the web-based applications are executed within the browser. Given the common approach (essentially running applications within the browser), in the following discussion we will use the term Chromium to refer to both projects (Chromium and Chromium OS).

The main idea behind Chromium is to run in different processes instances of functionality. With functionality here we refer to code downloaded visiting a web page, executing a web application, and other code that it will be rendered and executed by Chromium processes.

Figure 18:
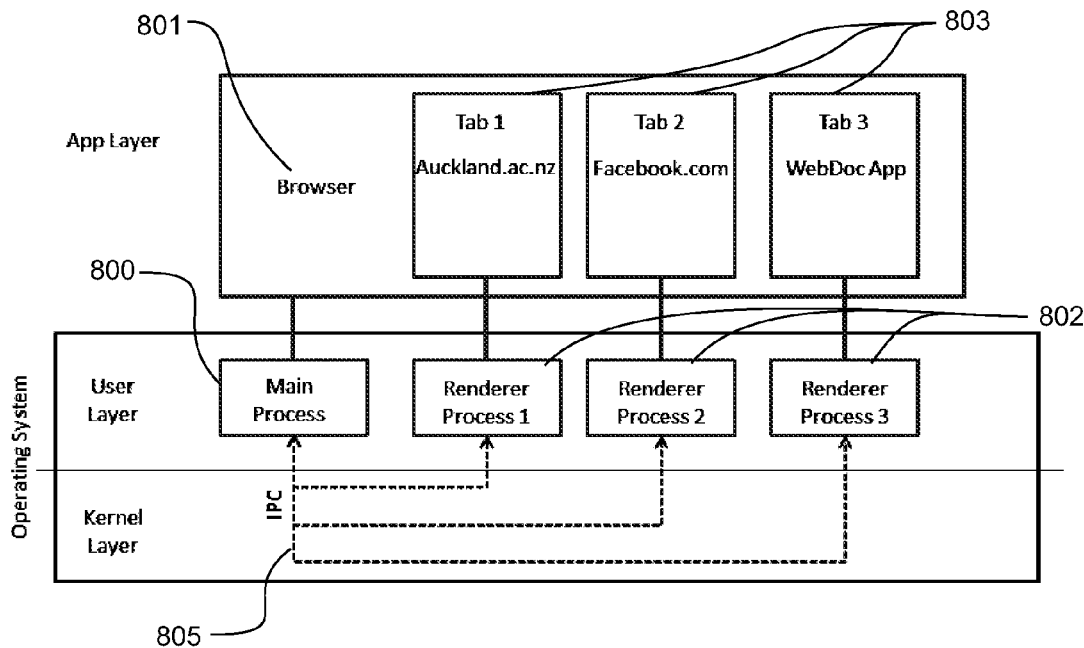
FIG. 18 is a schematic diagram of Chromium.

As shown in FIG. 18, Chromium has a main process 800 (called the "browser" 801) responsible for displaying the User Interface (UI) and managing the other processes 802 where tabs and plug-ins are executed. Tab processes are called "renderers" and are responsible for rendering the functionality within each tab using rendering engines such as WebKit and Blink. In this sense the tabs and plug-in define functionalities for the device running ChromeOS.

By default, Chromium creates a new renderer process 802 for each instance of a website a user visits (process-per-site-instance). A site is defined as a registered domain such as auckland.ac.nz. This means that multiple tabs pointing to the same site will be executed in different processes. Another model is process-per-site where different sites will be run on different processes. However, multiple tabs pointing to the same site will be run by the same process. Process-per-tab is another model where each tab will be rendered by a dedicated process. Finally, Chromium can be executed in a single process.

FIG. 18 shows the case of a different renderer process for each functionality instance. In particular, each of the tabs 803 that is executed within a dedicated renderer process 802 is providing a specific functionality to the user. For instance, Tab 1 visualises the auckland.ac.nz web page, Tab 2 visualises the facebook.com web page, and Tab 3 is executed a web-based app.

Each renderer process 802 executes code to provide the user with some functionality. This functionality may be loading a HTML page or executing a web-based application. From the OS point of view, each process 802 is a child of the main process 800 (browser) and is not aware of the specific functionality provided by each renderer process. However, the OS does not have a direct view of the functionality of each renderer process. In other words, each renderer process is an "opaque" process. Thus, enforcing security policies specific to the functionality of each renderer process is not straightforward.

The loading of a specific functionality within each renderer process 802 is performed by having the renderer asking the main process 800 through Inter Process Communication (IPC) calls 805 to fetch the code from the web. This IPC channel between the main process 800 and all the renderers 802 is established using interfaces offered by the kernel by means of function call and system calls. For instance, the socketpair( ) function/system call is used when Chromium is deployed on the LINUX operating system and Mac OS X to establish a channel between the main process 800 and the renderer process 802. The security system described in the previous embodiments can be deployed to exploit this communication channel to intercept the messages that specify the functionality loaded in each renderer process and enforce specific security policies as will be explained next.

Figure 19:
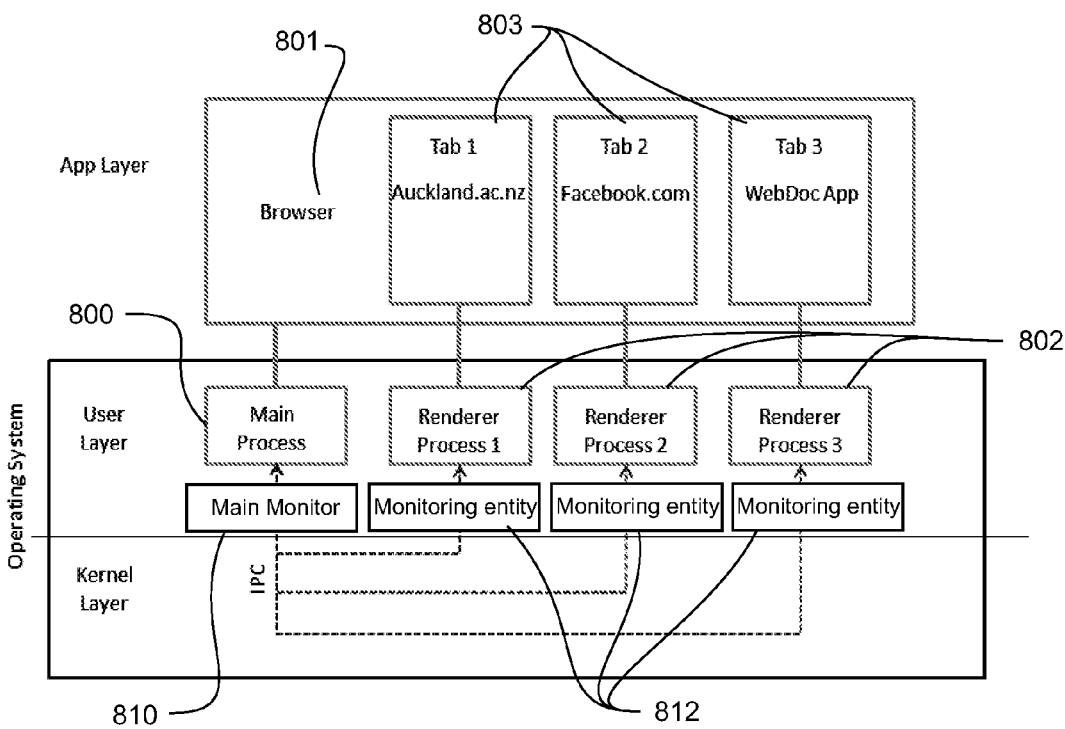
FIG. 19 is a schematic diagram of the security system applied to Chromium in a fourth embodiment.

FIG. 19 shows how the security system monitors or monitoring entities can be attached to different processes within Chromium. Firstly, the main monitor 810 will be attached to or embedded within the main process 800 and will monitor when it will spawn new renderer processes 802. When a new renderer process 802 is spawned, a new process monitor 812 (or monitoring entity) will be attached to the new child process 802, such that each new process has its own respective monitoring entity. Chromium uses the same approach as in the ANDROID operating system to spawn new process using a Zygote process that will fork itself to create renderer processes.

Each monitoring entity 812 can intercept the system calls its associated renderer process 802 makes to communicate with the main process 800 and extract information for identifying what functionality each renderer is executing. This allows the security system to associate specific security policies (from a policy database) tailored to the functionality each renderer will execute, i.e. each monitoring entity retrieves and enforces security policies specific to the application corresponding to its process. So for instance, the monitoring entity 812 monitoring the renderer process 1 will enforce security policies specific for the domain Auckland.ac.nz (Tab 1), whereas the monitoring entity 812 monitoring the renderer process 2 will enforce policies specific for the domain Facebook.com (Tab 2). It will be appreciated that the main monitor 800 and process monitors 802 may be either part of (e.g. embedded within) the respective process they are monitoring, in which case the FCI technique is used, or a separate process attached to the respective process they are monitoring, in which case the SCI technique is used, both techniques of which are described in the previous embodiments.

8. Examples

Various example configurations and/or methods of some embodiments are set out below.

A first example is a method for securing an operating system running on a device comprising a LINUX-based kernel and a system architecture defined by a LINUX operating system layer associated with the kernel and the higher application layer comprising applications. The method comprises monitoring system calls to the kernel made by a mother process in the LINUX operating system layer to detect the launching of a new process in the LINUX operating system layer corresponding to a new application or part of an application in the application layer. The method also comprises attaching a new monitor process in the LINUX operating system layer to the newly launched process once it is created by the mother process, the monitor process being configured to monitor system calls made to the kernel by the new process and to retrieve and enforce security policies configured for the new process based on the parameters of detected system calls.

A second example is a security system for an operating system running on a device that comprises a LINUX-based kernel, and a system architecture defined by a LINUX operating system layer associated with the kernel and the higher application layer comprising applications. The system comprises a main monitor process running at the LINUX operating system layer which is configured to detect the launch of a new process in the LINUX operating system layer by a mother process, the new process corresponding to the launching of a new application or part of an application in the application layer by the user of the device. The system also provides a process monitor that is attached by the main monitor process to each new process created by the mother process and each process monitor being configured to monitor the system calls made by its attached process to the kernel. A security system service is also provided and which runs at the application layer that is operable to access stored configurable security policies for the applications of the application layer, and which communicates with each process monitor in the LINUX operating system layer the security policies corresponding to its attached process, and wherein each process monitor is configured to retrieve and enforce the security policy configured for its attached process based on the parameters of the detected system calls.

A third example is a method of configuring a process monitor attached to a new target process in a security system for an operating system running on a device that comprises a LINUX-based kernel, and a system architecture defined by a LINUX operating system layer associated with the kernel and the higher application layer comprising applications. The method comprises monitoring the specialization process of the target process as it specializes as its intended application, extracting application identification data from the specialization process that is indicative of the application or type of application the target process is specializing as, retrieving security policies specific to the target process from a policy database based on the extracted application identification data, and configuring the process monitor to enforce the retrieved security policies.

A fourth example is a method of linking a security policy stored in a policy database that is specific to an application in the application layer with a new corresponding process launched in the LINUX operating system layer in a security system for an operating system running on a device that comprises a LINUX-based kernel. The operating system has a system architecture defined by a LINUX operating system layer associated with the kernel and the higher application layer comprising the applications. The method comprises monitoring the specialization process in the LINUX operating system layer of the new process as it specializes as its intended application, extracting application identification data from the specialization process that is indicative of the application or type of application the target process is specializing as, and creating a link between the new process and a security policy from the policy database based on the application identification data.

A fifth example is a method of implementing security policies at the LINUX operating system layer, the policies being defined for applications or types of applications in the application layer, wherein the method comprises monitoring the loading and/or identification of code used by a new LINUX operating system process to specialize into its intended application. The method also comprises linking a security policy or policies for implementing at the LINUX operating system layer to the new LINUX operating system process based on the loaded or identified code.

A sixth example is a method of securing an operating system running on a device comprising a LINUX-based kernel in a LINUX operating system layer, the system architecture comprising an application comprising applications in an application layer above the LINUX operating system layer. The method comprises embedding a monitoring entity within each newly launched process in the LINUX operating system layer corresponding to a new application or an application component in the application layer, configuring each newly launched process to redirect at least some of its shared or dynamic library symbol invocations to the embedded monitoring entity within the process, and configuring each embedded monitoring entity to analyze redirected symbol invocations made by its associated process and perform a security action based on a security policy associated with the process.

A seventh example is a method of securing an operating system running on a device comprising a LINUX-based kernel in a LINUX operating system layer, the system architecture comprising applications in an application layer above the LINUX operating system layer. The method comprises intercepting shared or dynamic library symbol invocations made by processes that are intended to invoke system calls in the kernel, and initiating a security action for intercepted symbol invocations based on a security policy configured for the application corresponding to the process calling the intercepted symbol invocation.

An eighth example is a security system for an operating system running on a device that comprises a LINUX-based kernel, and a system architecture defined by a LINUX operating system layer associated with the kernel and the higher application layer comprising applications. The system comprises an embedded monitoring entity within each launched process in the LINUX operating system layer, each launched process corresponding to an application in the application layer. The system also comprises an interceptor associated with each process that is configured to intercept at least some of the shared or dynamic library symbol invocations made by its associated process and redirect them to the embedded monitoring entity within the process initiating the symbol invocations. The embedded monitoring entities are configured to analyze the intercepted symbol invocations made by their associated processes and perform a security action based on a security policy associated with the process.

A ninth example is a method for securing an operating system running on a device comprising a LINUX-based kernel and a system architecture defined by a LINUX operating system layer associated with the kernel and the higher application layer comprising applications. The method comprises creating a monitoring entity which monitors system and/or library function calls invoked by a mother process to detect the creation of a new process which will correspond to a new application in the application layer, and creating a new monitoring entity to monitor to the newly launched process once it is created by the mother process, the new monitoring entity being configured to detect system and/or library function calls made by the new process and to retrieve and enforce security policies configured for the new process based on the parameters of the detected system and/or library function calls.

A tenth example is a method for securing an operating system running on a device comprising a LINUX-based kernel and a system architecture defined by a LINUX operating system layer associated with the kernel and the higher application layer comprising applications. The method comprises creating a monitoring entity which monitors, directly or indirectly, system calls invoked by a mother process to detect the creation of a new process which will correspond to a new application in the application layer, and creating a new monitoring entity to monitor to the newly launched process once it is created by the mother process, the new monitoring entity being configured to detect, directly or indirectly, system call invocations made by the new process and to retrieve and enforce security policies configured for the new process based on the parameters of the detected system call invocation.

An eleventh example is a method of securing an operating system running on a device comprising a LINUX-based kernel in a LINUX operating system layer, the system architecture comprising applications in an application layer above the LINUX operating system layer. The method comprises detecting shared or dynamic library symbol invocations made by processes using a first monitoring mechanism and initiating a security action for detected symbol invocations based on a security policy associated with the respective process invoking the symbol invocation, detecting high-risk processes attempting to execute one of a predefined set of high-risk actions, and initiating a second monitoring mechanism to monitor system calls invoked by detected high-risk processes.

A twelfth example is a method of securing an operating system running on a device comprising a LINUX-based kernel in a LINUX operating system layer, the system architecture comprising applications in an application layer above the LINUX operating system layer. The method comprises initiating a primary monitoring mechanism configured to detect at least some shared or dynamic library symbol invocations made by processes, and executing a security action for detected symbol invocations based on security policies associated with the processes invoking the detected symbol invocations, detecting high-risk processes attempting to execute one of a predefined set of high-risk actions and switching to a secondary monitoring mechanism to detect system calls invoked by detected high-risk processes, and executing a security action for each detected system call based on security policies associated with detected high-risk processes invoking the detected system calls.

A thirteenth example is a method of linking an application-specific security policy or policies to a new process launched in an operating system of a device. The device has an operating system operable to run processes and middleware operable to cause the operating system to launch a new process by forking or spawning the new process from an existing process or a mother process and to cause the new process to specialize to run the application using code that is specific to the application. The method comprises detecting the new process, monitoring for a predefined event or predefined identification threshold after detecting the new process, and linking a security policy or policies to the new process once the predefined event is detected or predefined identification threshold is reached.

A fourteenth example is a method of linking an application-specific security policy or policies to a new process launched in an operating system. The method comprises detecting the launch of the new process, and delaying linking of a security policy or policies to the new process at least until the new process begins specializing with its application-specific code for execution.

A fifteenth example is a device comprising an operating system to run processes and a middleware layer operable to launch applications, wherein an application launched by the middleware layer is run using one or more processes in the operating system. The operating system has a user layer and a kernel wherein the processes run in the user layer of the operating system and interact with other processes running in the user layer through the kernel, the interaction being in response to calls to the kernel made by the processes. The device further comprises one or more policy files defining policies for interaction of processes with the kernel of the device, and a monitor configured to monitor interaction of a process with the kernel to link or associate defined policies to the process, and to read code defined in the policy file or files linked or associated to the process.

A sixteenth example is a method of virtualizing an operating system on a device to provide a plurality of isolated user-space instances operable on the device, the operating system comprising a LINUX-based kernel and a system architecture defined by a LINUX operating system layer associated with the kernel and the higher application layer comprising applications. The method comprises intercepting system and/or library function calls made by processes, each process corresponding to an application in the application layer, and initiating a security action for intercepted system and/or library function calls based on at least a user-space control parameter indicative of the specific user-space instance currently operating on the device and a security policy associated with the process.

A seventeenth example is a virtualization system for virtualizing an operating system on a device to provide a plurality of isolated user-space instances operable on the device, the operating system comprising a LINUX-based kernel, and a system architecture defined by a LINUX operating system layer associated with the kernel and the higher application layer comprising applications. The system comprises a monitoring entity associated with each launched process in the LINUX operating system layer, each launched process corresponding to an application in the application layer, and an interceptor associated with each process that is configured to intercept system and/or library function calls, and redirect them to the monitoring entity associated with the process initiating the system and/or library function calls. The monitoring entities are configured to analyze the intercepted system and/or library function calls made by their associated processes and perform a security action based on at least a user-space control parameter indicative of the specific user-space instance currently operating on the device and a security policy associated with the process.

An eighteenth example is a device comprising one or more resources including a processor and configurable to functionalities defined in functional code received by the device, the device also comprising an operating system including a user layer operable to run processes and a kernel operable to provide interfaces for the processes to use one or more resources of the device. The device stores launcher code operable to launch received functional code by causing a process to spawn or fork from another process and to specialize dependent on the functional code whereby functionality defined for the device by functional code is executed with a spawned or forked process using resources of the device via interfaces provided by the kernel. The device also stores policy code defining a policy for each functional code or type of functional code received, and wherein the device comprises a monitor which is operable to associate policy code with the process and to monitor each process dependent on policy code associated with the process.

In some embodiments, any of the examples above may be in the form of a computer-readable medium having stored thereon computer readable instructions that, when executed on a processing device, cause the processing device to perform any one or more of the methods described in the examples or to implement any one or more of the systems described in the examples.

In some embodiments, any of the examples above may be implemented on a device or system having a processor and memory, and where the processor is configured or programmed to carry out or execute any one or more of the methods described in the examples or to implement any one or more of the systems described in the examples.

9. General

Embodiments of the security system may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the scope of the present disclosure. Additional elements or components may also be added without departing from the scope of the present disclosure. Additionally, the features described herein may be implemented in software, hardware, or combination thereof.

In its various aspects, the various embodiments herein may be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the present subject matter includes various forms thereof. Modifications may be made thereto without departing from the scope of this disclosure.

What is claimed is:

1. A device comprising an operating system to run processes in a user mode of a lower layer and a middleware layer operable to launch applications of an application layer, wherein an application launched by the middleware layer is run using one or more processes in a user mode of the lower layer in the operating system, the operating system further comprising a kernel operable in a kernel mode of the lower layer, the device further comprising: a hardware processor:

a security system operating in the user mode of the lower layer comprising:

monitoring entities operating in the user mode of the lower layer, each monitoring entity being configured to monitor a respective process running in the user mode of the lower layer such that each process has a dedicated monitoring entity, each monitoring entity being linked to one or more application-specific security policies of a security policy database accessible to the device that comprises one or more application-specific security policy files defining application-specific security policies for applications in the application layer and/or types of applications in the application layer; and each monitoring entity being configured to:
    detect, directly or indirectly, system call invocations made by its respective process;
    determine a security action or actions to control the detected system call invocations based on parameters of the detected system call invocations and the application-specific security policy or policies linked to the monitoring entity; and
    execute the determined security action to enforce the linked application-specific security policy or policies;
and wherein the security system is configured to link application-specific security policies to each monitoring entity by:
    monitoring for a predefined event or predefined identification threshold after initial launch of the process being monitored by the monitoring entity, the predefined event or predefined identification threshold signifying a state in which the application the process is executing can be definitively identified; and
    linking appropriate one or more application-specific security policies of the security policy database to the monitoring entity once the predefined event is detected or predefined identification threshold is reached such that the linking of the appropriate one or more application-specific security policies to the monitoring entity for enforcement is delayed until the application the process is executing can be definitively identified.

2. A device according to claim 1 wherein the middleware layer is operable to cause a process to spawn or fork from an existing process or a mother process and to cause the process to specialize to run an application of the application layer using code specific to the application.

3. A device according to claim 1 wherein the predefined event is the loading and/or identification of code used by the process to specialize into its intended application.

4. A device according to claim 3 wherein the security system is configured to link the appropriate one or more application-specific security policies to the monitoring entity monitoring a process after the process has started executing.

5. A device according to claim 3 wherein the security system is configured to link the appropriate one or more application-specific security policies to the monitoring entity monitoring a process dependent on data or code used to specialize the process to a given application or application type.

6. A device according to claim 1 wherein the predefined event is the specialization process of the process as it specializes as its intended application, and the security system is configured to link the appropriate one or more application-specific security policies of the security policy database to the monitoring entity by extracting application identification data from the specialization process that is indicative of the application the process is specializing as, and linking the appropriate one or more application-specific security policies to the monitoring entity based on the extracted application identification data.

7. A device according to claim 1 wherein each monitoring entity is configured to detect, directly or indirectly, system call invocations made by its respective process by monitoring shared or dynamic library symbol invocations and/or system calls and the application-specific security policy or policies linked to the monitoring entity define security actions in response to given symbol invocations or system calls made by the process.

8. A device according to claim 7 wherein the security actions comprise any one or more of: blocking the symbol invocation or system call, redirection of symbol invocations to an alternative library address, logging the symbol invocation or system call, killing the process, and/or suspending the symbol invocation or system call to allow authorization of the symbol invocation or system call by an operator.

9. A device according to claim 1 wherein the security system further comprises:
    a main monitoring entity operating in the user mode of the lower layer which monitors, directly or indirectly, system calls invoked by a mother process that spawns or creates all new processes that correspond to launched applications of the application layer, and
    wherein the main monitoring entity is configured to create a new monitoring entity to monitor each newly launched process once it is created by the mother process.

10. A device according to claim 9 wherein the monitoring entities directly detect system call invocations by intercepting the system call invocations to the kernel made by their respective process.

11. A device according to claim 9 wherein the monitoring entities indirectly detect system call invocations by intercepting shared or dynamic library symbol invocations made by their respective process that are intended to invoke one or more system calls to the kernel.

12. A method of linking an application-specific security policy or policies to monitoring entities operating in a security system of a device, the method implemented by a processor of the device and the device further having an operating system to run processes in a user mode of a lower layer and a middleware layer operable to launch applications of an application layer, wherein an application launched by the middleware layer is run using one or more processes in a user mode of the lower layer in the operating system, the operating system further comprising a kernel operable in a kernel mode of the lower layer, the device further comprising: a security system operating in the user mode of the lower layer comprising monitoring entities operating in the user mode of the lower layer, each monitoring entity being configured to monitor a respective process running in the user mode of the lower layer such that each process has a dedicated monitoring entity, each monitoring entity being linked to one or more application-specific security policies of a security policy database accessible to the device that comprises one or more application-specific security policy files defining application-specific security policies for applications in the application layer and/or types of applications in the application layer; and each monitoring entity being configured to: detect, directly or indirectly, system call invocations made by its respective process; determine a security action or actions to control the detected system call invocations based on parameters of the detected system call invocations and the application-specific security policy or policies linked to the monitoring entity; and execute the determined security action to enforce the linked application-specific security policy or policies, and wherein the method executed by the processor of the device comprises linking application-specific security policies to each monitoring entity by:
    monitoring, by the processor of the device, for a predefined event or predefined identification threshold after initial launch of the process being monitored by the monitoring entity, the predefined event or predefined identification threshold signifying a state in which the application the process is executing can be definitively identified; and
    linking, by the processor of the device, the appropriate one or more application-specific security policies of the security policy database to the monitoring entity once the predefined event is detected or predefined identification threshold is reached such that the linking of the appropriate one or more application-specific security policies to the monitoring entity for enforcement is delayed until the application the process is executing can be definitively identified.

13. A method according to claim 12 wherein the predefined event is any of the following: a completed fork of the new process, a specialization of the new process with application-specific code, or a beginning of the execution of application-specific-code in the process.

14. A method according to claim 12 wherein the predefined identification threshold corresponds to collecting or receiving enough data or evidence indicating or identifying that the new process launched corresponds to the application in the application layer that a user of the device intended to launch.

15. A method according to claim 12 wherein predefined event is the specialization process of the process as it specializes as its intended application, and the method comprises linking the appropriate one or more application-specific security policies of the security policy database to the monitoring entity by: extracting application identification data indicative of the application or type of application the process will specialize as, or is specializing as, or has specialized as; and linking the appropriate one or more application-specific security policies to the monitoring entity based on the extracted application identification data.

* * * * *